US012782679B2

(12) United States Patent
Jung

(10) Patent No.: US 12,782,679 B2
(45) Date of Patent: Nov. 3, 2026

(54) OPTICAL MODULE

(71) Applicant: LG INNOTEK CO., LTD., Seoul (KR)

(72) Inventor: Jae Wook Jung, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 191 days.

(21) Appl. No.: 18/579,959

(22) PCT Filed: Jul. 15, 2022

(86) PCT No.: PCT/KR2022/010359
§ 371 (c)(1),
(2) Date: Jan. 17, 2024

(87) PCT Pub. No.: WO2023/287246
PCT Pub. Date: Jan. 19, 2023

(65) Prior Publication Data

US 2024/0385416 A1 Nov. 21, 2024

(30) Foreign Application Priority Data

Jul. 15, 2021 (KR) ........................ 10-2021-0093161
Aug. 30, 2021 (KR) ........................ 10-2021-0115134

(51) Int. Cl.
*G02B 9/62* (2006.01)
*G02B 13/00* (2006.01)

(52) U.S. Cl.
CPC ........... *G02B 9/62* (2013.01); *G02B 13/0045* (2013.01)

(58) Field of Classification Search
CPC .............................. G02B 13/0045; G02B 9/62
See application file for complete search history.

(56) References Cited

U.S. PATENT DOCUMENTS 12,055,679 B2 * 8/2024 Zhao .................... G02B 13/003
2015/0138431 A1 5/2015 Shin et al.
2017/0219802 A1 8/2017 Chen et al.
2019/0094493 A1 3/2019 Lin
2021/0063695 A1 * 3/2021 Hsieh ....................... G02B 9/64
2021/0132338 A1 5/2021 Lin et al.
2021/0263265 A1 8/2021 Sun et al.
(Continued)

FOREIGN PATENT DOCUMENTS

CN 111158114 5/2020
CN 111198435 5/2020
(Continued)

OTHER PUBLICATIONS

International Search Report dated Nov. 16, 2022 issued in Application No. PCT/KR2022/010359.
(Continued)

*Primary Examiner* — Stephone B Allen
*Assistant Examiner* — Tamara Y. Washington
(74) *Attorney, Agent, or Firm* — KED & ASSOCIATES, LLP

(57) ABSTRACT

An optical module according to an embodiment includes: a sensor; and an optical system including first to sixth lenses sequentially disposed along an optical axis from an object-side toward a sensor-side, wherein at least one of an object-side surface and a sensor-side surface of the sixth lens includes a free-form surface.

19 Claims, 43 Drawing Sheets

(56) References Cited

U.S. PATENT DOCUMENTS

| | | | |
|---|---|---|---|
| 2021/0263266 | A1 | 8/2021 | Chen et al. |
| 2022/0035126 | A1 | 2/2022 | Zhao et al. |
| 2023/0064260 | A1 | 3/2023 | Park, II |

FOREIGN PATENT DOCUMENTS

| | | |
|---|---|---|
| CN | 111679410 | 9/2020 |
| JP | 2008-275666 | 11/2008 |
| KR | 10-2015-0059212 | 6/2015 |
| TW | I622793 | 5/2018 |
| TW | I662292 | 6/2019 |

OTHER PUBLICATIONS

Taiwanese Office Action dated Mar. 20, 2026 issued in Application No. 111126176.

* cited by examiner

【FIG. 1】
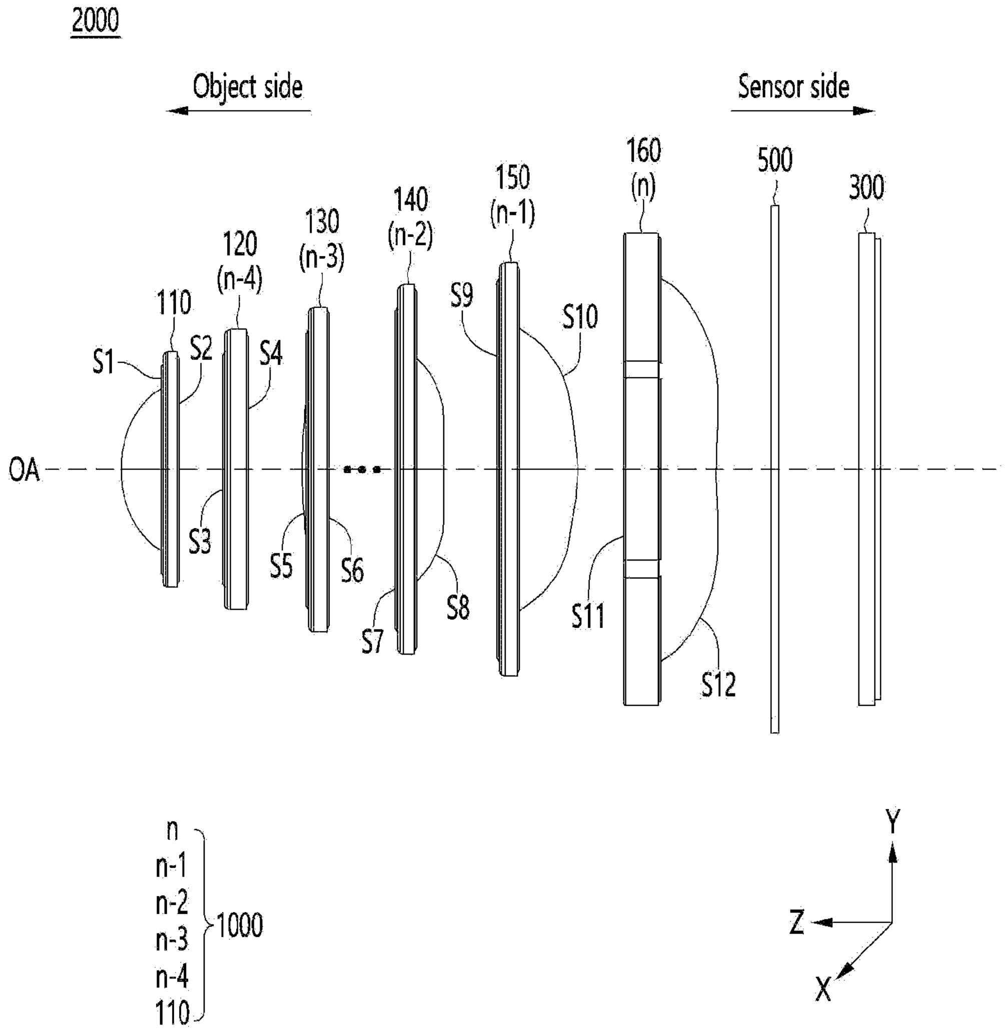

【FIG. 2】
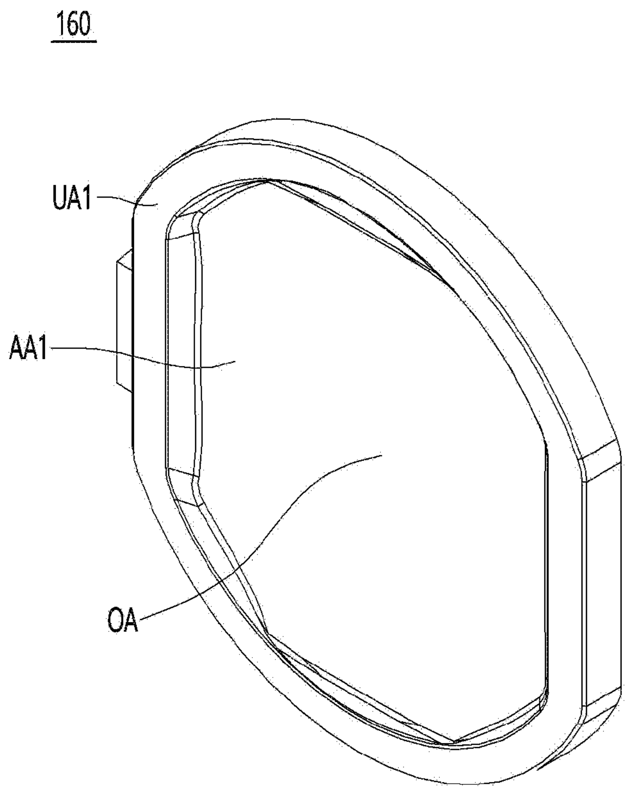

【FIG. 3】
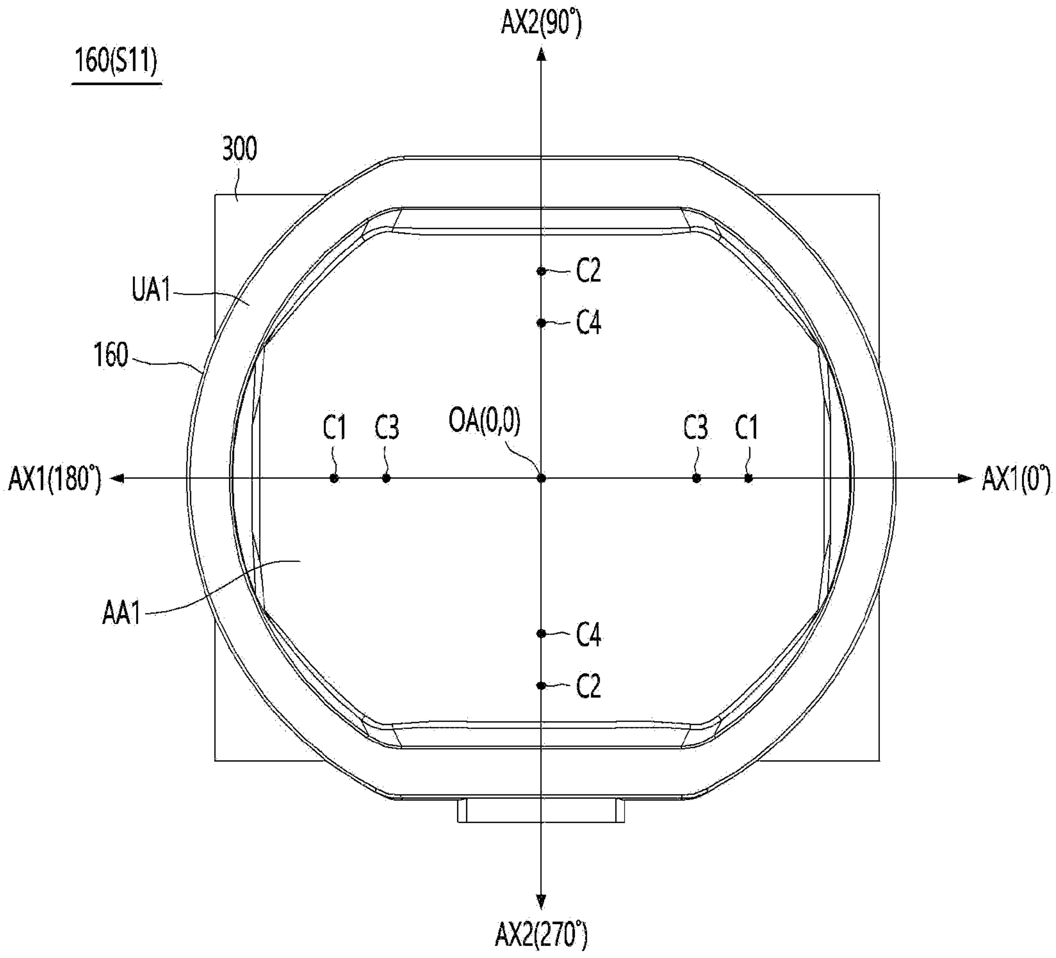

【FIG. 4】
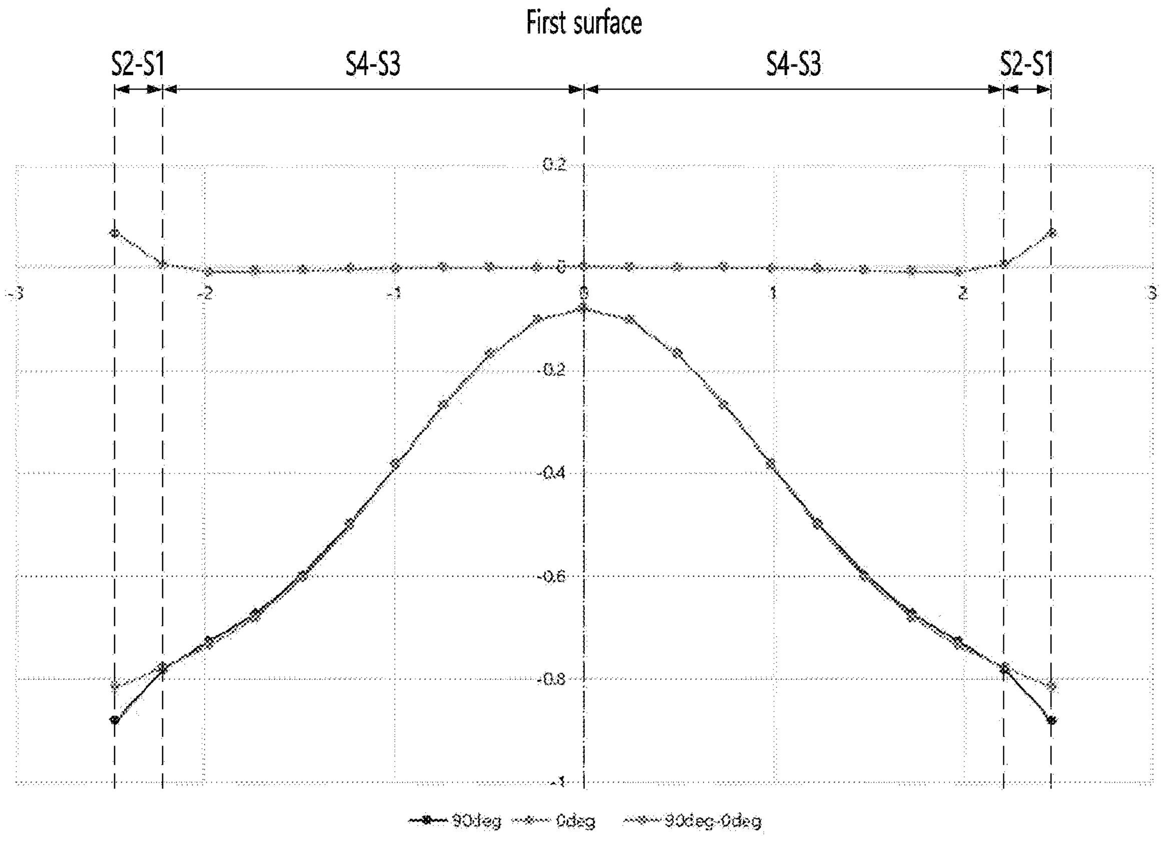

【FIG. 5】
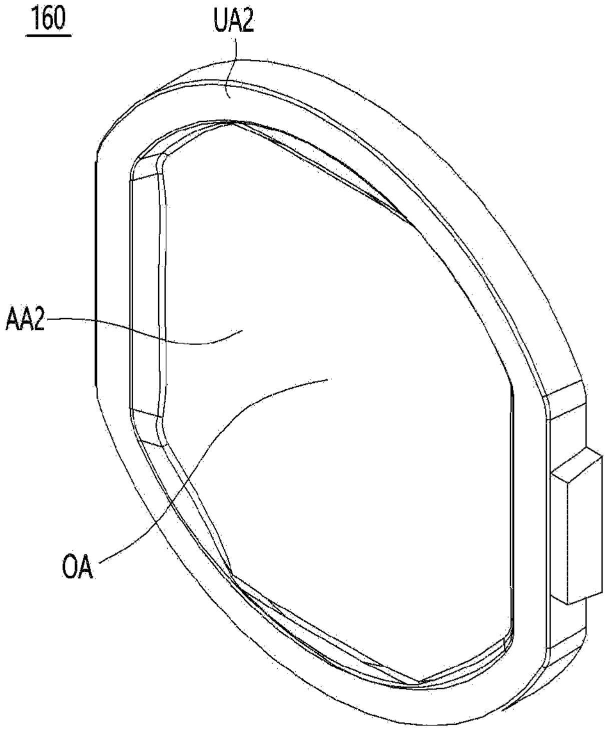

【FIG. 6】
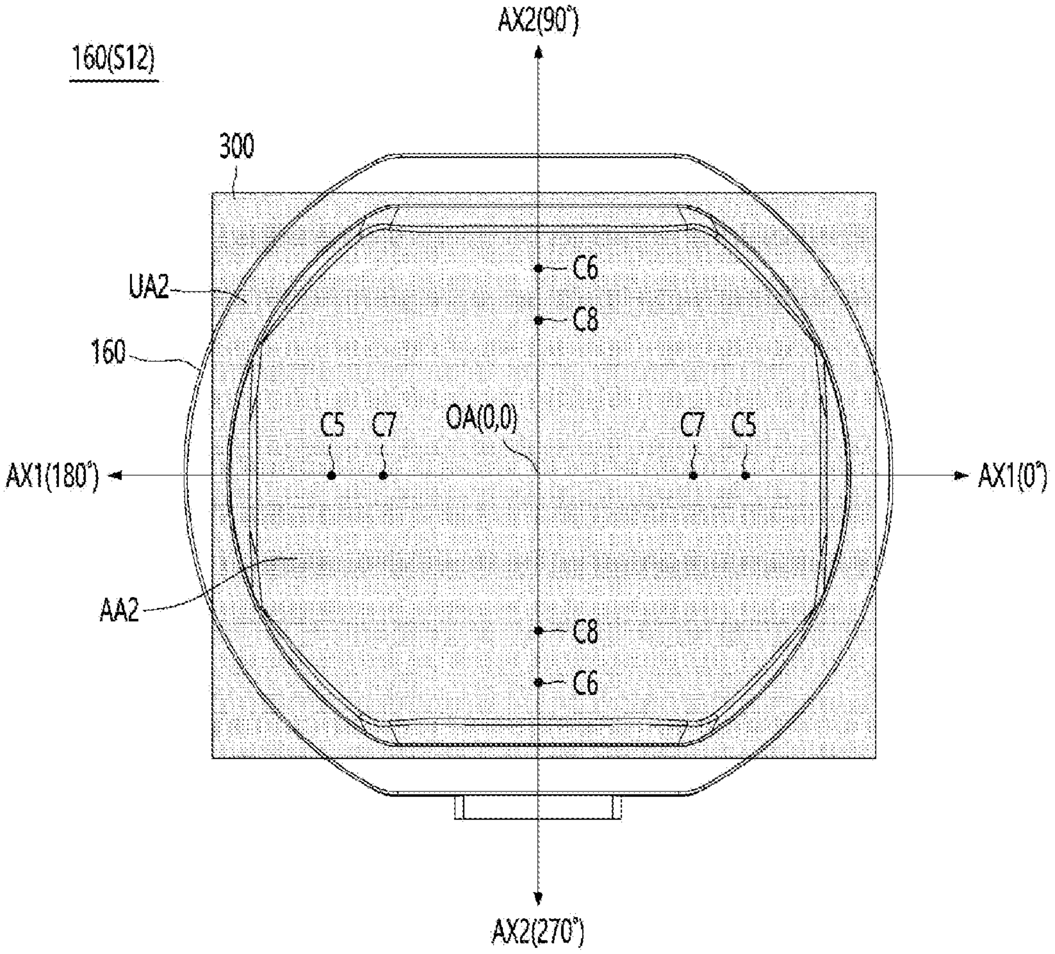

【FIG. 7】
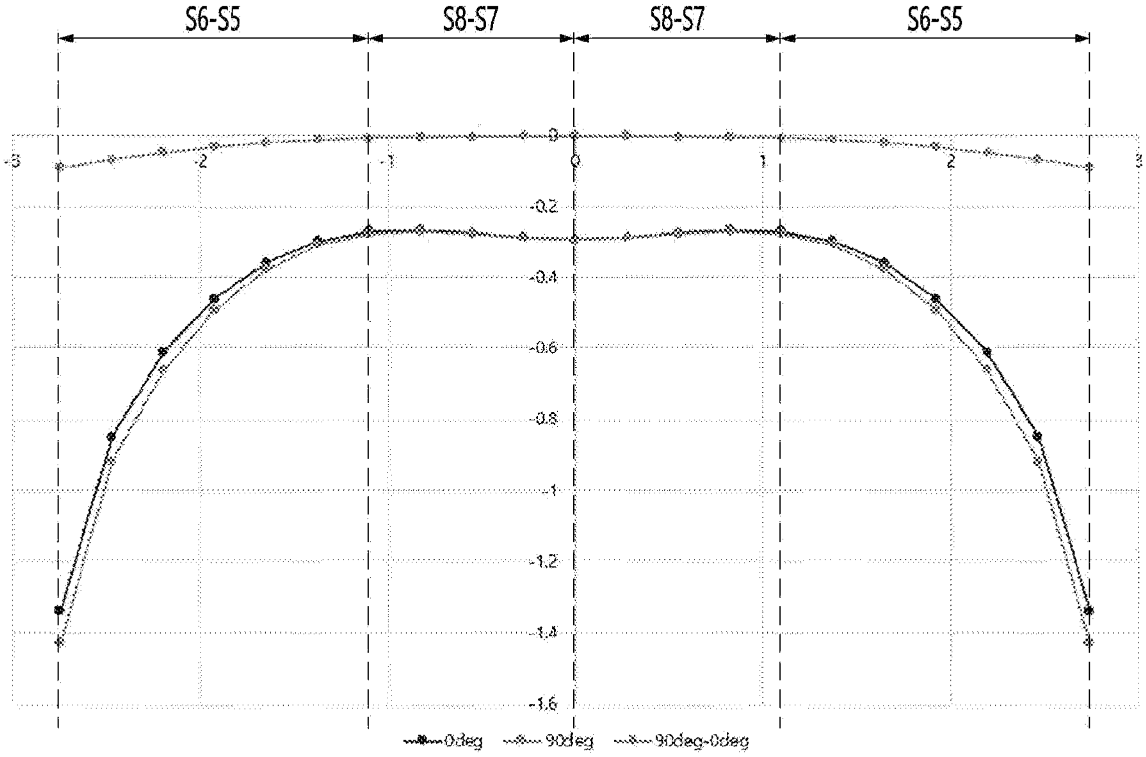

【FIG. 8】

| Distance from optical axis (mm) | Eleventh surface | | | | | |
|---|---|---|---|---|---|---|
| | 0° | 30° | 45° | 53° | 60° | 90° |
| -2.4 | -0.766651 | -0.654906 | -0.632792 | -0.646934 | -0.66733 | -0.725537 |
| -2.2 | -0.696379 | -0.629338 | -0.617444 | -0.628527 | -0.644363 | -0.693762 |
| -2.0 | -0.651799 | -0.613763 | 0.607563 | -0.615012 | -0.625647 | -0.660459 |
| -1.8 | -0.610441 | -0.589828 | -0.586611 | -0.591108 | -0.597578 | -0.619515 |
| -1.6 | -0.557961 | -0.547224 | -0.545554 | -0.548061 | -0.551718 | -0.564485 |
| -1.4 | -0.488566 | -0.483220 | -0.482403 | -0.483739 | -0.485702 | -0.492704 |
| -1.2 | -0.403549 | -0.401089 | -0.401789 | -0.401505 | -0.402534 | -0.406208 |
| -1.0 | -0.309090 | -0.308139 | -0.308152 | -0.308561 | -0.309101 | -0.310964 |
| -0.8 | -0.214008 | -0.213787 | -0.213947 | -0.214196 | -0.214483 | -0.215391 |
| -0.6 | -0.127820 | -0.127875 | -0.128049 | -0.128196 | -0.128342 | -0.128754 |
| -0.4 | -0.059251 | -0.059337 | -0.059447 | -0.059518 | -0.05958 | -0.059738 |
| -0.2 | -0.015187 | -0.015218 | -0.015251 | -0.01527 | -0.015286 | -0.015321 |
| 0(Optical axis) | 0 | 0 | 0 | 0 | 0 | 0 |
| 0.2 | -0.015187 | -0.015218 | -0.015251 | -0.01527 | -0.015286 | -0.015321 |
| 0.4 | 0.059251 | 0.059337 | -0.059447 | -0.059518 | -0.05958 | -0.059738 |
| 0.6 | 0.127820 | -0.127875 | -0.128049 | -0.128196 | -0.128342 | -0.128754 |
| 0.8 | 0.214008 | -0.213787 | -0.213947 | -0.214196 | -0.214483 | -0.215391 |
| 1.0 | 0.309090 | -0.308139 | -0.308152 | -0.308561 | -0.309101 | -0.3106964 |
| 1.2 | 0.403549 | -0.401089 | -0.401789 | -0.401505 | -0.402534 | -0.406208 |
| 1.4 | 0.488566 | -0.483220 | -0.482403 | -0.483739 | -0.485702 | -0.492704 |
| 1.6 | 0.557961 | -0.547224 | -0.545554 | -0.548061 | -0.551718 | -0.564485 |
| 1.8 | 0.610441 | -0.589828 | -0.586611 | -0.591108 | -0.597578 | -0.619515 |
| 2.0 | 0.651799 | -0.613763 | -0.607563 | -0.615012 | -0.625647 | -0.660459 |
| 2.2 | 0.696379 | -0.629338 | -0.617444 | -0.628527 | -0.6444363 | -0.693762 |
| 2.4 | 0.766651 | -0.654906 | -0.632792 | -0.646934 | -0.66733 | -0.725537 |

【FIG. 9】

| Distance from optical axis (mm) | Twelfth surface | | | | | |
|---|---|---|---|---|---|---|
| | 0° | 30° | 45° | 53° | 60° | 90° |
| -2.6 | -0.744835 | -0.511711 | -0.480004 | -0.530651 | -0.600219 | -0.822861 |
| -2.4 | -0.487606 | -0.369078 | -0.356145 | -0.385459 | -0.424862 | -0.551282 |
| -2.2 | -0.325841 | -0.26729 | -0.263153 | -0.280297 | -0.302864 | -0.375859 |
| -2.0 | -0.208072 | -0.179922 | -0.179436 | -0.189511 | -0.202527 | -0.245111 |
| -1.8 | -0.118339 | -0.105211 | -0.105993 | -0.111911 | -0.119416 | -0.144212 |
| -1.6 | -0.052789 | -0.046983 | -0.04808 | -0.051555 | -0.055854 | -0.070077 |
| -1.4 | -0.009409 | -0.007158 | -0.008258 | -0.010316 | -0.012762 | -0.020727 |
| -1.2 | 0.015083 | 0.015629 | 0.01462 | 0.01337 | 0.011978 | 0.007628 |
| -1.0 | 0.025084 | 0.024882 | 0.024011 | 0.023231 | 0.022431 - | 0.020101 |
| -0.8 | 0.025098 | 0.024669 | 0.023988 | 0.023501 | 0.023043 | 0.021818 |
| -0.6 | 0.019078 | 0.0187 | 0.018248 | 0.017966 | 0.017718 | 0.017108 |
| -0.4 | 0.010531 | 0.010317 | 0.01009 | 0.009958 | 0.009848 | 0.009592 |
| -0.2 | 0.003026 | 0.002966 | 0.002905 | 0.002871 | 0.002843 | 0.00278 |
| 0(Optical axis) | 0 | 0 | 0 | 0 | 0 | 0 |
| 0.2 | 0.003026 | 0.002966 | 0.002905 | 0.002871 | 0.002843 | 0.00278 |
| 0.4 | 0.010531 | 0.010317 | 0.01009 | 0.009958 | 0.009848 | 0.009592 |
| 0.6 | 0.019078 | 0.0187 | 0.018248 | 0.017966 | 0.017718 | 0.017108 |
| 0.8 | 0.025098 | 0.024669 | 0.023988 | 0.023501 | 0.023043 | 0.021818 |
| 1.0 | 0.025084 | 0.024882 | 0.024011 | 0.23231 | 0.022431 | 0.020101 |
| 1.2 | 0.015083 | 0.015629 | 0.01462 | 0.01337 | 0.011978 | 0.007628 |
| 1.4 | -0.009409 | -0.007158 | -0.008258 | -0.010316 | -0.012762 | -0.020727 |
| 1.6 | -0.052789 | -0.046983 | -0.04808 | -0.051555 | -0.055854 | -0.070077 |
| 1.8 | -0.118339 | -0.105211 | -0.105993 | -0.111911 | -0.119416 | -0.144212 |
| 2.0 | -0.208072 | -0.179922 | -0.179436 | -0.189511 | -0.202527 | -0.245111 |
| 2.2 | -0.325841 | -0.26729 | -0.263153 | -0.280297 | -0.302864 | -0.375859 |
| 2.4 | -0.487606 | -0.369078 | -0.356145 | -0.385459 | -0.424862 | -0.551282 |
| 2.6 | -0.744835 | -0.511711 | -0.480004 | -0.530651 | -0.600219 | -0.822861 |

【FIG. 10】
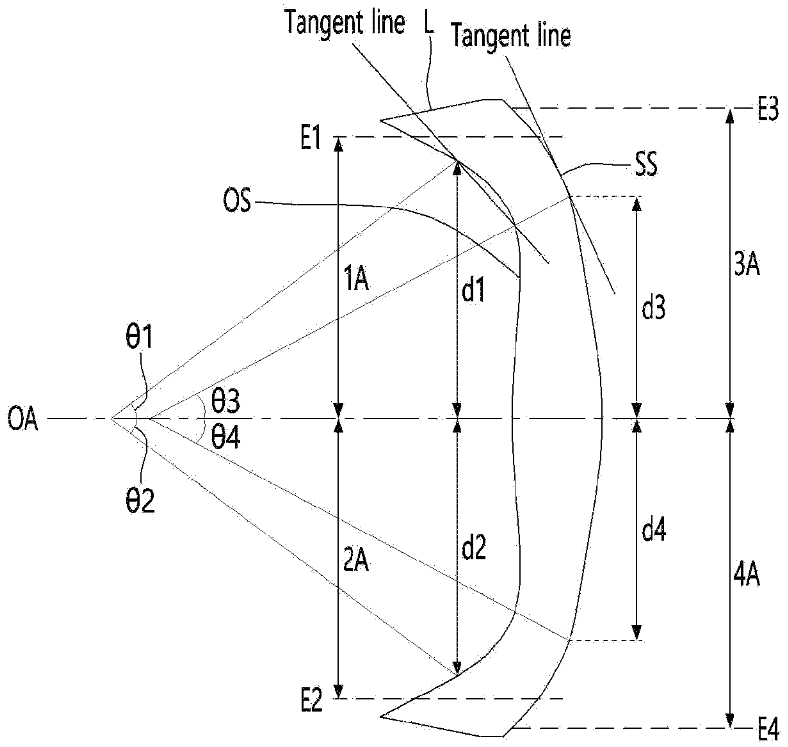

【FIG. 11】
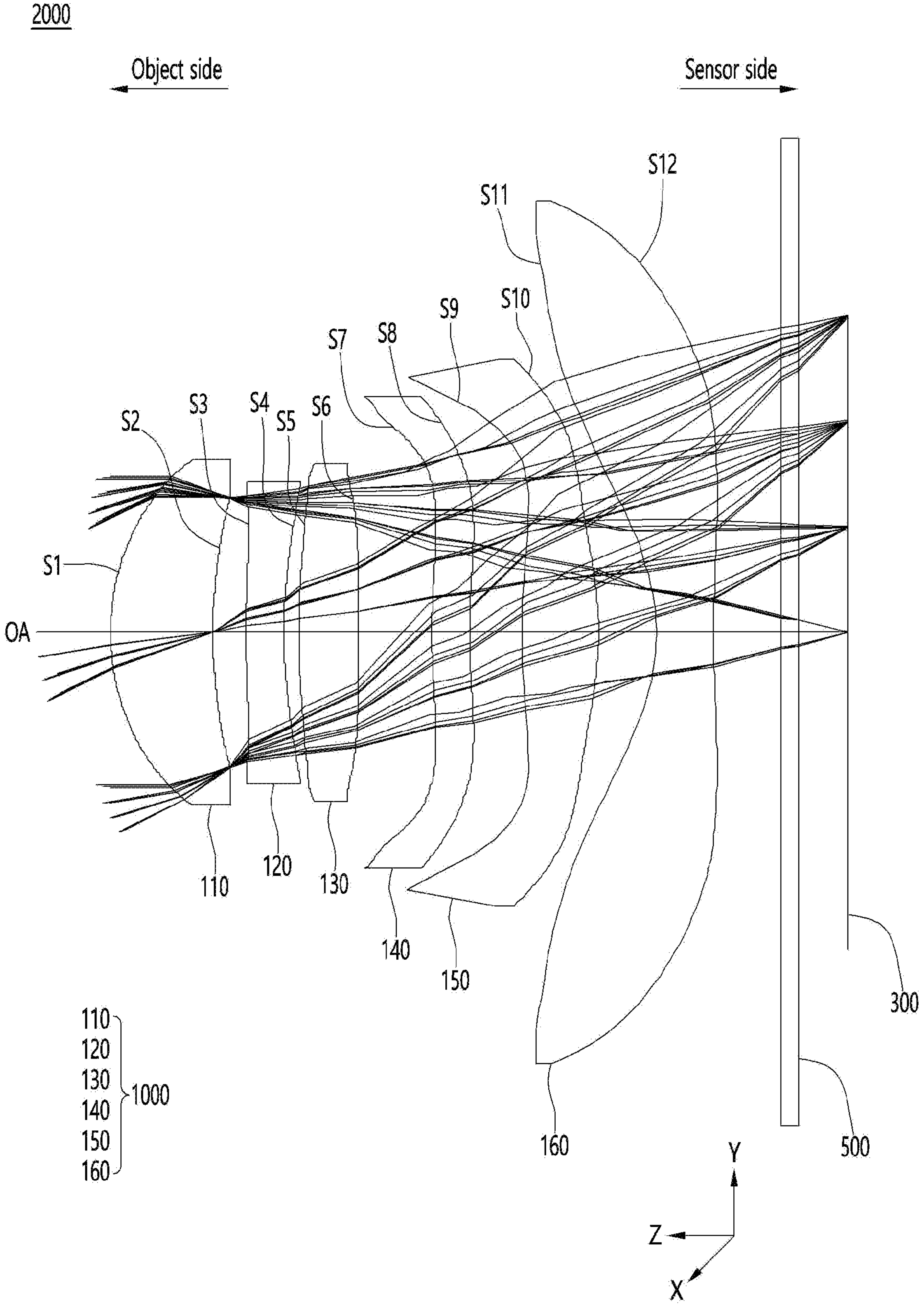

【FIG. 12】

| Lens | Surface | Radius of curvature (mm) | Thickness and distance(mm) | Refractive index | ABBE'S number |
|---|---|---|---|---|---|
| First lens | First surface | 1.500 | 0.624 | 1.535 | 55.710 |
| | Second surface | 3.315 | 0.202 | | |
| Second lens | Third surface | 5.295 | 0.230 | 1.680 | 18.440 |
| | Fourth surface | 2.884 | 0.093 | | |
| Third lens | Fifth surface | 4.941 | 0.366 | 1.535 | 55.710 |
| | Sixth surface | -43.132 | 0.443 | | |
| Fourth lens | Seventh surface | 3.602 | 0.230 | 1.680 | 18.440 |
| | Eighth surface | 3.228 | 0.321 | | |
| Fifth lens | Ninth surface | 4.800 | 0.470 | 1.567 | 37.550 |
| | Tenth surface | -2.218 | 0.353 | | |
| Sixth lens | Eleventh surface | -2.706 | 0.350 | 1.567 | 37.550 |
| | Twelfth surface | 2.334 | 0.407 | | |
| Filter | Thirteenth surface | Infinity | 0.110 | | |
| | Fourteenth surface | Infinity | 0.270 | | |
| Image sensor | Fifteenth surface | Infinity | 0.030 | | |

【FIG. 13】

| Size | Sixth lens | |
|---|---|---|
| | Eleventh surface(S11) | Twelfth surface(S12) |
| C1 | -0.189772 | -0.865714 |
| C2 | 0 | 0 |
| C3 | 0 | 0 |
| C4 | 0.0068409 | 0.0177792 |
| C5 | 0.0592243 | -0.523112 |
| C6 | 0 | 0 |
| C7 | 0 | 0 |
| C8 | 0 | 0 |
| C9 | 0 | 0 |
| C10 | 0 | 0 |
| C11 | -0.015746 | -0.03952 |
| C12 | -0.004792 | -0.009525 |
| C13 | 0.1689465 | -0.063452 |
| C14 | 0 | 0 |
| C15 | 0 | 0 |
| C16 | 0 | 0 |
| C17 | 0 | 0 |
| C18 | 0 | 0 |
| C19 | 0 | 0 |
| C20 | 0 | 0 |
| C21 | 0 | 0 |
| C22 | -0.00833 | -0.01867 |
| C23 | 0.0056121 | 0.006125 |
| C24 | -0.006943 | -0.016203 |
| C25 | -0.009752 | 0.0295465 |
| C26 | 0 | 0 |
| C27 | 0 | 0 |
| C28 | 0 | 0 |
| C29 | 0 | 0 |
| C30 | 0 | 0 |
| C31 | 0 | 0 |
| C32 | 0 | 0 |
| C33 | 0 | 0 |
| C34 | 0 | 0 |
| C35 | 0 | 0 |
| C36 | 0 | 0 |
| C37 | 0 | 0 |
| C38 | -0.001975 | -0.008784 |
| C39 | 0.0033971 | 0.0070497 |
| C40 | -0.003245 | -0.006411 |
| C41 | -0.028719 | -0.006629 |
| C42 | 0 | 0 |
| C43 | 0 | 0 |
| C44 | 0 | 0 |
| C45 | 0 | 0 |
| C46 | 0 | 0 |
| C47 | 0 | 0 |
| C48 | 0 | 0 |
| C49 | 0 | 0 |
| C50 | 0 | 0 |
| C51 | 0 | 0 |
| C52 | 0 | 0 |
| C53 | 0 | 0 |
| C54 | 0 | 0 |
| C55 | 0 | 0 |
| C56 | 0 | 0 |
| C57 | 0 | 0 |
| C58 | 0 | 0 |
| C59 | 0.0009915 | 0.0019178 |
| C60 | -0.000685 | -0.00033 |
| C61 | 0.0140013 | -0.00282 |
| C62 | 0 | 0 |
| C63 | 0 | 0 |
| C64 | 0 | 0 |
| C65 | 0 | 0 |
| C66 | 0 | 0 |

【FIG. 14】

Table 1. Standard Zernike Polynomials Terms

| Term | Standard Zernike Polynomial | Description |
|---|---|---|
| 1 | 1 | Piston (constant) |
| 2 | $R\cos\theta$ | Distortion - Tilt (x-axis) |
| 3 | $R\sin\theta$ | Distortion - Tilt (y-axis) |
| 4 | $R^2\cos(2\theta)$ | Astigmatism, Primary (axis at 0° or 90°) |
| 5 | $2R^2 - 1$ | Defocus - Field curvature |
| 6 | $R^2\sin(2\theta)$ | Astigmatism, Primary (axis at ±45°) |
| 7 | $R^3\cos(3\theta)$ | Trefoil, Primary (x-axis) |
| 8 | $(3R^3 - 2R)\cos\theta$ | Coma, Primary (x-axis) |
| 9 | $(3R^3 - 2R)\sin\theta$ | Coma, Primary (y-axis) |
| 10 | $R^3\sin(3\theta)$ | Trefoil, Primary (y-axis) |
| 11 | $R^4\cos(4\theta)$ | Tetrafoil, Primary (x-axis) |
| 12 | $(4R^4 - 3R^2)\cos(2\theta)$ | Astigmatism, Secondary (axis at 0° or 90°) |
| 13 | $6R^4 - 6R^2 + 1$ | Spherical Aberration, Primary |
| 14 | $(4R^4 - 3R^2)\sin(2\theta$ | Astigmatism, Secondary (axis at ±45°) |
| 15 | $R^4\sin(4\theta)$ | Tetrafoil, Primary (y-axis) |
| 16 | $R^5\cos(5\theta)$ | Pentafoil, Primary (x-axis) |
| 17 | $(5R^5 - 4R^3)\cos(3\theta)$ | Trefoil, Secondary (x-axis) |
| 18 | $(10R^5 - 12R^3 + 3R)\cos\theta$ | Coma, Secondary (x-axis) |
| 19 | $(10R^5 - 12R^3 + 3R)\sin\theta$ | Coma, Secondary (y-axis) |
| 20 | $(5R^5 - 4R^3)\sin(3\theta)$ | Trefoil, Secondary (y-axis) |
| 21 | $R^5\sin(5\theta)$ | Pentafoil, Primary (y-axis) |
| 22 | $R^6\cos(6\theta)$ | Hexafoil, Primary (x-axis) |

(a)

【FIG. 14】

| | | |
|---|---|---|
| 23 | $(6R^6 - 5R^4)\cos(4\theta)$ | Tetrafoil, Secondary (x-axis) |
| 24 | $(15R^6 - 20R^4 + 6R^2)\cos(2\theta)$ | Astigmatism, Tertiary (axis at 0° or 90°) |
| 25 | $20R^6 - 30R^4 + 12R^2 - 1$ | Spherical Aberration, Secondary |
| 26 | $(15R^6 - 20R^4 + 6R^2)\sin(2\theta)$ | Astigmatism, Tertiary (axis at ±45°) |
| 27 | $(6R^6 - 5R^4)\sin(4\theta)$ | Tetrafoil, Secondary (y-axis) |
| 28 | $R^6\sin(6\theta)$ | Hexafoil, Primary (y-axis) |
| 29 | $R^7\cos(7\theta)$ | Heptafoil, Primary (x-axis) |
| 30 | $(7R^7 - 6R^5)\cos(5\theta)$ | Pentafoil, Secondary (x-axis) |
| 31 | $(21R^7 - 30R^5 + 10R^3)\cos(3\theta)$ | Trefoil, Tertiary (x-axis) |
| 32 | $(35R^7 - 60R^5 + 30R^3 - 4R)\cos\theta$ | Coma, Tertiary (x-axis) |
| 33 | $(35R^7 - 60R^5 + 30R^3 - 4R)\sin\theta$ | Coma, Tertiary (y-axis) |
| 34 | $(21R^7 - 30R^5 + 10R^3)\sin(3\theta)$ | Trefoil, Tertiary (y-axis) |
| 35 | $(7R^7 - 6R^5)\sin(5\theta)$ | Pentafoil, Secondary (y-axis) |
| 36 | $R^7\sin(7\theta)$ | Heptafoil, Primary (y-axis) |
| 37 | $R^8\cos(8\theta)$ | Octafoil, Primary (x-axis) |
| 38 | $(8R^8 - 7R^6)\cos(6\theta)$ | Hexafoil, Secondary (x-axis) |
| 39 | $(28R^8 - 42R^6 + 15R^4)\cos(4\theta)$ | Tetrafoil, Tertiary (x-axis) |
| 40 | $(56R^8 - 105R^6 + 60R^4 - 10R^2)\cos(2\theta)$ | Astigmatism, Quaternary (axis at 0° or 90°) |
| 41 | $70R^8 - 140R^6 + 90R^4 - 20R^2 + 1$ | Spherical Aberration, Tertiary |
| 42 | $(56R^8 - 105R^6 + 60R^4 - 10R^2)\sin(2\theta)$ | Astigmatism, Quaternary (axis at ±45°) |
| 43 | $(28R^8 - 42R^6 + 15R^4)\sin(4\theta)$ | Tetrafoil, Tertiary (y-axis) |
| 44 | $(8R^8 - 7R^6)\sin(6\theta)$ | Hexafoil, Secondary (y-axis) |
| 45 | $R^8\sin(8\theta)$ | Octafoil, Primary (y-axis) |

(b)

【FIG. 14】

| | | |
|---|---|---|
| 46 | $R^9\cos(9\theta)$ | Nonafoil, Primary (x-axis) |
| 47 | $(9R^9 - 8R^7)\cos(7\theta)$ | Heptafoil, Secondary (x-axis) |
| 48 | $(36R^9 - 56R^7 + 21R^5)\cos(5\theta$ | Pentafoil, Tertiary (x-axis) |
| 49 | $(84R^9 - 168R^7 + 105R^5 - 20R^3)\cos(3\theta$ | Trefoil, Quaternary (x-axis) |
| 50 | $(126R^9 - 280R^7 + 210R^5 - 60R^3 + 5R)\cos\theta$ | Coma, Quaternary (x-axis) |
| 51 | $(126R^9 - 280R^7 + 210R^5 - 60R^3 + 5R)\sin\theta$ | Coma, Quaternary (y-axis) |
| 52 | $(84R^9 - 168R^7 + 105R^5 - 20R^3)\sin(3\theta)$ | Trefoil, Quaternary (y-axis) |
| 53 | $(36R^9 - 56R^7 + 21R^5)\sin(5\theta)$ | Pentafoil, Tertiary (y-axis) |
| 54 | $(9R^9 - 8R^7)\sin(7\theta)$ | Heptafoil, Secondary (y-axis) |
| 55 | $R^9\sin(9\theta)$ | Nonafoil, Primary (y-axis) |
| 56 | $R^{10}\cos(10\theta)$ | Decafoil, Primary (x-axis) |
| 57 | $(10R^{10} - 9R^8)\cos(8\theta)$ | Octafoil, Secondary (x-axis) |
| 58 | $(45R^{10} - 72R^8 + 28R^6)\cos(6\theta)$ | Hexafoil, Tertiary (x-axis) |
| 59 | $(120R^{10} - 252R^8 + 168R^6 - 35R^4)\cos(4\theta)$ | Tetrafoil, Quaternary (x-axis) |
| 60 | $(210R^{10} - 504R^8 + 420R^6 - 140R^4 + 15R^2)\cos(2\theta)$ | Astigmatism, Quinternary (axis at 0° or 90°) |
| 61 | $252R^{10} - 630R^8 + 560R^6 - 210R^4 + 30R^2 - 1$ | Spherical Aberration, Quaternary |
| 62 | $(210R^{10} - 504R^8 + 420R^6 - 140R^4 + 15R^2)\sin(2\theta)$ | Astigmatism, Quinternary (axis at ±45°) |
| 63 | $(120R^{10} - 252R^8 + 168R^6 - 35R^4)\sin(4\theta)$ | Tetrafoil, Quaternary (y-axis) |
| 64 | $(45R^{10} - 72R^8 + 28R^6)\sin(6\theta)$ | Hexafoil, Tertiary (y-axis) |
| 65 | $(10R^{10} - 9R^8)\sin(8\theta)$ | Octafoil, Secondary (y-axis) |
| 66 | $R^{10}\sin(10\theta)$ | Decafoil, Primary (y-axis) |

(c)

【FIG. 15】

| | First embodiment |
|---|---|
| Aperture position | Between fisrt and second lenses |
| FOV(θ) | 79.7 ° |
| F | 2.0 |
| TTL | 4.5 mm |
| ImgH | 6.564 mm |
| EFL | 3.7969 |
| EPD | 1.89845 |
| f1 | 4.5534 |
| f2 | -9.5626 |
| f3 | 8.2758 |
| f4 | -60.2414 |
| f5 | 2.649242 |
| f6 | -1.870894 |

【FIG. 16】

| Distance from optical axis (mm) | Slope angle(°) | | | | | | | | | | | | | |
|---|---|---|---|---|---|---|---|---|---|---|---|---|---|---|
| | Surface | Second surface | Third surface | Fourth surface | Fifth surface | Sixth surface | Seventh surface | Eighth surface | Ninth surface | Tenth surface | Eleventh surface-X | Eleventh surface-Y | Twelfth surface-X | Twelfth surface-Y |
| 0(Optical axis) | 0 | 0 | 0 | 0 | 0 | 0 | 0 | 0 | 0 | 0 | 0 | 0 | 0 | 0 |
| 0.2 | 7.65765 | 3.43248 | 1.88841 | 3.77427 | 2.27492 | -0.36129 | 2.75806 | 3.04918 | 2.25841 | -5.10255 | -8.56511 | -8.63785 | 1.649547 | 1.510749 |
| 0.4 | 15.5126 | 6.66998 | 2.27863 | 6.45368 | 4.20897 | -1.27084 | 3.54498 | 3.63896 | 3.90998 | -8.69791 | -15.9794 | -16.0910 | 2.474225 | 2.222751 |
| 0.6 | 23.8845 | 9.77298 | 0.298646 | 7.67418 | 4.87613 | -3.50617 | 1.40024 | 0.612527 | 4.31369 | -9.72196 | -21.4814 | -21.5946 | 2.249932 | 1.915214 |
| 0.8 | 33.5666 | 14.2954 | -3.66681 | 9.64652 | 3.69457 | -8.93568 | -4.88239 | -6.4369 | 0.776972 | -8.61569 | -24.7490 | -24.8543 | 1.03391 | 0.613495 |
| 1.0 | 48.0391 | | | | | -5.5123 | -20.2273 | -17.4528 | -14.0423 | -10.2637 | -25.7237 | -25.8581 | -1.22980 | -1.80292 |
| 1.2 | | | | | | | -37.4231 | -28.3435 | -39.3693 | -19.0452 | -24.4795 | -24.7315 | -4.70813 | -5.57440 |
| 1.4 | | | | | | | | -37.4231 | -59.5325 | -30.5235 | -21.2826 | -21.7638 | -9.44319 | -10.7765 |
| 1.6 | | | | | | | | | | -41.2909 | -16.8646 | -17.5779 | -15.1232 | -17.0345 |
| 1.8 | | | | | | | | | | -52.0506 | -12.7534 | -13.2671 | -21.1416 | -23.5771 |
| 2.0 | | | | | | | | | | | -11.2663 | -10.1675 | -27.1601 | -29.8703 |
| 2.2 | | | | | | | | | | | -14.8760 | -9.06432 | -34.0621 | -36.6320 |
| 2.4 | | | | | | | | | | | -24.7028 | -8.89873 | -44.4459 | -46.3891 |
| 2.6 | | | | | | | | | | | | | -59.4621 | -60.5779 |

【FIG. 17】

| Distance (mm) | Lens spacing (mm) | | | | |
|---|---|---|---|---|---|
| | First lens/Second lens | Second lens/Third lens | Third lens/Fourth lens | Fourth lens/Fifth lens | Fifth lens/Sixth lens |
| 0(Optical axis) | 0.202 | 0.0933 | 0.4433 | 0.3207 | 0.353062 |
| 0.2 | 0.199513 | 0.0905448 | 0.449019 | 0.319 | 0.347036 |
| 0.4 | 0.189661 | 0.0837131 | 0.463398 | 0.317383 | 0.327807 |
| 0.6 | 0.165964 | 0.0750966 | 0.480715 | 0.323757 | 0.292538 |
| 0.8 | 0.119137 | 0.0605986 | 0.496917 | 0.343604 | 0.238815 |
| 1.0 | | | 0.493686 | 0.366198 | 0.17512 |
| 1.2 | | | | 0.350017 | 0.131138 |
| 1.4 | | | | 0.232389 | 0.138942 |
| 1.6 | | | | | 0.215482 |
| 1.8 | | | | | 0.374706 |

【FIG. 18】

| Distance (mm) | Lens thickness (mm) | | | | | |
|---|---|---|---|---|---|---|
| | First lens | Second lens | Third lens | Fourth lens | Fifth lens | Lens |
| 0(Optical axis) | 0.6244 | 0.23 | 0.3657 | 0.23 | 0.4702 | 0.349967 |
| 0.2 | 0.617033 | 0.233233 | 0.361142 | 0.23058 | 0.456987 | 0.368181 |
| 0.4 | 0.593822 | 0.243675 | 0.347018 | 0.231444 | 0.421139 | 0.419749 |
| 0.6 | 0.551194 | 0.263599 | 0.322792 | 0.230435 | 0.3729 | 0.496865 |
| 0.8 | 0.483582 | 0.298422 | 0.287101 | 0.225881 | 0.329572 | 0.589073 |
| 1.0 | 0.445048 | | | 0.225358 | 0.317037 | 0.684142 |
| 1.2 | | | | 0.271235 | 0.36893 | 0.768599 |
| 1.4 | | | | | 0.520719 | 0.829124 |
| 1.6 | | | | | | 0.855139 |
| 1.8 | | | | | | 0.842069 |
| 2.0 | | | | | | 0.793694 |
| 2.2 | | | | | | 0.720506 |
| 2.4 | | | | | | 0.629012 |

【FIG. 19】

| Distance from optical axis (mm) | Sag(mm) | | | | | | | | | | | | | |
|---|---|---|---|---|---|---|---|---|---|---|---|---|---|---|
| | First surface | Second surface | Third surface | Fourth surface | Fifth surface | Sixth surface | Seventh surface | Eighth surface | Ninth surface | Tenth surface | Eleventh surface-X | Eleventh surface-Y | Twelfth surface-X | Twelfth surface-Y |
| 0(Optical axis) | 0 | 0 | 0 | 0 | 0 | 0 | 0 | 0 | 0 | 0 | 0 | 0 | 0 | 0 |
| 0.2 | 0.013386 | 0.006019 | 0.003533 | 0.006766 | 0.004010 | -0.00054 | 0.005171 | 0.005752 | 0.004051 | -0.00916 | -0.015187 | -0.015321 | 0.003026 | 0.00278 |
| 0.4 | 0.054349 | 0.023771 | 0.011423 | 0.025108 | 0.015521 | -0.00316 | 0.016936 | 0.018381 | 0.015064 | -0.03399 | -0.059251 | -0.059738 | 0.010531 | 0.009592 |
| 0.6 | 0.125851 | 0.052644 | 0.016609 | 0.050208 | 0.032005 | -0.01090 | 0.026512 | 0.026947 | 0.030004 | -0.06729 | -0.12782 | -0.128754 | 0.019078 | 0.017108 |
| 0.8 | 0.235023 | 0.094205 | 0.011343 | 0.079765 | 0.047064 | -0.03153 | 0.022082 | 0.017963 | 0.040867 | -0.09976 | -0.214008 | -0.215391 | 0.025098 | 0.021818<br>1 |
| 1.0 | 0.404447 | | | | | -0.06922 | -0.01884 | -0.02348 | 0.022015 | -0.13114 | -0.30909 | -0.310964 | 0.025084 | 0.020101 |
| 1.2 | | | | | | | -0.15090 | -0.10967 | -0.08035 | -0.18162 | -0.403549 | -0.406208 | 0.0151 | 0.007628 |
| 1.4 | | | | | | | | -0.23665 | -0.32496 | -0.27444 | -0.488566 | -0.4927 | -0.0094 | -0.020727 |
| 1.6 | | | | | | | | | | -0.42038 | -0.557961 | -0.5645 | -0.0528 | -0.070077 |
| 1.8 | | | | | | | | | | -0.63208 | -0.610441 | -0.6195 | -0.1183 | -0.144212 |
| 2.0 | | | | | | | | | | | -0.651799 | -0.6605 | -0.2081 | -0.245111 |
| 2.2 | | | | | | | | | | | -0.696379 | -0.6938 | -0.3258 | -0.375859 |
| 2.4 | | | | | | | | | | | -0.766651 | -0.7255 | -0.4876 | -0.551282 |
| 2.6 | | | | | | | | | | | | | -0.7448 | -0.822861 |

【FIG. 20】

| | First surface | Second surface | Third surface | Fourth surface | Fifth surface | Sixth surface | Seventh surface | Eighth surface | Ninth surface | Tenth surface | Eleventh surface | Twelfth surface |
|---|---|---|---|---|---|---|---|---|---|---|---|---|
| K= | 0.3950 | -3.6836 | -99.0000 | -2.4638 | -29.8810 | -99.0000 | -99.0000 | -39.4033 | -99.0000 | -0.5911 | - | - |
| A4= | -0.0216 | 0.0094 | -0.0762 | -0.068 | 0.0077 | -0.0529 | 0.0035 | -0.1469 | 0.033442 | 0.1574 | - | - |
| A6= | 0.0815 | -0.2908 | 0.0489 | -0.0551 | -0.0415 | 0.0048 | -0.3412 | 0.0790 | -0.08234 | -0.1061 | - | - |
| A8= | -0.3443 | 2.4998 | -0.8118 | 0.8361 | 0.0957 | 0.1171 | 0.7455 | -0.2244 | 0.053670 | 0.2751 | - | - |
| A10= | 0.7823 | -12.1618 | 3.8099 | -4.2954 | -0.9607 | -0.7149 | -0.8964 | 0.4952 | -0.04775 | -0.4573 | - | - |
| A12= | -0.9317 | 36.5500 | -9.0692 | 13.3106 | 3.2891 | 1.5801 | 0.4721 | -0.6546 | -0.04463 | 0.3683 | - | - |
| A14= | 0.3886 | -68.3991 | 12.2576 | -24.5979 | -5.9099 | -2.0335 | 0.0692 | 0.5092 | 0.073963 | -0.1649 | - | - |
| A16= | 0.3204 | 77.8141 | -8.8027 | 26.9118 | 6.0696 | 1.6362 | -0.2310 | -0.2281 | -0.03229 | -0.0424 | - | - |
| A18= | -0.4188 | -49.2419 | 2.4230 | -16.1323 | -3.2825 | -0.7715 | 0.1129 | 0.0547 | 0.004687 | -0.0059 | - | - |
| A20= | 0.1355 | 13.3029 | 0.1658 | 4.0814 | 0.7242 | 0.1768 | -0.00183 | -0.0055 | 0.0000 | 0.0003 | - | - |

【FIG. 21】
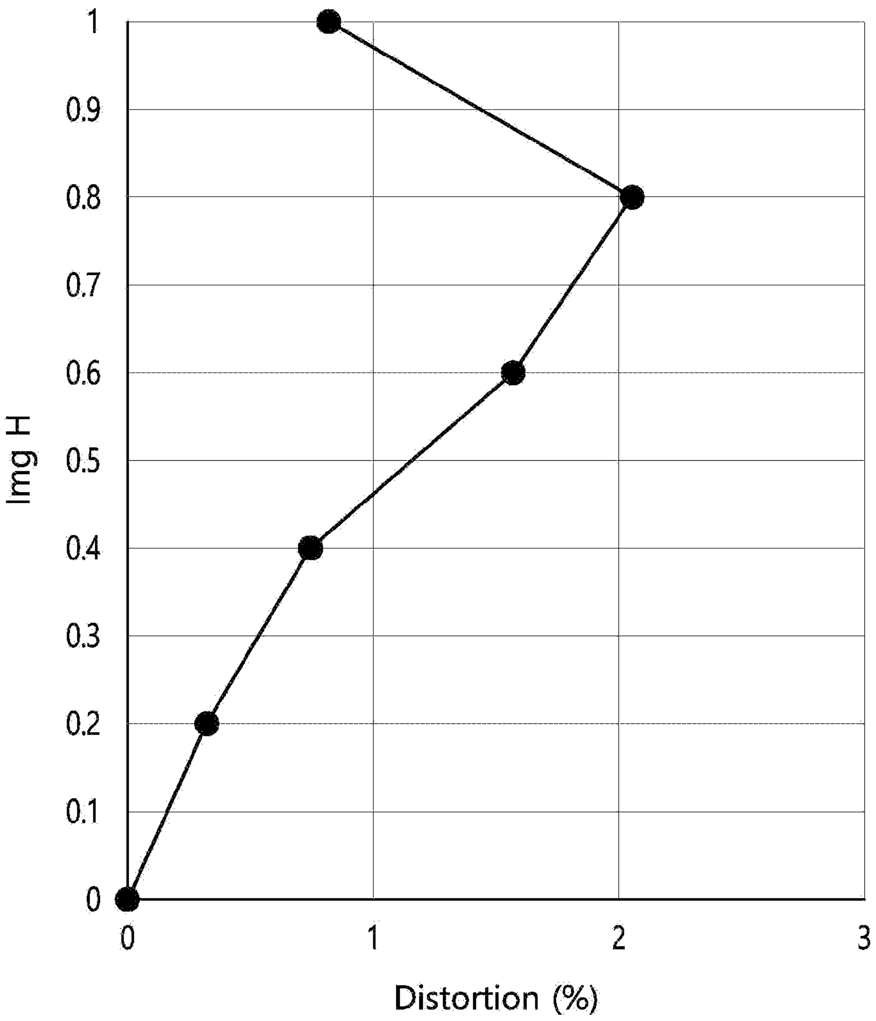

【FIG. 22】

| Frequency | 0F | | 0.2F | | 0.4F | | 0.6F | | 0.8F | | 1.0F | |
|---|---|---|---|---|---|---|---|---|---|---|---|---|
| | RAD | TAN | RAD | TAN | RAD | TAN | RAD | TAN | RAD | TAN | RAD | TAN |
| 0 | 0.999 | 0.999 | 0.999 | 0.999 | 0.999 | 0.999 | 0.999 | 0.999 | 0.999 | 0.999 | 0.999 | 0.999 |
| 11 | 0.983 | 0.983 | 0.981 | 0.981 | 0.980 | 0.981 | 0.976 | 0.978 | 0.971 | 0.974 | 0.967 | 0.968 |
| 22 | 0.964 | 0.964 | 0.957 | 0.958 | 0.955 | 0.957 | 0.946 | 0.950 | 0.934 | 0.941 | 0.820 | 0.923 |
| 33 | 0.943 | 0.943 | 0.928 | 0.930 | 0.928 | 0.931 | 0.910 | 0.918 | 0.893 | 0.903 | 0.865 | 0.868 |
| 44 | 0.920 | 0.920 | 0.896 | 0.899 | 0.897 | 0.903 | 0.871 | 0.883 | 0.850 | 0.864 | 0.807 | 0.812 |
| 55 | 0.896 | 0.893 | 0.862 | 0.866 | 0.863 | 0.872 | 0.828 | 0.844 | 0.805 | 0.821 | 0.747 | 0.752 |
| 66 | 0.871 | 0.871 | 0.827 | 0.831 | 0.828 | 0.840 | 0.784 | 0.804 | 0.763 | 0.780 | 0.690 | 0.696 |
| 77 | 0.844 | 0.844 | 0.791 | 0.796 | 0.791 | 0.806 | 0.738 | 0.761 | 0.720 | 0.737 | 0.632 | 0.640 |
| 88 | 0.817 | 0.817 | 0.753 | 0.758 | 0.753 | 0.771 | 0.693 | 0.720 | 0.679 | 0.693 | 0.583 | 0.587 |
| 99 | 0.789 | 0.790 | 0.718 | 0.723 | 0.715 | 0.736 | 0.649 | 0.677 | 0.639 | 0.651 | 0.535 | 0.537 |
| 110 | 0.761 | 0.762 | 0.680 | 0.686 | 0.676 | 0.701 | 0.605 | 0.636 | 0.600 | 0.608 | 0.493 | 0.491 |

【FIG. 23】
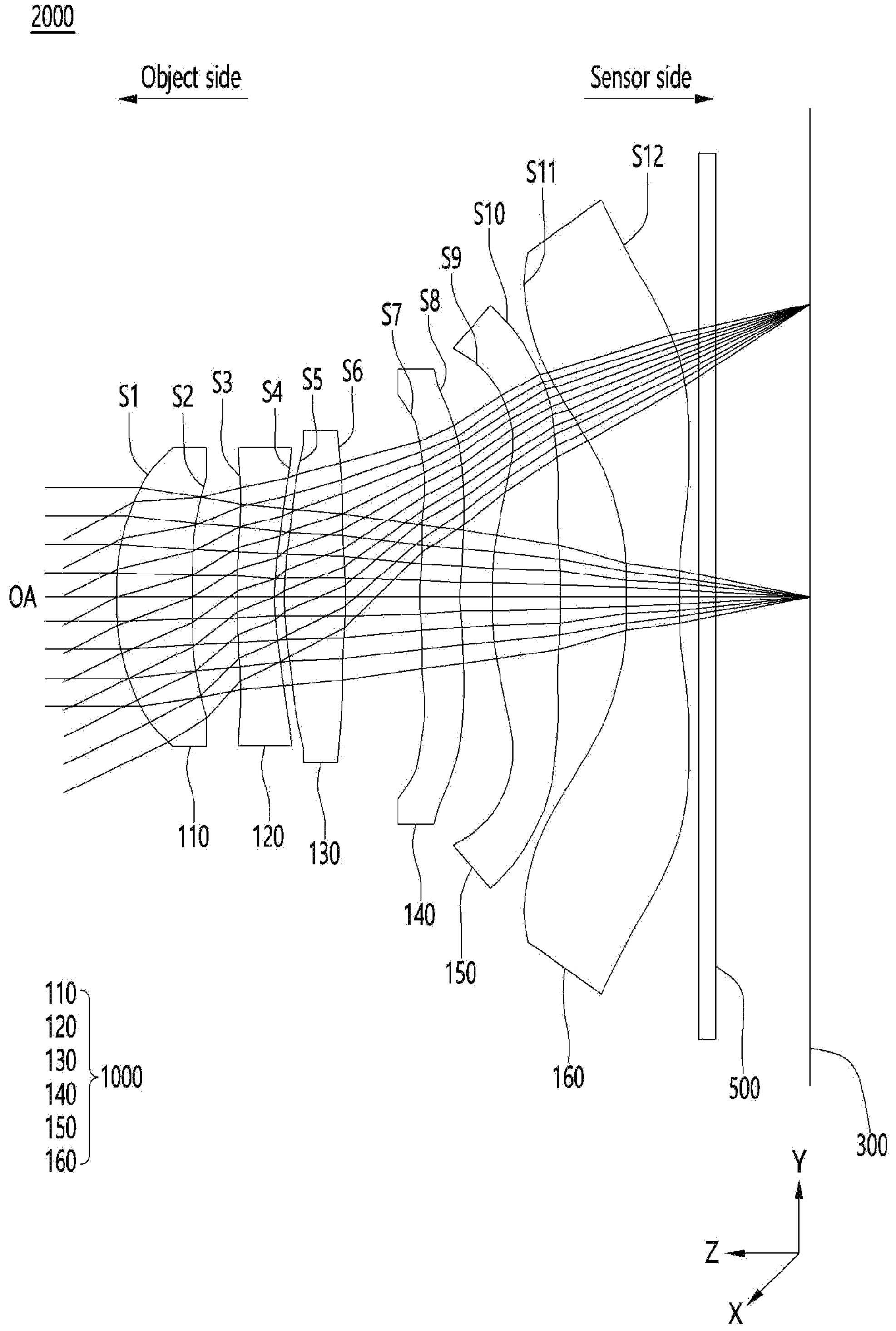

【FIG. 24】

| Lens | Surface | Radius of curvature (mm) | Thickness and distance(mm) | Refractive index | ABBE'S number |
|---|---|---|---|---|---|
| First lens | First surface | 1.4828 | 0.6357 | 1.5106 | 56.2 |
| | Second surface | 3.2430 | 0.1927 | | |
| Second lens | Third surface | 5.3580 | 0.2300 | 1.6800 | 18.4 |
| | Fourth surface | 2.8637 | 0.0908 | | |
| Third lens | Fifth surface | 4.6754 | 0.3662 | 1.5151 | 53.9 |
| | Sixth surface | -46.8315 | 0.4375 | | |
| Fourth lens | Seventh surface | 3.6448 | 0.2300 | 1.6793 | 18.5 |
| | Eighth surface | 3.4291 | 0.3433 | | |
| Fifth lens | Ninth surface | 5.434268232 | 0.4539 | 1.6067 | 26.8 |
| | Tenth surface | -2.1584 | 0.3454 | | |
| Sixth lens | Eleventh surface | -3.379335357 | 0.3500 | 1.6030 | 27.0 |
| | Twelfth surface | 2.691926285 | 0.0809 | | |
| Filter | Thirteenth surface | Infinity | 0.2100 | | |
| | Fourteenth surface | Infinity | 0.5137 | | |
| Image sensor | Fifteenth surface | Infinity | 0.0200 | | |

【FIG. 25】

| Size | Sixth lens | |
|---|---|---|
| | Eleventh surface(S11) | Twelfth surface(S12) |
| C1 | -0.174298 | -0.858643 |
| C2 | 0 | 0 |
| C3 | 0 | 0 |
| C4 | 0.006273 | 0.0399911 |
| C5 | 0.0938695 | -0.633589 |
| C6 | 0 | 0 |
| C7 | 0 | 0 |
| C8 | 0 | 0 |
| C9 | 0 | 0 |
| C10 | 0 | 0 |
| C11 | -0.041399 | -0.107059 |
| C12 | -0.002402 | 0.0116862 |
| C13 | 0.1447815 | -0.059677 |
| C14 | 0 | 0 |
| C15 | 0 | 0 |
| C16 | 0 | 0 |
| C17 | 0 | 0 |
| C18 | 0 | 0 |
| C19 | 0 | 0 |
| C20 | 0 | 0 |
| C21 | 0 | 0 |
| C22 | -0.006721 | -0.01516 |
| C23 | -0.005587 | -0.035392 |
| C24 | -0.004516 | -0.001413 |
| C25 | -0.047551 | 0.0022166 |
| C26 | 0 | 0 |
| C27 | 0 | 0 |
| C28 | 0 | 0 |
| C29 | 0 | 0 |
| C30 | 0 | 0 |
| C31 | 0 | 0 |
| C32 | 0 | 0 |
| C33 | 0 | 0 |
| C34 | 0 | 0 |
| C35 | 0 | 0 |
| C36 | 0 | 0 |
| C37 | 0 | 0 |
| C38 | -0.000843 | -0.003941 |
| C39 | 0.0010301 | -0.007354 |
| C40 | -0.002259 | -0.002273 |
| C41 | 0.002425 | -0.007812 |
| C42 | 0 | 0 |
| C43 | 0 | 0 |
| C44 | 0 | 0 |
| C45 | 0 | 0 |
| C46 | 0 | 0 |
| C47 | 0 | 0 |
| C48 | 0 | 0 |
| C49 | 0 | 0 |
| C50 | 0 | 0 |
| C51 | 0 | 0 |
| C52 | 0 | 0 |
| C53 | 0 | 0 |
| C54 | 0 | 0 |
| C55 | 0 | 0 |
| C56 | 0 | 0 |
| C57 | 0 | 0 |
| C58 | 0 | 0 |
| C59 | 0.0002649 | -0.001134 |
| C60 | -4.32E-05 | -2.51E-07 |
| C61 | -0.000228 | -0.011578 |
| C62 | 0 | 0 |
| C63 | 0 | 0 |
| C64 | 0 | 0 |
| C65 | 0 | 0 |
| C66 | 0 | 0 |

【FIG. 26】

| | Second embodiment |
|---|---|
| Aperture position | 1, 2 |
| FOV(θ) | 79.7 ° |
| F | 2.0 |
| TTL | 4.5001 ㎜ |
| ImgH | 6.564 ㎜ |
| EFL | 3.8051 |
| EPD | 1.90255 |
| f1 | 4.5166 |
| f2 | -9.2748 |
| f3 | 7.9345 |
| f4 | -148.8756 |
| f5 | 2.767448 |
| f6 | -1.863032 |

【FIG. 27】

| Distance from optical axis (mm) | Slope angle(°) | | | | | | | | | | | | | |
|---|---|---|---|---|---|---|---|---|---|---|---|---|---|---|
| | surface | Second surface | Third surface | Fourth surface | Fifth surface | Sixth surface | Seventh surface | Eighth surface | Ninth surface | Tenth surface | Eleventh surface-X | Eleventh surface-Y | Twelfth surface-X | Twelfth surface-Y |
| 0(Optical axis) | 0 | 0 | 0 | 0 | 0 | 0 | 0 | 0 | 0 | 0 | 0 | 0 | 0 | 0 |
| 0.2 | 7.75353 | 3.50625 | 1.85991 | 3.78736 | 2.39008 | -0.34662 | 2.73793 | 2.88498 | 2.00712 | -5.03105 | -5.54883 | -8.61135 | 1.702036 | 1.580936 |
| 0.4 | 15.7175 | 6.83335 | 2.20731 | 6.44182 | 4.38527 | -1.24126 | 3.5572 | 3.46841 | 3.49751 | -8.59898 | -15.8904 | -15.9810 | 2.639792 | 2.421056 |
| 0.6 | 24.2307 | 10.069 | 0.218476 | 7.74533 | 5.17389 | -3.42106 | 1.41431 | 0.548524 | 3.73365 | -9.71481 | -21.2511 | -21.3326 | 2.622358 | 2.335828 |
| 0.8 | 34.1237 | 14.8546 | -3.73491 | 10.1206 | 4.22976 | -8.66725 | -5.14828 | -6.46527 | 0.02149 | -8.75953 | -24.3399 | -24.4057 | 1.691865 | 1.345107 |
| 1.0 | 49.0368 | | | | | -5.05979 | -21.2213 | -17.8885 | -14.928 | -10.373 | -25.1485 | -25.2440 | -0.28663 | -0.74121 |
| 1.2 | | | | | | | -45.7528 | -28.9666 | -40.7163 | -18.9895 | -23.8007 | -24.0341 | -3.60068 | -4.28943 |
| 1.4 | | | | | | | | -37.4294 | -60.2526 | -30.3197 | -20.5814 | -21.0957 | -8.38057 | -9.49790 |
| 1.6 | | | | | | | | | | -41.0446 | -16.1488 | -16.9889 | -14.2618 | -15.9956 |
| 1.8 | | | | | | | | | | -52.7644 | -11.8208 | -12.5934 | -20.3835 | -22.7879 |
| 2.0 | | | | | | | | | | | --9.70434 | -8.99311 | -26.0452 | -28.9181 |
| 2.2 | | | | | | | | | | | -12.5505 | -7.12818 | -31.9405 | -34.6587 |
| 2.4 | | | | | | | | | | | -23.0613 | -7.36635 | -41.2994 | -42.6497 |
| 2.6 | | | | | | | | | | | | | -57.0204 | -56.2829 |

【FIG. 28】

| Distance (mm) | Lens spacing (mm) | | | | |
|---|---|---|---|---|---|
| | First lens/Second lens | Second lens/Third lens | Third lens/Fourth lens | Fourth lens/Fifth lens | Fifth lens/Sixth lens |
| 0(Optical axis) | 0.192745 | 0.090784 | 0.437492 | 0.3433 | 0.345374 |
| 0.2 | 0.190081 | 0.088208 | 0.443132 | 0.34146 | 0.339238 |
| 0.4 | 0.179642 | 0.081895 | 0.457413 | 0.3393 | 0.319854 |
| 0.6 | 0.154872 | 0.07402 | 0.474636 | 0.34438 | 0.284961 |
| 0.8 | 0.106296 | 0.060192 | 0.489945 | 0.36194 | 0.232818 |
| 1.0 | | | 0.48317 | 0.38241 | 0.171766 |
| 1.2 | | | | 0.3636 | 0.130561 |
| 1.4 | | | | 0.23722 | 0.140689 |
| 1.6 | | | | | 0.218495 |
| 1.8 | | | | | 0.381907 |

【FIG. 29】

| Distance (mm) | Lens thickness (mm) | | | | | |
|---|---|---|---|---|---|---|
| | First lens | Second lens | Third lens | Fourth lens | Fifth lens | Sixth lens |
| 0(Optical axis) | 0.63568 | 0.23 | 0.36621 | 0.23 | 0.453906 | 0.35 |
| 0.2 | 0.62828 | 0.233314 | 0.361467 | 0.230306 | 0.441284 | 0.368276 |
| 0.4 | 0.604933 | 0.243936 | 0.346896 | 0.230563 | 0.406945 | 0.42003 |
| 0.6 | 0.562024 | 0.26418 | 0.322058 | 0.229046 | 0.360655 | 0.497452 |
| 0.8 | 0.493843 | 0.300089 | 0.285479 | 0.224706 | 0.319439 | 0.590127 |
| 1.0 | 0.479269 | | | 0.225759 | 0.309206 | 0.685894 |
| 1.2 | | | | 0.274389 | 0.366285 | 0.771299 |
| 1.4 | | | | | 0.528451 | 0.832873 |
| 1.6 | | | | | | 0.859675 |
| 1.8 | | | | | | 0.846674 |
| 2.0 | | | | | | 0.797609 |
| 2.2 | | | | | | 0.724563 |
| 2.4 | | | | | | 0.639719 |

【FIG. 30】

| Distance from optical axis (mm) | Sag( ㎜) | | | | | | | | | | | | | |
|---|---|---|---|---|---|---|---|---|---|---|---|---|---|---|
| | First surface | Second surface | Third surface | Fourth surface | Fifth surface | Sixth surface | Seventh surface | Eighth surface | Ninth surface | Tenth surface | Eleventh surface-X | Eleventh surface-Y | Twelfth surface-X | Twelfth surface-Y |
| 0(Optical axis) | 0 | 0 | 0 | 0 | 0 | 0 | 0 | 0 | 0 | 0 | 0 | 0 | 0 | 0 |
| 0.2 | 0.013551 | 0.00615 | 0.003487 | 0.006802 | 0.004226 | -0.00052 | 0.005122 | 0.005429 | 0.00359 | -0.00903 | -0.01516 | -0.015285 | 0.003108 | 0.002893 |
| 0.4 | 0.055058 | 0.024311 | 0.011209 | 0.025154 | 0.016256 | -0.00306 | 0.016863 | 0.017426 | 0.013421 | -0.03354 | -0.05906 | -0.059471 | 0.010969 | 0.010151 |
| 0.6 | 0.12764 | 0.053984 | 0.016111 | 0.050291 | 0.033527 | -0.01063 | 0.026519 | 0.025565 | 0.026642 | -0.6661 | -0.12702 | -0.127777 | 0.020429 | 0.01872 |
| 0.8 | 0.238851 | 0.097014 | 0.010566 | 0.080655 | 0.050063 | -0.03067 | 0.21785 | 0.016492 | 0.035132 | -0.09934 | -0.21189 | -0.212944 | 0.028235 | 0.025423 |
| 1.0 | 0.41289 | | | | | -0.06709 | -0.02142 | -0.02566 | 0.013447 | -0.13125 | -0.30486 | -0.30623 | 0.031033 | 0.026847 |
| 1.2 | | | | | | | -0.15888 | -0.11449 | -0.09419 | -0.18182 | -0.39663 | -0.398645 | 0.0247 | 0.018534 |
| 1.4 | | | | | | | | -0.24256 | -0.34865 | -0.27411 | -0.47879 | -0.4823 | 0.0041 | -0.00519 |
| 1.6 | | | | | | | | | | -0.47857 | -0.54545 | -0.5516 | -0.0.358 | -0.05022 |
| 1.8 | | | | | | | | | | -0.63151 | -0.59497 | -0.6044 | -0.0983 | -0.1208 |
| 2.0 | | | | | | | | | | | -0.63194 | -0.6421 | -0.1843 | -0.21814 |
| 2.2 | | | | | | | | | | | -0.66934 | -0.6698 | -0.2948 | -0.34206 |
| 2.4 | | | | | | | | | | | -0.73105 | -0.6947 | -0.4413 | 0.50038 |
| 2.6 | | | | | | | | | | | | | -0.6726 | -0.73298 |

【FIG. 31】

| | First surface | Second surface | Third surface | Fourth surface | Fifth surface | Sixth surface | Seventh surface | Eighth surface | Ninth surface | Tenth surface | Eleventh surface | Twelfth surface |
|---|---|---|---|---|---|---|---|---|---|---|---|---|
| K= | 0.3949 | -3.2767 | -99.0000 | -2.3378 | -28.9619 | -28.9619 | -99.0000 | -99.0000 | -99.0000 | -0.3693 | - | - |
| A4= | -0.0159 | 0.0042 | -0.0778 | 0.1062 | 0.0020 | -0.0590 | 0.0058 | -0.1523 | 0.016505 | 0.1587 | - | - |
| A6= | 0.0231 | -0.2296 | -0.0230 | -0.0459 | -0.0280 | 0.0645 | -0.3374 | 0.0979 | -0.02803 | -0.1173 | - | - |
| A8= | -0.0026 | 2.1704 | -0.0627 | 0.9303 | 0.1010 | -0.2180 | 0.6713 | -0.2553 | -0.09799 | 0.2864 | - | - |
| A10= | -0.4165 | -11.2510 | 0.0728 | -4.6935 | -0.9778 | 0.4599 | -0.6918 | 0.5270 | 0.204464 | -0.4519 | - | - |
| A12= | 1.6938 | 35.7033 | 2.1260 | 14.2001 | 3.2479 | -0.9736 | 0.1194 | -0.6812 | -0.28232 | 0.3541 | - | - |
| A14= | -3.2243 | -70.1244 | -8.7241 | -25.9327 | -5.7123 | 1.4534 | 0.449 | 0.5221 | 0.200840 | -0.1553 | - | - |
| A16= | 3.3532 | 83.3383 | 15.2265 | 28.26007 | 5.7097 | -1.2785 | 0.4690 | -0.2295 | -0.06963 | 0.0393 | - | - |
| A18= | -1.8372 | -54.8646 | -12.9280 | -16.9373 | -2.9673 | 0.5882 | 0.1950 | 0.0537 | 0.010125 | -0.0054 | - | - |
| A20= | 0.4190 | 15.3632 | 4.3528 | 4.2914 | 0.6174 | -0.0935 | -0.00300 | -0.0052 | -0.0003 | 0.0003 | - | - |

【FIG. 32】
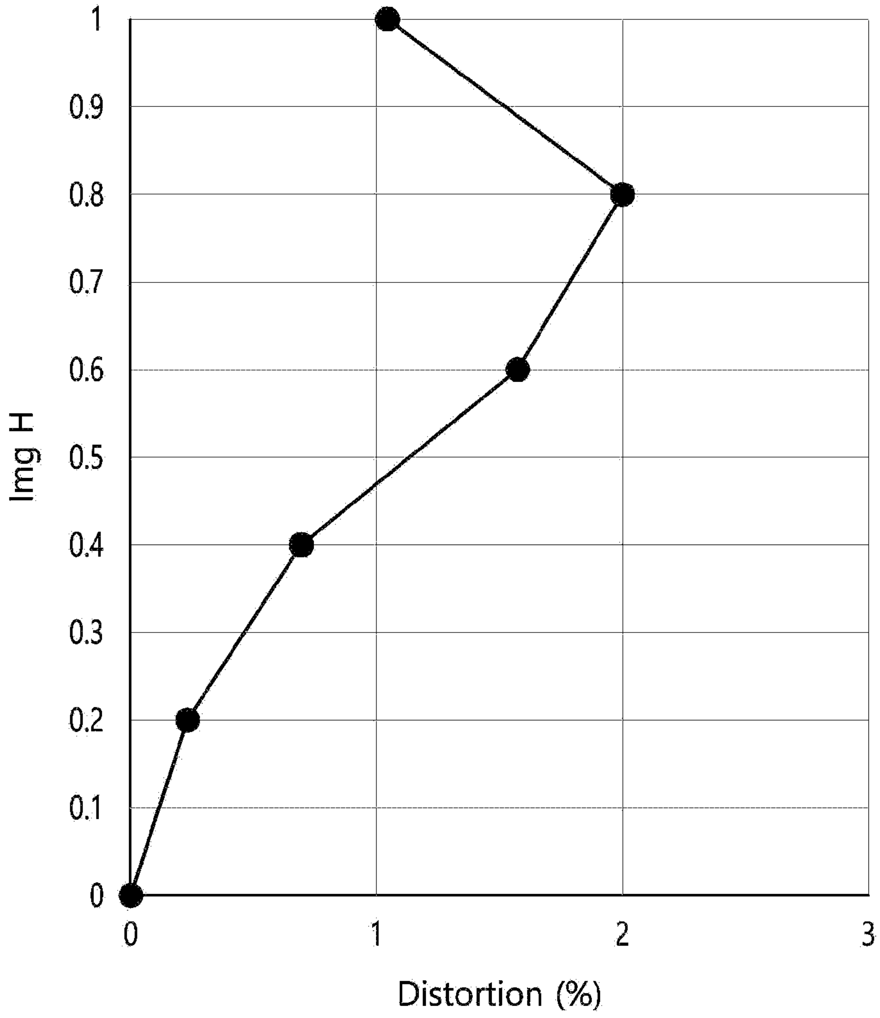

【FIG. 33】

| | 0F | | 0.2F | | 0.4F | | 0.6F | | 0.8F | | 1.0F | |
|---|---|---|---|---|---|---|---|---|---|---|---|---|
| | RAD | TAN | RAD | TAN | RAD | TAN | RAD | TAN | RAD | TAN | RAD | TAN |
| 0 | 0.999 | 0.999 | 0.999 | 0.999 | 0.999 | 0.999 | 0.999 | 0.999 | 0.999 | 0.999 | 0.999 | 0.999 |
| 11 | 0.983 | 0.983 | 0.982 | 0.982 | 0.980 | 0.981 | 0.977 | 0.979 | 0.971 | 0.974 | 0.968 | 0.967 |
| 22 | 0.964 | 0.964 | 0.961 | 0.962 | 0.958 | 0.960 | 0.949 | 0.953 | 0.935 | 0.944 | 0.925 | 0.925 |
| 33 | 0.942 | 0.942 | 0.938 | 0.939 | 0.932 | 0.936 | 0.917 | 0.924 | 0.895 | 0.909 | 0.874 | 0.873 |
| 44 | 0.919 | 0.919 | 0.912 | 0.914 | 0.905 | 0.910 | 0.881 | 0.893 | 0.857 | 0.874 | 0.819 | 0.821 |
| 55 | 0.895 | 0.895 | 0.885 | 0.887 | 0.875 | 0.882 | 0.843 | 0.860 | 0.814 | 0.836 | 0.762 | 0.766 |
| 66 | 0.869 | 0.869 | 0.857 | 0.860 | 0.844 | 0.853 | 0.804 | 0.825 | 0.776 | 0.800 | 0.708 | 0.715 |
| 77 | 0.843 | 0.843 | 0.829 | 0.831 | 0.811 | 0.823 | 0.763 | 0.789 | 0.738 | 0.764 | 0.653 | 0.662 |
| 88 | 0.815 | 0.816 | 0.799 | 0.802 | 0.778 | 0.793 | 0.723 | 0.753 | 0.701 | 0.726 | 0.608 | 0.615 |
| 99 | 0.788 | 0.788 | 0.770 | 0.773 | 0.744 | 0.762 | 0.682 | 0.717 | 0.666 | 0.691 | 0.563 | 0.568 |
| 110 | 0.759 | 0.760 | 0.740 | 0.743 | 0.710 | 0.731 | 0.643 | 0.681 | 0.633 | 0.653 | 0.525 | 0.525 |

【FIG. 34】
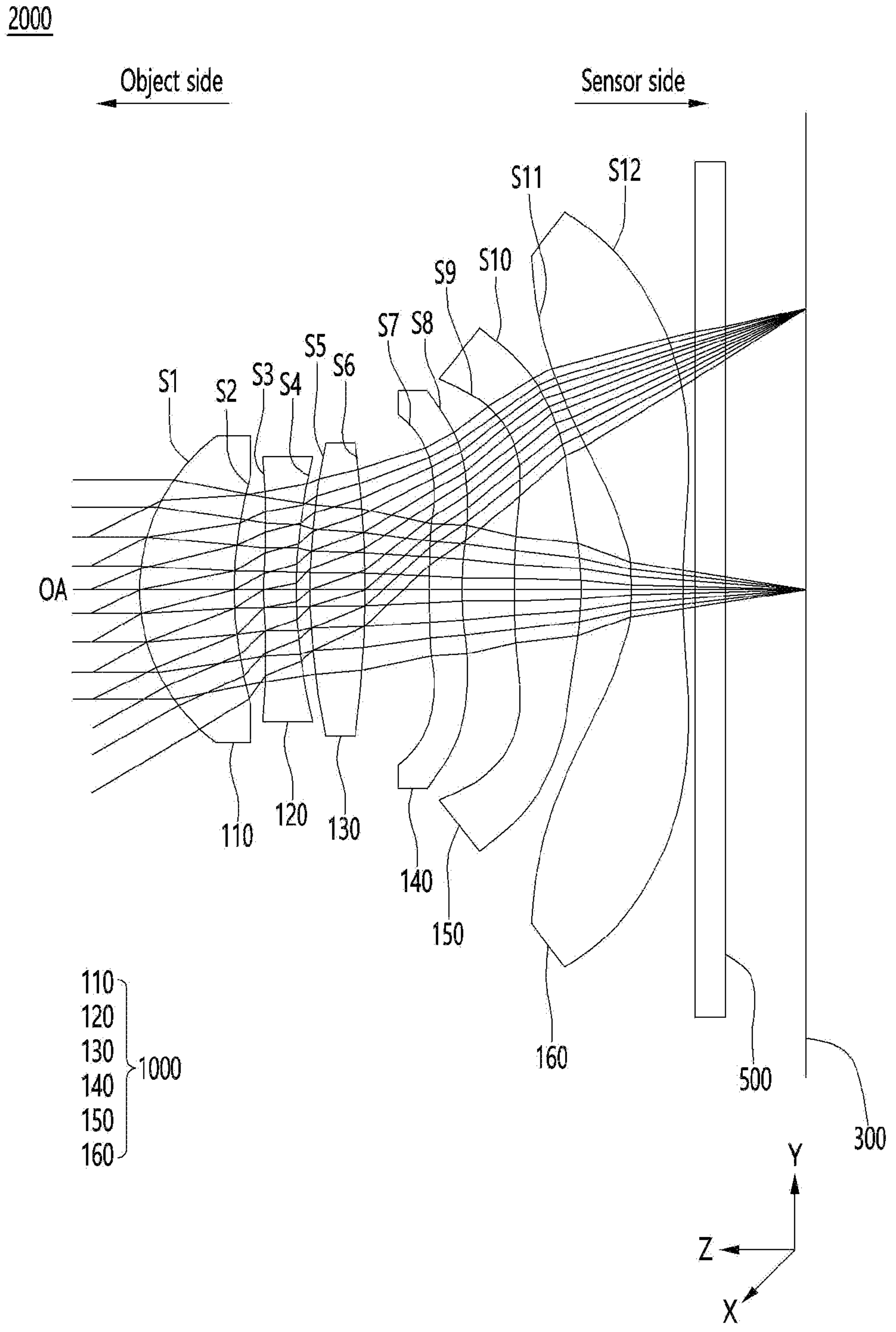

【FIG. 35】

| Lens | Surface | Radius of curvature (mm) | Thickness and distance(mm) | Refractive index | ABBE'S number |
|---|---|---|---|---|---|
| First lens | First surface | 1.5744 | 0.5033 | 1.5105 | 56.2 |
| | Second surface | 3.3709 | 0.2982 | | |
| Second lens | Third surface | 4.5984 | 0.2542 | 1.6800 | 18.4 |
| | Fourth surface | 2.6625 | 0.0634 | | |
| Third lens | Fifth surface | 3.9313 | 0.3917 | 1.5151 | 53.9 |
| | Sixth surface | -57.7824 | 0.5075 | | |
| Fourth lens | Seventh surface | 4.9891 | 0.2593 | 1.6793 | 18.5 |
| | Eighth surface | 2.7590 | 0.2111 | | |
| Fifth lens | Ninth surface | 2.0727458 | 0.4511 | 1.6067 | 26.8 |
| | Tenth surface | -6.1576 | 0.5554 | | |
| Sixth lens | Eleventh surface | | 0.6835 | 1.6030 | 27.0 |
| | Twelfth surface | | | | |
| Filter | Thirteenth surface | Infinity | 0.110 | | |
| | Fourteenth surface | Infinity | 0.270 | | |
| Image sensor | Fifteenth surface | Infinity | 0.03 | | |

【FIG. 36】

| Size | Sixth lens | |
|---|---|---|
| | Eleventh surface(S11) | Twelfth surface(S12) |
| C1 | -0.1743 | -0.85864 |
| C2 | 0 | 0 |
| C3 | 0 | 0 |
| C4 | 0.006273 | 0.0399911 |
| C5 | 0.0938695 | -0.633589 |
| C6 | 0 | 0 |
| C7 | 0 | 0 |
| C8 | 0 | 0 |
| C9 | 0 | 0 |
| C10 | 0 | 0 |
| C11 | -0.041399 | -0.107059 |
| C12 | -0.002402 | 0.0116862 |
| C13 | 0.144781 | -0.05968 |
| C14 | 0 | 0 |
| C15 | 0 | 0 |
| C16 | 0 | 0 |
| C17 | 0 | 0 |
| C18 | 0 | 0 |
| C19 | 0 | 0 |
| C20 | 0 | 0 |
| C21 | 0 | 0 |
| C22 | -0.006721 | -0.01516 |
| C23 | -0.005587 | -0.035392 |
| C24 | -0.004516 | -0.001413 |
| C25 | -0.04755 | 0.002217 |
| C26 | 0 | 0 |
| C27 | 0 | 0 |
| C28 | 0 | 0 |
| C29 | 0 | 0 |
| C30 | 0 | 0 |
| C31 | 0 | 0 |
| C32 | 0 | 0 |
| C33 | 0 | 0 |
| C34 | 0 | 0 |
| C35 | 0 | 0 |
| C36 | 0 | 0 |
| C37 | 0 | 0 |
| C38 | -0.000843 | -0.003941 |
| C39 | 0.0010301 | -0.007354 |
| C40 | -0.002259 | -0.002273 |
| C41 | 0.002425 | -0.00781 |
| C42 | 0 | 0 |
| C43 | 0 | 0 |
| C44 | 0 | 0 |
| C45 | 0 | 0 |
| C46 | 0 | 0 |
| C47 | 0 | 0 |
| C48 | 0 | 0 |
| C49 | 0 | 0 |
| C50 | 0 | 0 |
| C51 | 0 | 0 |
| C52 | 0 | 0 |
| C53 | 0 | 0 |
| C54 | 0 | 0 |
| C55 | 0 | 0 |
| C56 | 0 | 0 |
| C57 | 0 | 0 |
| C58 | 0 | 0 |
| C59 | 0.0002649 | -0.001134 |
| C60 | -4.32E-05 | -2.51E-07 |
| C61 | -0.00023 | -0.01158 |
| C62 | 0 | 0 |
| C63 | 0 | 0 |
| C64 | 0 | 0 |
| C65 | 0 | 0 |
| C66 | 0 | 0 |

【FIG. 37】

| | First embodiment |
|---|---|
| Aperture position | Between fisrt and second lenses |
| FOV(θ) | 79.7° |
| F | 2.0 |
| TTL | 4.5001 mm |
| ImgH | 6.564 mm |
| EFL | 3.8051 |
| EPD | 1.90255 |
| f1 | 4.5166 |
| f2 | -9.2748 |
| f3 | 7.9345 |
| f4 | -148.8456 |
| f5 | 2.767448 |
| f6 | -1.863032 |

【FIG. 38】

| Distance from optical axis (mm) | Slope angle(°) | | | | | | | | | | | | | |
|---|---|---|---|---|---|---|---|---|---|---|---|---|---|---|
| | First surface | Second surface | Third surface | Fourth surface | Fifth surface | Sixth surface | Seventh surface | Eighth surface | Ninth surface | Tenth surface | Eleventh surface-X | Eleventh surface-Y | Twelfth surface-X | Twelfth surface-Y |
| 0(Optical axis) | 0 | 0 | 0 | 0 | 0 | 0 | 0 | 0 | 0 | 0 | 0 | 0 | 0 | 0 |
| 0.2 | 7.28716 | 3.37329 | 2.26333 | 4.20196 | 3.01893 | -0.20535 | 1.97512 | 3.46482 | 5.27488 | -1.62244 | -3.37216 | -3.38926 | 4.258239 | 4.239028 |
| 0.4 | 14.719 | 6.5596 | 3.10476 | 7.44241 | 6.18682 | -0.54134 | 2.52902 | 3.94087 | 9.29204 | -2.12554 | -8.29743 | -8.34456 | 6.480796 | 6.433476 |
| 0.6 | 22.5259 | 9.43868 | 1.27942 | 8.63892 | 8.60396 | -1.46398 | 1.59034 | 1.09432 | 11.3361 | -1.38632 | -15.1161 | -15.2114 | 6.109539 | 6.012623 |
| 0.8 | 31.2451 | 12.0109 | -4.19086 | 8.00457 | 9.59604 | -3.9873 | -1.15433 | -4.147 | 10.3246 | -0.50375 | -22.4332 | -22.5931 | 3.658118 | 3.465427 |
| 1.0 | 42.5556 | | | 8.29636 | 10.934 | -5.93101 | -8.90288 | -11.4863 | 2.94216 | -2.46063 | -27.9950 | -28.2445 | 0.05271 | -0.33093 |
| 1.2 | | | | | | | -26.1347 | -18.9329 | -13.8332 | -9.64107 | -30.0907 | -30.4901 | -3.89774 | -4.64347 |
| 1.4 | | | | | | | | -19.9215 | -32.3304 | -18.7761 | -27.9657 | -28.6282 | -8.01373 | -9.35998 |
| 1.6 | | | | | | | | | --51.1258 | -27.7202 | -21.8864 | -22.8868 | -12.8203 | -14.9499 |
| 1.8 | | | | | | | | | | -38.3371 | -13.9268 | -14.8146 | -18.8078 | -21.5345 |
| 2.0 | | | | | | | | | | | -7.82218 | -6.45676 | -25.2509 | -27.6287 |
| 2.2 | | | | | | | | | | | -5.91644 | 3.571528 | -30.1981 | -30.1494 |
| 2.4 | | | | | | | | | | | | | -33.4141 | -26.4268 |
| 2.6 | | | | | | | | | | | | | -43.7309 | -23.7746 |

【FIG. 39】

| Distance (mm) | Lens spacing (mm) | | | | |
|---|---|---|---|---|---|
| | First lens/Second lens | Second lens/Third lens | Third lens/Fourth lens | Fourth lens/Fifth lens | Fifth lens/Sixth lens |
| 0(Optical axis) | 0.298196 | 0.063365 | 0.507472 | 0.21112 | 0.440219 |
| 0.2 | 0.296432 | 0.061116 | 0.511544 | 0.21393 | 0.437627 |
| 0.4 | 0.288975 | 0.05639 | 0.521117 | 0.22601 | 0.424721 |
| 0.6 | 0.269323 | 0.05382 | 0.531904 | 0.25347 | 0.390093 |
| 0.8 | 0.227526 | 0.056642 | 0.542388 | 0.29769 | 0.324813 |
| 1.0 | | 0.064573 | 0.546451 | 0.35057 | 0.23335 |
| 1.2 | | | | 0.38883 | 0.1406 |
| 1.4 | | | | 0.37536 | 0.078894 |
| 1.6 | | | | | 0.070296 |
| 1.8 | | | | | 0.135899 |

【FIG. 40】

| Distance (mm) | Lens thickness (mm) | | | | | |
|---|---|---|---|---|---|---|
| | First lens | Second lens | Third lens | Fourth lens | Fifth lens | Sixth lens |
| 0(Optical axis) | 0.50378 | 0.254223 | 0.391651 | 0.259348 | 0.45113 | 0.35 |
| 0.2 | 0.496954 | 0.257508 | 0.386112 | 0.262258 | 0.438657 | 0.363428 |
| 0.4 | 0.475544 | 0.268394 | 0.368724 | 0.267895 | 0.405646 | 0.40284 |
| 0.6 | 0.43643 | 0.288724 | 0.339198 | 0.269948 | 0.362134 | 0.46667 |
| 0.8 | 0.37323 | 0.322277 | 0.297742 | 0.263674 | 0.319622 | 0.552538 |
| 1.0 | 0.282316 | | 0.243139 | 0.252099 | 0.289871 | 0.654476 |
| 1.2 | | | | 0.257836 | 0.287057 | 0.760395 |
| 1.4 | | | | | 0.322732 | 0.852278 |
| 1.6 | | | | | 0.419326 | 0.910045 |
| 1.8 | | | | | | 0.918478 |
| 2.0 | | | | | | 0.874672 |
| 2.2 | | | | | | 0.791429 |

【FIG. 41】

| Distance from optical axis (mm) | Sag(㎜) | | | | | | | | | | | | | |
|---|---|---|---|---|---|---|---|---|---|---|---|---|---|---|
| | First surface | Second surface | Third surface | Fourth surface | Fifth surface | Sixth surface | Seventh surface | Eighth surface | Ninth surface | Tenth surface | Eleventh surface-X | Eleventh surface-Y | Twelfth surface-X | Twelfth surface-Y |
| 0(Optical axis) | 0 | 0 | 0 | 0 | 0 | 0 | 0 | 0 | 0 | 0 | 0 | 0 | 0 | 0 |
| 0.2 | 0.012742 | 0.005916 | 0.004152 | 0.007437 | 0.005188 | -0.00035 | 0.003721 | 0.00663 | 0.009437 | -0.00304 | -0.00563 | -0.005655 | 0.0078 | 0.007768 |
| 0.4 | 0.051612 | 0.023377 | 0.014156 | 0.028327 | 0.021353 | -0.00157 | 0.01207 | 0.020617 | 0.035502 | -0.00998 | -0.02548 | -0.025615 | 0.027361 | 0.027215 |
| 0.6 | 0.118939 | 0.051589 | 0.022716 | 0.057217 | 0.047673 | -0.00478 | 0.019651 | 0.030251 | 0.072601 | -0.0164 | -0.06652 | -0.066912 | 0.050149 | 0.049757 |
| 0.8 | 0.22086 | 0.089536 | 0.018866 | 0.08692 | 0.080197 | -0.01371 | 0.021204 | -0.0014 | 0.1121 | -0.01941 | -0.13481 | -0.1357 | 0.067724 | 0.066842 |
| 1.0 | 0.369209 | | | 0.114178 | 0.115387 | -0.03313 | 0.005853 | -0.0567 | 0.138053 | -0.02321 | -0.23007 | -0.231829 | 0.074401 | 0.07255 |
| 1.2 | | | | | | | -0.05519 | -0.12985 | 0.121013 | -0.04306 | -0.34268 | -0.345899 | 0.0677 | 0.063952 |
| 1.4 | | | | | | | | | 0.034386 | -0.09401 | -0.45534 | -0.4610 | 0.0469 | 0.039547 |
| 1.6 | | | | | | | | | -0.14785 | -0.17966 | -0.54958 | -0.5588 | 0.0105 | -0.00322 |
| 1.8 | | | | | | | | | | -0.31004 | -0.61436 | -0.6276 | -0.0459 | -0.06902 |
| 2.0 | | | | | | | | | | | -0.65173 | -0.6652 | -0.1271 | -0.16127 |
| 2.2 | | | | | | | | | | | -0.67457 | -0.6715 | -0.2331 | -0.27367 |
| 2.4 | | | | | | | | | | | | | -0.3572 | -0.38375 |
| 2.6 | | | | | | | | | | | | | -0.5099 | -0.47257 |

【FIG. 42】

| | First surface | Second surface | Third surface | Fourth surface | Fifth surface | Sixth surface | Seventh surface | Eighth surface | Ninth surface | Tenth surface | Eleventh surface | Twelfth surface |
|---|---|---|---|---|---|---|---|---|---|---|---|---|
| K= | 0.2884 | -4.8707 | -89.9758 | -2.9742 | -7.1433 | 89.9422 | -79.5811 | -52.8983 | -11.2754 | -6.2200 | - | - |
| A4= | -0.0221 | 0.0054 | -0.0081 | -0.0232 | 0.0855 | -0.0009 | -0.1113 | -0.1091 | 0.006126 | 0.1427 | - | - |
| A6= | 0.1516 | -0.1269 | -0.2580 | -0.2939 | -0.2628 | -0.0538 | 0.1536 | -0.1409 | -0.02379 | -0.1594 | - | - |
| A8= | -0.9344 | 1.0000 | 0.3375 | 0.8121 | 0.3342 | 0.1028 | -0.2008 | 0.5434 | -0.07708 | 0.2018 | - | - |
| A10= | 3.4416 | -4.6189 | 0.7889 | -1.5275 | -0.0761 | -0.0816 | 0.2535 | -0.8723 | 0.196641 | -0.2296 | - | - |
| A12= | -7.9101 | 13.2765 | -4.6414 | 2.5405 | -0.5219 | -0.4422 | -0.3682 | 0.8304 | -0.26141 | 0.1555 | - | - |
| A14= | 11.4761 | -23.9210 | 9.9130 | -3.5027 | 1.0811 | 1.3650 | 0.3854 | -0.4994 | 0.1870530 | -0.0611 | - | - |
| A16= | -10.2048 | 26.2285 | -11.4443 | 3.2541 | -1.1977 | -1.6566 | -0.2438 | 0.1874 | -0.072519 | 0.0139 | - | - |
| A18= | 5.0753 | -15.9796 | 7.0286 | -1.6816 | 0.7698 | 0.9600 | 0.0831 | -0.0399 | 0.0144284 | -0.0017 | - | - |
| A20= | -1.0791 | 4.1463 | -1.7924 | 0.3602 | -0.2133 | -0.2173 | -0.0116 | 0.0037 | -0.0012 | 0.0001 | - | - |

【FIG. 43】
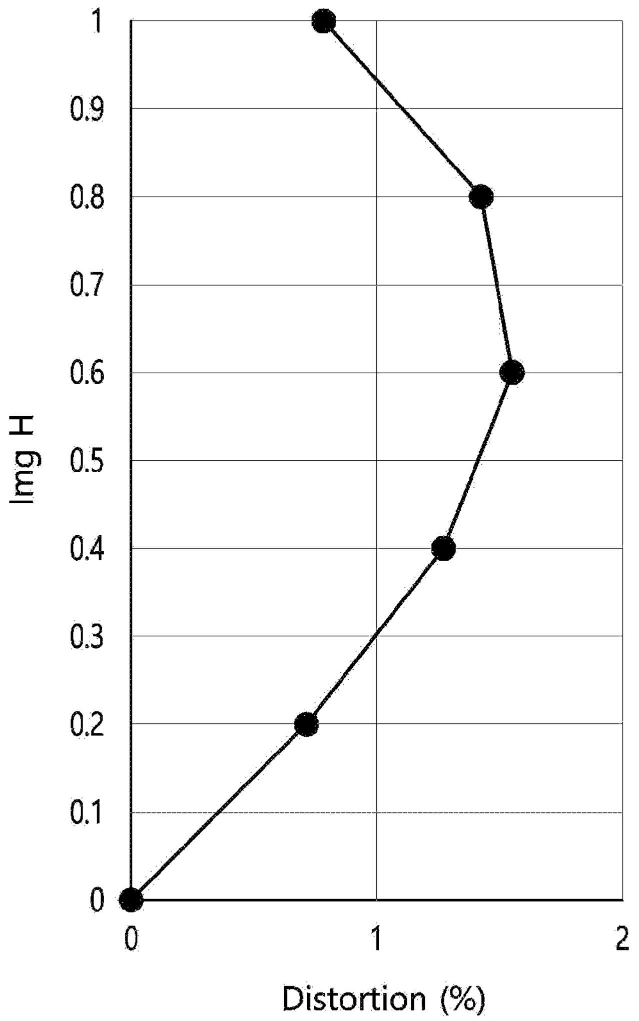

【FIG. 44】
| | 0F | | 0.2F | | 0.4F | | 0.6F | | 0.8F | | 1.0F | |
|---|---|---|---|---|---|---|---|---|---|---|---|---|
| | RAD | TAN | RAD | TAN | RAD | TAN | RAD | TAN | RAD | TAN | RAD | TAN |
| 0 | 0.999 | 0.999 | 0.999 | 0.999 | 0.999 | 0.999 | 0.999 | 0.999 | 0.999 | 0.999 | 0.999 | 0.999 |
| 11 | 0.983 | 0.983 | 0.981 | 0.981 | 0.978 | 0.979 | 0.975 | 0.977 | 0.968 | 0.971 | 0.957 | 0.968 |
| 22 | 0.964 | 0.964 | 0.958 | 0.959 | 0.950 | 0.954 | 0.946 | 0.949 | 0.927 | 0.934 | 0.890 | 0.920 |
| 33 | 0.944 | 0.944 | 0.931 | 0.934 | 0.916 | 0.926 | 0.914 | 0.918 | 0.881 | 0.893 | 0.806 | 0.858 |
| 44 | 0.923 | 0.922 | 0.902 | 0.905 | 0.879 | 0.894 | 0.880 | 0.887 | 0.836 | 0.853 | 0.724 | 0.793 |
| 55 | 0.900 | 0.900 | 0.870 | 0.874 | 0.838 | 0.959 | 0.846 | 0.855 | 0.793 | 0.815 | 0.644 | 0.726 |
| 66 | 0.877 | 0.876 | 0.836 | 0.842 | 0.796 | 0.823 | 0.810 | 0.822 | 0.749 | 0.776 | 0.565 | 0.661 |
| 77 | 0.853 | 0.852 | 0.801 | 0.809 | 0.754 | 0.786 | 0.775 | 0.791 | 0.711 | 0.743 | 0.496 | 0.602 |
| 88 | 0.828 | 0.827 | 0.764 | 0.775 | 0.712 | 0.749 | 0.739 | 0.757 | 0.672 | 0..707 | 0.430 | 0.545 |
| 99 | 0.803 | 0.801 | 0.728 | 0.740 | 0.672 | 0.712 | 0.706 | 0.727 | 0.641 | 0.678 | 0.377 | 0.497 |
| 110 | 0.777 | 0.775 | 0.691 | 0.706 | 0.634 | 0.676 | 0.672 | 0.696 | 0.612 | 0.651 | 0.330 | 0.453 |
【FIG. 45】
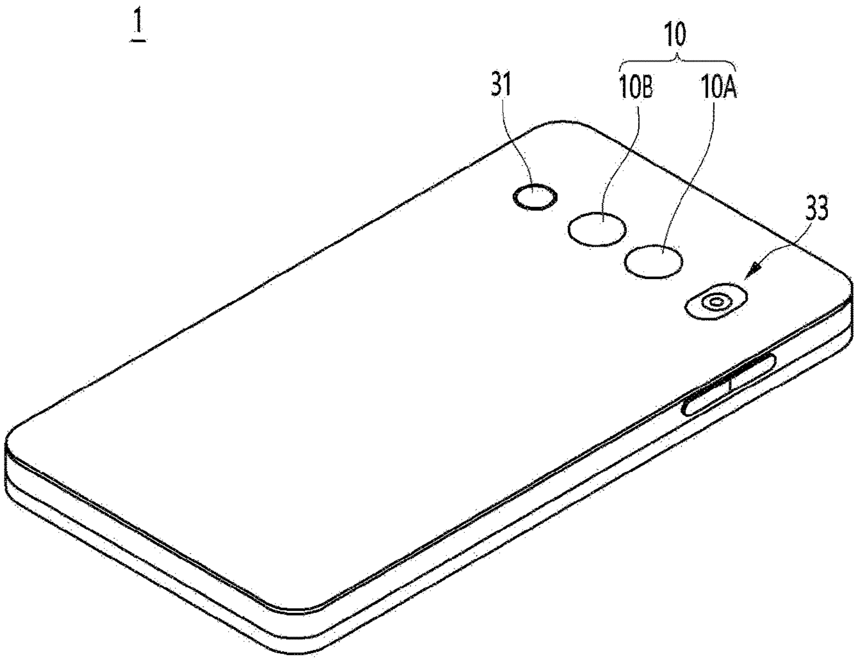

【FIG. 46】
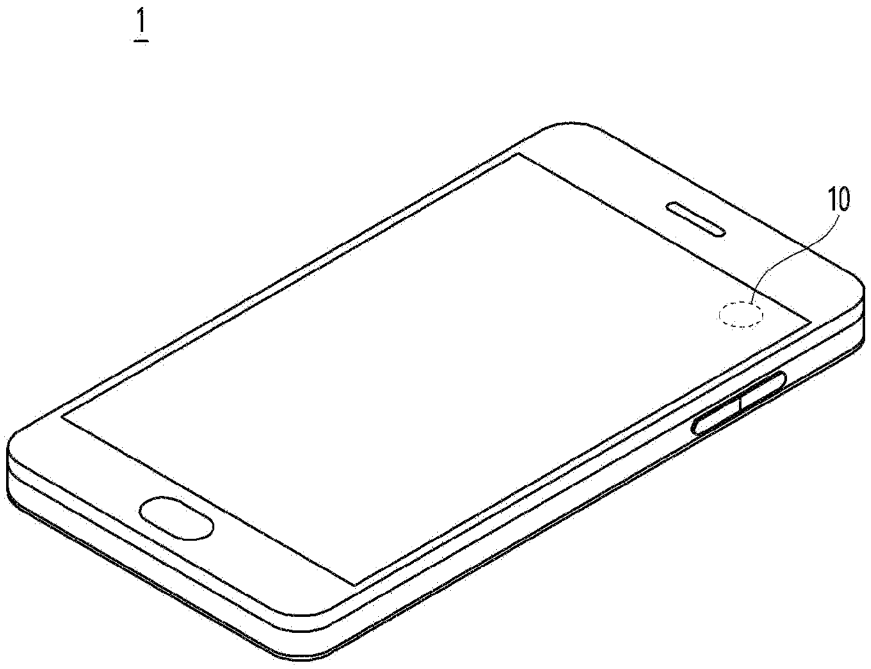

OPTICAL MODULE

CROSS-REFERENCE TO RELATED PATENT APPLICATIONS

This application is a U.S. National Stage Application under 35 U.S.C. § 371 of PCT Application No. PCT/KR2022/010359, filed Jul. 15, 2022, which claims priority to Korean Patent Application Nos. 10-2021-0093161, filed Jul. 15, 2021 and 10-2021-0115134, filed Aug. 30, 2021, whose entire disclosures are hereby incorporated by reference.

TECHNICAL FIELD

An embodiment relates to an optical module capable of realizing high resolution and miniaturization.

BACKGROUND

A camera module captures an object and stores the object as an image or video and is installed in various applications. In particular, the camera module is produced in a very small size and is applied to not only portable devices such as smartphones, tablet PCs, and laptops, but also drones and vehicles to provide various functions.

For example, an optical system of the camera module may include an imaging lens that forms an image and an image sensor that converts the formed image into an electrical signal. In this case, the camera module may perform an autofocus (AF) function of aligning a focal length of a lens by automatically adjusting a distance between the image sensor and the imaging lens and a zooming function of zooming up or zooming out by increasing or decreasing a magnification of a distant object through a zoom lens. In addition, the camera module employs an image stabilization (IS) technology to correct or prevent image stabilization due to camera movement caused by an unstable fixing device or a user's movement.

The most important element for such a camera module to obtain an image is an imaging lens that forms an image. Recently, interest in high resolution is increasing, and research using 5 or 6 lenses is being conducted to realize this. In addition, research using a plurality of imaging lenses having positive (+) or negative (−) refractive power for realizing high resolution is being conducted.

In addition, in recent years, as a front display of a smartphone to which a camera module is applied is required, the form factor of the front camera is continuously changing, and thereby, an under-display camera that hides the front camera under the display is applied.

However, when the camera is disposed under the display, problems such as deterioration of image quality of the camera module, decrease in brightness, and generation of ghost/flare occur due to loss of light amount due to a panel of the display. In particular, as the brightness drops to 20% compared to the existing ones, a new optical system that can compensate for the brightness of the camera is required.

Therefore, there is a need for an optical system having a new structure capable of having improved resolution and improved illuminance regardless of a position of the camera.

DISCLOSURE

Technical Problem

An embodiment is directed to providing an optical system capable of realizing miniaturization while having improved resolution, improved illuminance, and improved optical characteristics.

Technical Solution

An optical module according to an embodiment includes: a sensor; and an optical system including first to sixth lenses sequentially disposed along an optical axis from an object-side toward a sensor-side, wherein at least one of an object-side surface and a sensor-side surface of the sixth lens includes a free-form surface, and the sixth lens satisfies Equation A below, and $$|\text{max Sag\_O\_x\_6}| \neq |\text{max Sag\_O\_y\_6}| \quad \text{[Equation A]}$$

(In Equation A, max Sag_O_x_6 refers to a maximum sag value in an X-axis direction on the object-side surface of an nth lens, and max Sag_O_y_6 refers to a maximum sag value in a Y-axis direction on the object-side surface of the nth lens.)

The optical system satisfies Equations 1 to 3 below.

$$60° \leq FOV \leq 90° \quad \text{[Equation 1]}$$

(In Equation 1, FOV refers to a field of view.)

$$0.50 \leq TTL/ImgH \leq 1.0 \quad \text{[Equation 2]}$$

(In Equation 2, total track length (TTL) refers to a distance in an optical axis direction from a vertex of an object-side surface of the first lens to an upper surface of an image sensor unit, and ImgH refers to twice a distance in a diagonal direction from the upper surface of the image sensor unit overlapping the optical axis to a 1.0 field region of the image sensor unit.)

$$\text{CA\_O\_x} < \text{CA\_O\_6} \quad \text{[Equation 3]}$$

(In Equation 3, CA_O_x refers to a size of an effective diameter of an object-side of a lens closest to an aperture among lenses between the aperture and the sensor, and CA_O_6 refers to a size of an effective diameter of the object-side surface of the sixth lens.)

Advantageous Effects

An optical system and a camera module according to an embodiment may have improved optical characteristics. In detail, the optical system may have improved aberration characteristics, resolution, and the like as a plurality of lenses have a set shape, refractive power, thickness, spacing, and the like.

In addition, the optical system and the camera module according to the embodiment may have improved distortion and aberration control characteristics and may have excellent optical performance not only in a center of a field angle (FOV) but also in a periphery.

In addition, the optical system according to the embodiment may have improved optical characteristics and a small total track length (TTL), and thus the optical system and the camera module including the same may be provided in a slim and compact structure.

In addition, the embodiment may include N lenses sequentially disposed along an optical axis from an object-side toward a sensor-side and may form at least one of an object-side surface and a sensor-side surface of an nth lens which is any one of the N lenses as a free-form surface. In this case, the nth lens, which is any one of the N lenses, may be a lens disposed at a position closest to a sensor.

In detail, at least one of the object-side surface and the sensor-side surface of the nth lens may have a sag value defined by equations and a change value of the sag value, and a shape of a free-form surface of at least one of the object-side surface and the sensor-side surface of the nth lens may be defined by the sag value defined by the equations and the change value of the sag value.

Accordingly, when light passes through the nth lens and moves to an image sensor unit, relative illumination of the light incident on the image sensor unit may be improved. In detail, the relative illumination of the light passing through the nth lens and incident on the image sensor unit may be 30% or more. In detail, the relative illumination of the light passing through the nth lens and incident on the image sensor unit may be 35% or more. In detail, the relative illumination of the light passing through the nth lens and incident on the image sensor may be 45% or more.

Therefore, a camera module including the optical system can compensate for a decrease in an amount of light that may change depending on a position of a display device. That is, the camera module including the optical system can secure an amount of light with sufficient brightness without being affected by the position of the display device, thereby realizing improved resolution.

In addition, since the light amount and resolution of the optical system can be improved without increasing a size of the optical system and a size of the lens diameter, it is possible to realize miniaturization of the optical system and the camera module while having a size of improved light amount.

BRIEF DESCRIPTION OF THE DRAWINGS

FIG. 1 is a configuration diagram of an optical system and an optical module according to an embodiment.

FIGS. 2 and 3 are views for describing an object-side surface of a sixth lens of the optical system and the optical module according to the embodiment.

FIG. 4 is a graph for describing a sag value at the object-side surface of the sixth lens of the optical system and the optical module according to the embodiment.

FIGS. 5 and 6 are views for describing a sensor-side surface of the sixth lens of the optical system and the optical module according to the embodiment.

FIG. 7 is a graph for describing a sag value at the sensor-side surface of the sixth lens of the optical system and the optical module according to the embodiment.

FIGS. 8 and 9 are graphs for describing sag values at various angles of the sixth lens of the optical system and the optical module according to the embodiment.

FIG. 10 is a view for describing a slope angle of a lens of the optical system and the optical module according to the embodiment.

FIG. 11 is a configuration diagram of an optical system and an optical module according to a first embodiment.

FIG. 12 is a table for describing lenses of the optical system and the optical module according to the first embodiment.

FIG. 13 is a table for describing a free-form lens of the optical system and the optical module according to the first embodiment.

FIG. 14 (*a*) to (*c*) are tables for describing a free-form lens of the optical system and the optical module according to the embodiment.

FIG. 15 is a table for describing specific numerical values of the optical system and the optical module according to the first embodiment.

FIGS. 16 to 20 are tables for describing slope angles, spaces, thicknesses, sag values, and aspheric coefficients of the lenses of the optical system and the optical module according to the first embodiment.

FIG. 21 is a graph illustrating distortion of the optical system and the optical module according to the first embodiment.

FIG. 22 is a table for describing MTF characteristics of the optical system and the optical module according to the first embodiment.

FIG. 23 is a configuration diagram of an optical system and an optical module according to a second embodiment.

FIG. 24 is a table for describing lenses of the optical system and the optical module according to the second embodiment.

FIG. 25 is a table for describing a free-form lens of the optical system and the optical module according to the second embodiment.

FIG. 26 is a table for describing specific numerical values of the optical system and the optical module according to the second embodiment.

FIGS. 27 to 31 are tables for describing slope angles, spaces, thicknesses, sag values, and aspheric coefficients of the lenses of the optical system and the optical module according to the second embodiment.

FIG. 32 is a graph illustrating distortion of the optical system and the optical module according to the second embodiment.

FIG. 33 is a table for describing MTF characteristics of the optical system and the optical module according to the second embodiment.

FIG. 34 is a configuration diagram of an optical system and an optical module according to a third embodiment.

FIG. 35 is a table for describing lenses of the optical system and the optical module according to the third embodiment.

FIG. 36 is a table for describing a free-form lens of the optical system and the optical module according to the third embodiment.

FIG. 37 is a table for describing specific numerical values of the optical system and the optical module according to the third embodiment.

FIGS. 38 to 42 are tables for describing slope angles, spacings, thicknesses, sag values, and aspheric coefficients of the lenses of the optical system and the optical module according to the third embodiment.

FIG. 43 is a graph illustrating distortion of the optical system and the optical module according to the third embodiment.

FIG. 44 is a table for describing MTF characteristics of the optical system and the optical module according to the third embodiment.

FIGS. 45 and 46 are views for describing a display device to which an optical system and an optical module according to an embodiment are applied.

DETAILED DESCRIPTION OF THE EMBODIMENTS

Hereinafter, preferred embodiments of the present invention will be described in detail with reference to the accompanying drawings.

However, the spirit and scope of the present invention is not limited to a part of the embodiments described, and may be implemented in various other forms, and within the spirit and scope of the present invention, one or more of the elements of the embodiments may be selectively combined and replaced. In addition, unless expressly otherwise defined and described, the terms used in the embodiments of the present invention (including technical and scientific terms) may be construed the same meaning as commonly understood by one of ordinary skill in the art to which the present invention belongs, and the terms such as those defined in commonly used dictionaries may be interpreted as having a meaning that is consistent with their meaning in the context of the relevant art. In addition, the terms used in the embodiments of the present invention are for describing the embodiments and are not intended to limit the present invention. In this specification, the singular forms may also include the plural forms unless specifically stated in the phrase, and may include at least one of all combinations that may be combined in A, B, and C when described in "at least one (or more) of A (and), B, and C". Further, in describing the elements of the embodiments of the present invention, the terms such as first, second, A, B, (a), and (b) may be used. These terms are only used to distinguish the elements from other elements, and the terms are not limited to the essence, order, or order of the elements. In addition, when an element is described as being "connected" or "coupled" to another element, it may include not only when the element is directly "connected" or "coupled" to another element, but also when the element is "connected" or "coupled" by the other element between the element and another element.

Further, when described as being formed or disposed "on (above)" or "under (below)" of each element, the terms "on (above)" or "under (below)" may include not only when two elements are directly connected to each other, but also when one or more other elements are formed or disposed between two elements. Furthermore, when expressed as "on (above)" or "under (below)", it may include the meaning of not only the upward direction but also the downward direction based on one element.

Hereinafter, a first lens refers to a lens closest to an object-side, and the last lens refers to a closest to a sensor-side. In addition, unless otherwise specified, the units for the radius, effective diameter, thickness, distance, BFL (Back Focal Length), TTL (Total Track Length or Total Top Length), etc. of the lens are all mm.

In addition, a shape of the lens is shown based on an optical axis of the lens. As an example, the meaning that the object-side surface of the lens is convex refers that a vicinity of the optical axis is convex on the object-side surface of the lens, but does not refer that the vicinity of the optical axis is convex. Therefore, even when it is described that the object-side surface of the lens is convex, a portion around the optical axis on the object-side surface of the lens may be concave. In addition, it should be noted that a thickness and a radius of curvature of the lens are measured based on the optical axis of the lens. In addition, "object-side surface" may refer to a surface of a lens facing the object-side based on the optical axis, and "image side" may be defined as a surface of a lens facing an imaging surface based on the optical axis.

In addition, a critical point of the lens is defined as a point on the lens surface at which a primary differential value becomes zero. In detail, the critical point is a point at which a sign of a slope with respect to the optical axis OA and a direction perpendicular to the optical axis OA changes from positive (+) to negative (−) or from negative (−) to positive (+) and may refer to a point at which the slope is 0. The critical point is a point at which convexity and concavity change and may refer to a point at which a sign of a secondary differential value changes from positive (+) to negative (−) or from negative (−) to positive (+). The critical point may be a point at which a sign of refractive power is changed. The critical point may be a point at which a sign of a slope angle is changed.

In addition, a sag value of the object-side surface of the lens may be defined as a distance in an optical axis direction between an arbitrary point on the object-side surface of the lens and a contact point on the object-side surface of the optical axis and the lens. In addition, a sag value of the sensor-side surface of the lens may be defined as a distance in the optical axis direction between an arbitrary point on the sensor-side surface of the lens and a contact point on the sensor-side surface of the optical axis and the lens.

In addition, a size of the sag value described below may be compared based on an absolute value of the sag value.

In addition, in an X-axis direction (first direction), a Y-axis direction (second direction), and a Z-axis direction (third direction) shown in the drawings, the Z-axis direction (third direction) may refer to the optical axis direction or a direction parallel to the optical axis direction.

Hereinafter, for convenience of description, the X-axis direction (first direction) may be defined as a direction perpendicular to the Z-axis direction (third direction) on the same plane, and the Y-axis direction (second direction) may be defined as a direction perpendicular to the Z-axis direction (third direction) on another plane.

In addition, the X-axis direction (first direction), the Y-axis direction (second direction), and the Z-axis direction (third direction) may be defined as directions perpendicular on the same plane or another plane.

Hereinafter, an optical system, an optical module including the optical system, and a camera module including the optical system and the optical module according to embodiments will be described with reference to the drawings.

Referring to FIG. 1, an optical system 1000 according to an embodiment may include a plurality of lenses. For example, the optical system 1000 may include n lenses. In detail, the optical system 1000 may include lenses of a first lens 110 to an nth lens n.

In detail, the optical system 1000 may include the first lens 110 to the nth lens n sequentially disposed from the object-side toward the sensor-side. In this case, the n may include a natural number equal to or greater than 2. In detail, the n may be a natural number having a value of 2 to 6.

When the n has a value of 6 in the optical system 1000 according to the embodiment, the optical system 1000 may include a first lens, a second lens, a third lens, a fourth lens, a fifth lens, and a sixth lens. That is, when the n has a value of 6, an n−4th lens may be a second lens 120, an n−3rd lens may be a third lens 130, an n−2nd lens may be a fourth lens 140, an n−1st lens may be a fifth lens 150, and the nth lens may be a sixth lens 160.

Hereinafter, for convenience of description, the optical system 1000 according to the embodiment will be described focusing on an optical system including six lenses of the first lens 110, the second lens 120, the third lens 130, the fourth lens 140, the fifth lens 150, and the sixth lens 160.

Referring to FIG. 1, the optical system 1000 may further include an image sensor unit 300 and a filter unit 500 to configure an optical module 2000.

That is, the optical module 2000 may include the optical system 1000 including the six lenses described above, and the filter unit 500 and the image sensor unit 300 disposed in the sensor-side direction of the optical system.

The first lens 110, the second lens 120, the third lens 130, the fourth lens 140, the fifth lens 150, and the sixth lens 160 may be sequentially disposed along an optical axis OA of the optical system 1000.

Light corresponding to information of an object disposed on the object-side may sequentially pass through the first lens 110, the second lens 120, the third lens 130, the fourth lens 140, and the fifth lens 150, the sixth lens 160, and the filter unit 500 to be incident on the image sensor unit 300.

The first lens 110, the second lens 120, the third lens 130, the fourth lens 140, the fifth lens 150, and the sixth lens 160 may include an effective region and an ineffective region, respectively. The effective region may be an effective diameter through which light incident on each lens of the first lens 110, the second lens 120, the third lens 130, the fourth lens 140, the fifth lens 150, and the sixth lens 160 passes. That is, the effective region may be defined as a region where incident light is refracted to realize optical characteristics.

The effective diameter (effective region) of the lens may be related to an inner diameter of a spacer disposed between the lenses. That is, the effective diameter of the lens may be related to an inner diameter of a spacer disposed between surfaces of adjacent lenses.

In detail, the effective diameter of the lens may be different from the inner diameter of the spacer disposed between the surfaces of the adjacent lenses. In more detail, the effective diameter of the lens may be greater or smaller than the inner diameter of the spacer disposed between the surfaces of the adjacent lenses.

In more detail, the effective diameter of the lens may be in a range of ±0.4 mm of a size of the inner diameter of the spacer disposed between the surfaces of the adjacent lenses. In more detail, the effective diameter of the lens may be in a range of ±0.3 mm of the size of the inner diameter of the spacer disposed between the surfaces of the adjacent lenses. In more detail, the effective diameter of the lens may be in a range of ±0.2 mm of the size of the inner diameter of the spacer disposed between the surfaces of the adjacent lenses. In more detail, the effective diameter of the lens may be in a range of ±0.1 mm of the size of the inner diameter of the spacer disposed between the surfaces of the adjacent lenses.

Alternatively, the effective diameter of the lens may be related to a size of an inner diameter of a flange portion of the lens on which the spacer is supported.

In detail, the effective diameter may be a size of 2 mm or less, or a size of 1 mm or less, or a size of 0.3 mm or less with respect to the inner diameter of the flange portion.

The ineffective region may be disposed around the effective region. The ineffective region may be disposed at a periphery of the effective region. That is, the region other than the effective region of the lens may be the ineffective region. The ineffective region may be a region where light is not incident. That is, the ineffective region may be a region unrelated to the optical characteristics. In addition, the ineffective region may be a region fixed to a barrel (not shown) accommodating the lens.

The optical system 1000 according to the embodiment may include an aperture (not shown) for adjusting the amount of incident light. At least one aperture may be disposed between two adjacent lenses of the first lens 110, the second lens 120, the third lens 130, the fourth lens 140, the fifth lens 150, and the sixth lens 160. For example, the aperture may be disposed between the first lens 110 and a lens closest to the first lens 110. For example, the aperture may be disposed between the first lens 110 and the second lens 120.

In addition, at least one of the first lens 110, the second lens 120, the third lens 130, the fourth lens 140, the fifth lens 150, and the sixth lens 160 may serve as an aperture. For example, any one of the first lens 110, the second lens 120, the third lens 130, the fourth lens 140, the fifth lens 150, and the sixth lens 160 may serve as an aperture which adjusts the amount of light the object-side surface or the sensor-side surface of the lens. Accordingly, it is possible to reduce the overall length of the optical system by removing the aperture disposed between the lenses, thereby realizing miniaturization of the optical system.

At least one of the first lens 110, the second lens 120, the third lens 130, the fourth lens 140, the fifth lens 150, and the sixth lens 160 may include a free-form surface. That is, at least one of the first lens 110, the second lens 120, the third lens 130, the fourth lens 140, the fifth lens 150, and the sixth lens 160 may be a free form lens.

For example, a lens disposed last among the lenses of the optical system 1000 may be formed in a free-form shape. That is, the sixth lens 160 may be formed in a free-form shape. That is, when the optical system 1000 includes n lenses, the nth lens may be formed in a free-form shape.

Hereinafter, for convenience of description, the sixth lens 160 will be mainly described as a free form lens.

At least one of the eleventh surface S11 and the twelfth surface S12 of the sixth lens 160 may be formed in a free-form shape. In detail, at least one of the eleventh surface S11 and the twelfth surface S12 may include a free-form surface. For example, in the sixth lens 160, any one of the eleventh surface S11 and the twelfth surface S12 has the free-form surface, or both the eleventh surface S11 and the twelfth surface S12 may have the free-form surface.

The sixth lens 160 may have a double planar symmetry shape. In detail, the sixth lens 160 may have a shape symmetrical to an X-Z plane and a Y-Z plane. In addition, the sixth lens 160 may have a shape that is asymmetrical to the X-Y plane. That is, the sixth lens 160 may have a symmetrical shape on the X-axis and the Y-axis and may have an asymmetrical shape on the Z-axis.

FIGS. 2 to 4 are views for describing a free-form surface of the eleventh surface S11 of the sixth lens 160.

Referring to FIG. 2, the eleventh surface S11 of the sixth lens 160 may include a first effective region AA1 and a first ineffective region UA1. In detail, the eleventh surface S11 of the sixth lens 160 may include the first effective region AA1 that is a region through which light incident on the sixth lens 160 passes. The light incident on the sixth lens 160 may be refracted in the first effective region AA1 of the eleventh surface S11 of the sixth lens 160 to realize optical characteristics.

In addition, the eleventh surface S11 of the sixth lens 160 may include the first ineffective region UA1 that is a region through which the light incident on the sixth lens 160 does not pass. The light incident on the sixth lens 160 may not pass through the first ineffective region UA1 of the sixth lens 160. Accordingly, the first ineffective region UA1 of the eleventh surface S11 may be independent of the optical characteristics of the light incident on the sixth lens 160. In addition, a part of the first ineffective region UA1 may be fixed to a barrel accommodating the sixth lens 160.

Referring to FIG. 3, a virtual axis for setting coordinates of the eleventh surface S11 may be defined on the eleventh surface S11 of the sixth lens 160.

In detail, a first axis AX1 and a second axis AX2 may be set on the eleventh surface S11 of the sixth lens 160. The first axis AX1 may be defined as a direction parallel to a major axis of the image sensor unit 300. That is, the first axis AX1 may be defined as an axis passing through the optical axis OA and extending in a direction parallel to the major axis of the image sensor unit 300.

In addition, the second axis AX2 may be defined as a direction parallel to a minor axis of the image sensor unit 300. That is, the second axis AX2 may be defined as an axis passing through the optical axis OA and extending in a direction parallel to the minor axis of the image sensor unit 300.

For example, the first axis AX1 may be defined as an X axis and may be defined as an axis having angles of 0° and 180° with respect to the optical axis OA. In addition, the second axis AX2 may be defined as a Y axis and may be defined as an axis having angles of 90° and 270° with respect to the optical axis OA.

However, the embodiment is not limited thereto, and the first axis may be defined as the Y axis and the second axis may be defined as the X axis. Hereinafter, for convenience of description, a case in which the first axis AX1 is defined as the X axis and the second axis AX2 is defined as the Y axis will be mainly described.

The first axis AX1 and the second axis AX2 may be perpendicular to each other. That is, the first axis AX1 and the second axis AX2 may be perpendicular to each other on the optical axis OA. Accordingly, the first axis AX1 may be perpendicular to the optical axis OA. In addition, the second axis AX2 may be perpendicular to the optical axis OA. That is, the optical axis OA, the first axis AX1, and the second axis AX2 may be perpendicular to each other.

The eleventh surface S11 of the sixth lens 160 may include a plurality of coordinates respectively set on the first axis AX1 and the second axis AX2.

In detail, the eleventh surface S11 of the sixth lens 160 may include first coordinates C1 and third coordinates C3 set on the first axis AX1. In detail, the eleventh surface S11 of the sixth lens 160 may include the first coordinates C1 having coordinates of (±A,0) and the third coordinate C3 having coordinates of (±B,0) on the first axis AX1.

In addition, the eleventh surface S11 of the sixth lens 160 may have a first sag value S1 at the first coordinates C1 and a third sag value S3 at the third coordinates C3.

In addition, the eleventh surface S11 of the sixth lens 160 may include second coordinates C2 and fourth coordinates C4 set on the second axis AX2. In detail, the eleventh surface S11 of the sixth lens 160 may include the second coordinates C2 having coordinates of (0,±A) and the fourth coordinates C4 having coordinates of (0,±B) on the second axis AX2.

In addition, the eleventh surface S11 of the sixth lens 160 may have a second sag value S2 at the second coordinates C2 and a fourth sag value S4 at the fourth coordinates C4.

In this case, the sixth lens may satisfy Equations A to C below.

[Equation A]

$$\max|Sag\_O\_x\_6| \neq \max Sag\_O\_y\_6|$$

(In Equation A, max |Sag_O_x_6| refers to an absolute value of a maximum sag value in the X-axis direction on the object-side surface of the sixth lens, and max |Sag_O_y_6| refers to an absolute value of a maximum sag value in the Y-axis direction on the object-side surface of the sixth lens.)

In Equation A, a sag value of the sixth lens 160 may be defined as a distance between an arbitrary point and a point passing through the optical axis of the sixth lens 160. For example, a sag value of the eleventh surface S11 of the sixth lens 160 may be defined as a distance in the optical axis direction between a point at which the optical axis passes through the eleventh surface S11 and an arbitrary point on the eleventh surface S11. In addition, a sag value of the twelfth surface S12 of the sixth lens 160 may be defined as a distance in the optical axis direction between a point at which the optical axis passes through the twelfth surface S12 and an arbitrary point on the twelfth surface S12.

[Equation B]

$$5\ \mu m \leq \max|Sag\_O\_x\_6| - \max|Sag\_O\_y\_6| \leq 100\ \mu m$$

or, $$5\ \mu m \leq \max|Sag\_O\_x\_6| - \max|Sag\_O\_y\_6| \leq 90\ \mu m$$

or, $$5\ \mu m \leq \max|Sag\_O\_x\_6| - \max|Sag\_O\_y\_6| \leq 60\ \mu m$$

[Equation C]

$$|S2 - S1| > |S4 - S3|$$

$$|A| > |B|$$

$$|S4 - S3| \leq 20\ \mu m$$

or $$|S4 - S3| \leq 10\ \mu m$$

or $$|S4 - S3| \leq 3\ \mu m$$

In Equation C, each equation may be independent, or a plurality of equations may be combined with each other.

That is, on the eleventh surface S11 of the sixth lens 160, a difference between a sag value on the first axis and a sag value on the second axis at coordinates disposed far from the optical axis (0,0) may be greater than a difference between a sag value on the first axis and a sag value in the second axis at coordinates disposed close to the optical axis (0,0).

That is, on the eleventh surface S11 of the sixth lens 160, as further away from the optical axis (0,0), the difference between the sag value on the first axis and the sag value on the second axis may increase.

In addition, a range of the |S4–S3| value and the |S2–S1| value may be related to an amount of light incident on the image sensor unit through the sixth lens and the optical characteristics of the optical system.

In detail, when |S4–S3| is set to a value of 20 μm or less, 10 μm, or 3 μm, an amount of light passing through the sixth lens and incident toward the image sensor unit may be increased. In addition, when the |S2–S1| is set to an excessive value of the |S4−S3|, the amount of light passing through the sixth lens !60 and incident toward the image sensor unit may be increased. Accordingly, a relative illumination RI of the image sensor unit may be increased to 35% or more, and it is possible to have improved optical characteristics. That is, the optical system including the sixth lens may have improved MTF characteristics. In addition, it is possible to improve the resolution by increasing the amount of light incident on the image sensor unit.

Here, the relative illumination of the image sensor unit may be defined as a relative ratio between an illuminance in the brightest region and an illuminance in the darkest region among a plurality of regions of the image sensor unit. That is, when the relative illumination is 35% or more, it may refer that a magnitude of illuminance in the darkest region of the image sensor unit is 35% or more with respect to the illuminance in the brightest region of the image sensor unit.

However, when the |S4−S3| is set to a value greater than 20 μm, the amount of light passing through the sixth lens and incident toward the image sensor unit decreases, or the MTF characteristics of the entire optical system are lowered, so that the optical characteristics may be lowered.

That is, when |S4−S3| of the sixth lens does not satisfy a value of 20 μm or less, the amount of light incident to the image sensor unit may decrease to lower the resolution, or the overall optical characteristics of the optical system may be lowered to increase aberration and distortion.

FIG. 4 is a graph showing a difference in sag value according to differences between the first sag value S1, the second sag value S2, the third sag value S3, and the fourth sag value S4 on the eleventh surface S11 of the sixth lens 160.

In FIG. 4, an X axis is a distance (mm) on the optical axis, and a Y axis is a size (mm) of a sag value at coordinates determined by the distance on the optical axis.

Referring to FIG. 4, on the eleventh surface S11 of the sixth lens 160, an absolute value of the sag value on the first axis and the sag value on the second axis gradually increases as further away from the optical axis (0,0) and a difference between the sag value on the first axis and the sag value on the second axis increases from a specific point.

In addition, referring to FIG. 4, on the eleventh surface S11 of the sixth lens 160, it can be seen that a left and right sag value in the first axis AX1 direction and a vertical sag value in the second axis AX2 direction are symmetrical to each other.

Accordingly, the eleventh surface S11 of the sixth lens 160 on which the shape of the free-form surface is defined by the sag values may be symmetrical in the first axis AX1 direction and may be symmetrical in the second axis direction AX2. However, rotational symmetry from the first axis AX1 direction to the second axis AX2 direction is not satisfied.

Meanwhile, a sag value of the eleventh surface S11 of the sixth lens 160 may be set by Equation D below.

[Equation D]

$$z = \frac{cr^2}{1+\sqrt{(1+k)c^2r^2}} + \sum_{i=1}^{n} c_j z_j$$

(In Equation D, Z is a sag value of the sixth lens, c is a curvature value of the sixth lens, r is an effective diameter value of the sixth lens, k is a conic constant, and Cj is a Zernike coefficient at the j order, and Zj is a Zernike basis at the j order).

In addition, the first coordinates C1, the second coordinates C2, the third coordinates C3, and the fourth coordinates C4 may satisfy Equation E below.

[Equation E]

$$h_1 = H - t_1 * \tan(\theta_h - \alpha),$$

$$|B| < 0.7 * h_1 \le |A|$$

(In Equation E, $h_1$ is a distance spaced apart from the optical axis in the negative or positive direction of the first axis, H is half of the minor axis of the image sensor unit, $t_1$ is a distance from the eleventh surface S11 to the image sensor unit, and $\theta_h$ is the chief ray angle in the 0.6 field of the image sensor unit, and α is $\sin^{-1}(1/(2*F\ number))$. Here, when the center of the image sensor unit is set to 0 field and half of the diagonal length from the center of the image sensor unit to the corner is set to 1.0 field, the field of the image sensor unit may be defined as a relative distance from the center of the image sensor unit to any point of the diagonal length.)

Meanwhile, when the optical system is applied to a mobile display device such as a smart phone, an average angle of $\theta_h$ may be 34°.

In addition, the eleventh surface S11 of the sixth lens 160 may satisfy Equation F below.

[Equation F]

$$|S4 - S3| = 0$$

That is, the third sag value of the third coordinate and the fourth sag value of the fourth coordinate may be the same. That is, an absolute value of a difference between the third sag value of the third coordinate and the fourth sag value of the fourth coordinate satisfying Equation E may be 0 or more and may be 20 μm or less.

In detail, the absolute value of the difference between the third sag value of the third coordinate and the fourth sag value of the fourth coordinate satisfying Equation E may be 0 or more and may be 10 μm or less. In more detail, the absolute value of the difference between the third sag value of the third coordinate and the fourth sag value of the fourth coordinate satisfying Equation E may be 0 or more and may be 20 μm or less.

FIGS. 5 to 7 are views for describing a free-form surface of the twelfth surface S12 of the sixth lens 160.

Referring to FIG. 5, the twelfth surface S12 of the sixth lens 160 may include a second effective region AA2 and a second ineffective region UA2. In detail, the twelfth surface S12 of the sixth lens 160 may include the second effective region AA2 that is a region through which light incident on the sixth lens 160 passes. The light incident on the sixth lens 160 may be refracted in the second effective region AA2 of the twelfth surface S12 of the sixth lens 160 to realize optical characteristics.

In addition, the twelfth surface S12 of the sixth lens 160 may include the second ineffective region UA2 that is a region through which the light incident on the sixth lens 160 does not pass. The light incident on the sixth lens 160 may not pass through the second ineffective region UA2 of the sixth lens 160. Accordingly, the second ineffective region UA2 of the twelfth surface S12 may be independent of the optical characteristics of the light incident on the sixth lance 160. In addition, a part of the second ineffective region UA2 may be fixed to the barrel accommodating the sixth lens 160.

Referring to FIG. 6, a virtual axis for setting coordinates of the twelfth surface S12 may be set on the twelfth surface S12 of the sixth lens 160.

In detail, the first axis AX1 and the second axis AX2 may be set on the twelfth surface S12 of the sixth lens 160. The first axis AX1 may be defined in a direction parallel to the major axis of the image sensor unit 300. That is, the first axis AX1 may be defined as an axis passing through the optical axis OA and extending in a direction parallel to the major axis of the image sensor unit 300.

In addition, the second axis AX2 may be defined in a direction parallel to the minor axis of the image sensor unit 300. That is, the second axis AX2 may be defined as an axis passing through the optical axis OA and extending in a direction parallel to the minor axis of the image sensor unit 300.

For example, the first axis AX1 may be defined as an X axis and may be defined as an axis having angles of 0° and 180° with respect to the optical axis OA. In addition, the second axis AX2 may be defined as a Y axis and may be defined as an axis having angles of 90° and 270° with respect to the optical axis OA.

The first axis AX1 and the second axis AX2 may be perpendicular to each other. That is, the first axis AX1 and the second axis AX2 may be perpendicular to each other on the optical axis OA. Accordingly, the first axis AX1 may be perpendicular to the optical axis OA. In addition, the second axis AX2 may be perpendicular to the optical axis OA. That is, the optical axis OA, the first axis AX1, and the second axis AX2 may be perpendicular to each other.

The twelfth surface S12 of the sixth lens 160A may include a plurality of coordinates respectively set on the first axis AX1 and the second axis AX2.

In detail, the twelfth surface S12 of the sixth lens 160 may include fifth coordinates C5 and seventh coordinates C7 set on the first axis AX1. In detail, the twelfth surface S12 of the sixth lens 160 may include the fifth coordinates C5 having coordinates of (±C,0) and the seventh coordinates C7 having coordinates of (±D,0) on the first axis AX1.

In addition, the twelfth surface S12 of the sixth lens 160 may have a fifth sag value S5 at the fifth coordinates C5 and a seventh sag value S7 at the seventh coordinates C7.

In addition, the twelfth surface S12 of the sixth lens 160 may include sixth coordinates C6 and eighth coordinates C8 set on the second axis AX2. In detail, the twelfth surface S12 of the sixth lens 160 may include the sixth coordinates C6 having coordinates of (0,±C) and the eighth coordinates C8 having coordinates of (0,±D) on the second axis AX2.

In addition, the twelfth surface S11 of the sixth lens 160 may have a sixth sag value S6 at the sixth coordinates C6 and an eighth sag value S8 at the eighth coordinates C8.

In this case, the sixth lens may satisfy Equation G below.

[Equation G]

$$|S6 - S5| > |S8 - S7|$$

$$|C| > |D|$$

$$|S8 - S7| \leq 20\ \mu m,$$

-continued $$|S8 - S7| \leq 10\ \mu m,$$

or $$|S8 - S7| \leq 5\ \mu m$$

In Equation G, each equation may be independent, or a plurality of equations may be combined with each other.

In addition, a range of the |S8–S7| value may be related to an amount of light incident on the image sensor unit through the sixth lens 160 and the optical characteristics of the optical system.

In detail, when |S8–S7| is set to a value of 20 μm or less, 10 μm or less, or 5 μm or less, the amount of light passing through the sixth lens and incident toward the image sensor unit may be increased. In addition, when |S8–S7| of the sixth lens 160 is set to a value of 20 μm or less, 10 μm or less, or 5 μm, it is possible to have improved optical characteristics. That is, the optical system including the sixth lens may have improved MTF characteristics. In detail, when the |S6–S5| is set to a value exceeding the |S8–S7|, the amount of light passing through the sixth lens and incident toward the image sensor unit may be increased.

Accordingly, the relative illumination RI of the image sensor unit may be increased to 35% or more, and it is possible to have improved optical characteristics. That is, the optical system including the sixth lens may have improved MTF characteristics. In addition, it is possible to improve the resolution by increasing the amount of light incident on the image sensor unit However, when the |S8–S7| is set to a value exceeding 20 μm, the amount of light passing through the sixth lens and incident toward the image sensor unit is decreased, or the MTF characteristics of the entire optical system are deteriorated, so that the optical characteristics may be deteriorated.

That is, when |S8–S7| of the sixth lens does not satisfy a value of 20 μm or less, the amount of light incident on the image sensor unit is decreased to lower the resolution, or the overall optical characteristics of the optical system are deteriorated, so that aberration and distortion may be increased.

That is, on the twelfth surface S12 of the sixth lens 160, a difference between a sag value on the first axis and a sag value on the second axis at coordinates disposed far from the optical axis (0,0) may be greater than a difference between a sag value on the first axis and a sag value in the second axis at coordinates disposed close to the optical axis (0,0).

That is, on the twelfth surface S12 of the sixth lens 160, as further away from the optical axis (0,0), the difference between the sag value on the first axis and the sag value on the second axis may increase.

FIG. 7 is a graph showing a difference in sag value according to differences between the fifth sag value S5, the sixth sag value S6, the seventh sag value S7, and the eighth sag value S8 on the twelfth surface S12 of the sixth lens 160.

In FIG. 7, an X axis is a distance (mm) between the first axis and the second axis on the optical axis, and a Y axis is a size (mm) of a sag value at coordinates determined by the distance on the optical axis.

Referring to FIG. 7, on the twelfth surface S12 of the sixth lens 160, it can be seen that an absolute value of the sag value on the first axis and an absolute value of the sag value on the second axis gradually increases as further away from the optical axis (0,0) and a difference between the sag value on the first axis and the sag value on the second axis further increases from a specific point.

In addition, referring to FIG. 7, on the twelfth surface S12 of the sixth lens 160, it can be seen that left and right sag values based on the optical axis in the first axis AX1 direction and upper and lower sag values based on the optical axis in the second axis AX2 direction.

Accordingly, the twelfth surface S12 of the sixth lens 160 on which the shape of the free-form surface is defined by the sag values may be symmetrical in the first axis direction AX1 and may be symmetrical in the second axis direction AX2. However, rotational symmetry from the first axis AX1 to the second axis AX2 direction is not satisfied.

Meanwhile, a sag value of the twelfth surface S12 of the sixth lens 160 may be set by Equation H above.

In addition, the fifth coordinates C5, the sixth coordinates C6, the seventh coordinates C7, and the eighth coordinates C8 may satisfy Equation H below.

[Equation H]

$$h_2 = H - t_2 * \tan(\theta_h - \alpha),$$

$$|D| < 0.7 * h1 \leq |C|$$

(In Equation H, $h_2$ is a distance spaced apart from the optical axis in the negative or positive direction of the first axis, H is half of the minor axis of the image sensor unit, $t_2$ is a distance from the twelfth surface S12 to the image sensor unit, and en is the chief ray angle in the 0.6 field of the image sensor unit, and α is $\sin^{-1}(1/(2*F \text{ number}))$. Here, when half of the diagonal length from the center of the image sensor unit to the corner is set to 1.0 field, the field of the image sensor unit may be defined as a relative distance from the center of the image sensor unit to any point of the diagonal length.)

Meanwhile, when the optical system is applied to the mobile display device such as the smart phone, the average angle of $\theta_h$ may be 34°.

In addition, the twelfth surface S12 of the sixth lens 160 may satisfy Equation 1 below.

$$|S8 - S7| = 0 \quad \text{[Equation 1]}$$

That is, the seventh sag value of the seventh coordinate and the eighth sag value of the eighth coordinate may be the same.

FIGS. 8 and 9 are tables of sag values measured at various angles of the eleventh and twelfth surfaces of the sixth lens having a free-form surface.

In detail, FIGS. 8 and 9 are tables showing sag values at 0°, 30°, 45°, 53°, 60°, and 90°.

Referring to FIGS. 8 and 9, the eleventh and twelfth surfaces of the sixth lens may be symmetric in the first axis AX1 direction and symmetric in the second axis AX2 direction at all angles. However, the eleventh and twelfth surfaces of the sixth lens do not satisfy rotational symmetry from the first axis AX1 to the second axis AX2 direction at all angles. In the optical system according to the embodiment, the sixth lens may have a sag value set by the above equations and a relationship between the sag values, and the object-side surface and the sensor-side surface of the sixth lens may have a free-form surface formed by the sag value and the relationship between the sag values.

Accordingly, when light is incident on the image sensor unit through the optical system according to the embodiment, a relative illumination of the image sensor unit may be improved.

That is, in the optical system according to the embodiment, the light is incident on the image sensor unit through the sixth lens, and it is possible to expand a region where the light is incident from the optical system to the image sensor unit. Accordingly, when the light is incident on the image sensor unit, the relative illumination of the image sensor unit may be improved.

In detail, in the optical system according to the embodiment, when an illuminance in the brightest region and an illuminance in the darkest region of the image sensor unit are compared, light may be incident on the image sensor unit such that an illuminance of the darkest region has an illuminance of 30% or more with respect to the brightest region. In detail, in the optical system according to the embodiment, when the illuminance in the brightest region and the darkest region of the image sensor unit is compared, light may be incident on the image sensor unit such that an illuminance of the darkest region has an illuminance of 35% or more with respect to the brightest region. In more detail, in the optical system according to the embodiment, when the illuminance in the brightest region and the darkest region of the image sensor unit is compared, light may be incident on the image sensor unit such that an illuminance of the darkest region has an illuminance of 45% or more with respect to the brightest region.

Therefore, the optical system according to the embodiment may have improved optical characteristics without increasing a size of the lenses in order to increase the amount of light incident on the image sensor unit. That is, the amount of light incident on the image sensor unit may be increased while maintaining the size of the lenses and maintaining the improved optical characteristics.

In addition, the optical module according to the embodiment may realize miniaturization of the optical system and the optical module by the sixth lens having a free-form surface.

In detail, the optical module according to the embodiment may improve the relative illumination while reducing a size of the optical system and the optical module.

When there is no sixth lens including the free-form surface, the TTL (optical-axis direction distance between the first lens and the image sensor unit) of the optical system should be increased in order to improve the relative illumination, but the optical module according to the embodiment may improve the relative illumination without increasing the TTL by controlling a movement direction of light by the sixth lens including the free-form surface.

That is, the optical module according to the embodiment may reduce a size of the TTL by 10% to 20% compared to the optical module not including the sixth lens including the free-form surface. Accordingly, it is possible to realize the miniaturization of the optical module, and the optical module may be easily applied to various display devices.

In addition, the optical module according to the embodiment may have an improved MTF and improved resolution by the sixth lens having the free-form surface.

In detail, the optical module according to the embodiment may have improved MTF characteristics by increasing the amount of light incident on the image sensor unit from the sixth lens having the free-form surface.

In addition, the optical module according to the embodiment may prevent a reduction in resolution occurring in a process of correcting after image acquisition by improving the relative illumination of the light incident on the image sensor unit.

That is, an optical module that does not include a lens having a free-form surface has a low relative illumination of the image sensor unit, and thus it is necessary to obtain an image through the image sensor unit and then correct the image to a desired image size, and the resolution of the optical module may be deteriorated in the correction process.

However, since the optical module according to the embodiment increases the relative illumination of the image sensor unit by the lens having the free-form surface, thereby does not require correction, it is possible to prevent a reduction in resolution that may occur due to the correction process. Therefore, it is possible to have improved resolution.

Meanwhile, the fourth lens 140 and the fifth lens 150 disposed adjacent to the sixth lens 160 as a freeform lens may be formed in a shape in which a shape of a peripheral portion of the lens is bent toward the object-side surface. In detail, the fourth lens 140 and the fifth lens 150 may be formed in a shape in which the shape of the lens is bent toward the object-side surface from the optical axis toward the end of the effective diameter of the lens.

The shapes of the fourth lens 140 and the fifth lens 150 may be defined by a change in a slope angle of the lens. In addition, a thickness and a space for each position of the fourth lens 140 and the fifth lens 150 may be defined by changes in slope angles of the fourth lens 140 and the fifth lens 150.

FIG. 10 is a view for describing a slope angle of a lens of an optical module according to an embodiment. The definition of the slope angle of the lens described in FIG. 10 may be equally applied to the first to sixth lenses.

Referring to FIG. 10, a normal line passing through an arbitrary point of an object-side surface OS of a lens L may be defined on the lens L. In detail, the normal line extending in a direction perpendicular to a tangent line passing through the arbitrary point of the object-side surface OS and passing through the arbitrary point may be defined on the object-side surface OS of the lens.

Accordingly, a slope angle defined as an interior angle formed by the normal line passing through the arbitrary point of the object-side surface OS and the optical axis may be defined on the object-side surface OS of the lens.

In the slope angle, a value of the slope angle may be expressed as positive (+) or negative (−) depending on a position at which the interior angle is formed. In detail, when the interior angle is formed toward the sensor-side based on the object-side surface OS of the lens, the slope angle may be positive (+). In addition, when the interior angle is formed toward the object-side based on the object-side surface OS, the slope angle may be negative (−). That is, the increase or decrease of the slope angle of the lens L may be determined based on an absolute value of the slope angle. That is, the description of a size of the slope angle described below will be described based on a size of the absolute value of the slope angle which is an absolute value of the interior angle.

In the lens L, a first end E1 and a second end E2 configured to define an effective region of the object-side surface OS of the lens may be defined. In detail, the first end E1 and the second end E2 in the X-axis or Y-axis direction may be defined on the optical axis the object-side surface OS of the lens.

In this case, the size of the slope angle of the object-side surface OS of the lens may change depending on a position in a first region 1A from the optical axis OA to the first end E1 and a second region 2A from the optical axis OA to the second end E2. Each of the first region 1A and the second region 2A may be defined as an effective radius which is half of an effective diameter (effective region) of the object-side surface OS of the lens.

A first slope angle θ1 in the first region 1A and a second slope angle θ2 in the second region 2A may be defined on the object-side surface OS of the lens.

The first slope angle θ1 and the second slope angle θ2 may have positive (+) or negative (−) values depending on a position of the interior angle.

Similarly, a slope angle may also be defined on a sensor-side surface SS of the lens. In detail, in the lens L, a normal line passing through an arbitrary point of the sensor-side surface SS of the lens may be defined on the lens L. In detail, the normal line extending in a direction perpendicular to a tangent line passing through the arbitrary point of the sensor-side surface SS and passing through the arbitrary point may be defined on the sensor-side surface SS of the lens.

Accordingly, a slope angle defined as an interior angle formed by the normal line passing through the arbitrary point of the sensor-side surface SS and the optical axis may be defined may be defined on the sensor-side surface SS of the lens.

In this case, the size of the slope angle of the sensor-side surface SS of the lens may change depending on a position in a third region 3A from the optical axis OA to a third end E3 and a fourth region 4A from the optical axis OA to a fourth end E4. Each of the third region 3A and the fourth region 4A may be defined as an effective radius which is half of an effective diameter (effective region) of the sensor-side surface SS of the lens.

A third slope angle θ3 in the third region 3A and a fourth slope angle θ4 in the fourth region 4A may be defined on the sensor-side surface SS of the lens.

The third slope angle θ3 and the fourth slope angle θ4 may have positive (+) or negative (−) values depending on a position of the interior angle.

The slope angle may change while moving from the optical axis of the lens toward the end of the effective diameter on the fourth lens 140 and the fifth lens 150. In detail, the optical module according to the embodiment may improve the optical characteristics of the optical module by setting a slope angle for each position of the sixth lens 160 that is a freeform lens and the fourth lens 140 and the fifth lens 150 disposed adjacent to the sixth lens 160, a thickness and spacing set by the slope angle within a set range.

First, the fourth lens 140 will be described.

A size of a slope angle of a seventh surface S7 of the fourth lens 140 may change depending on a position of the seventh surface S7. In detail, the size of the slope angle of the seventh surface S7 may change depending on a position within an effective region of the seventh surface S7. In more detail, the size of the slope angle of the seventh surface S7 may change for each position of the seventh surface S7 while extending from the optical axis in the X-axis or Y-axis direction of the seventh surface S7 perpendicular to the optical axis.

In detail, the first slope angle θ1 and the second slope angle θ2 of the seventh surface S7 may change in the first region 1A and the second region 2A. In detail, the first slope angle θ1 may increase in the first region 1A, and the second slope angle θ2 may increase in the second region 2A.

That is, as the seventh surface S7 extends from the optical axis toward the first end E1, an absolute value of the first slope angle θ1 may increase and then decrease, or increase and then decrease and then increase again. In addition, while extending from the optical axis toward the second end E2, an absolute value of the second slope angle θ2 may increase and then decrease, or increase and then decrease and then increase again.

In detail, when an entire distance from the optical axis to the first end E1 and an entire distance from the optical axis to the second end E2 are defined as 1, in the first region and the second region of the seventh surface S7, absolute values of the first slope angle θ1 and the second slope angle θ2 may increase in the first region and the second region from the optical axis up to 0.4 toward the first end E1 and the second end E2. That is, the absolute values of the first slope angle θ1 and the second slope angle θ2 may increase in the first and second regions from the optical axis to a distance of 40% of the effective radius of the seventh surface S7.

In addition, in the first region and the second region of the seventh surface S7, the absolute values of the first slope angle θ1 and the second slope angle θ2 may increase in the first region and the second region from the optical axis up to 0.65 to 0.95 toward the first end E1 and the second end E2. That is, the absolute values of the first slope angle θ1 and the second slope angle θ2 may increase in the first and second regions from the optical axis to a distance of 65% to 95% of the effective radius of the seventh surface S7.

In addition, in the first region and the second region of the seventh surface S7, the absolute values of the first slope angle θ1 and the second slope angle θ2 may increase or decrease in the first and second regions from the optical axis up to more than 0.4 to less than 0.65 toward the first end E1 and the second end E2.

That is, in the first and second regions from the optical axis up to more than 0.4 to less than 0.65 toward the first end E1 and the second end E2, a region where the absolute values of the first slope angle θ1 and the second slope angle θ2 decrease may exist, and a point at which signs of the first slope angle θ1 and the second slope angle θ2 are changed may exist. That is, in the first region and the second region from the optical axis to a distance of more than 40% to less than 65% of the effective radius of the seventh surface S7, the region where the absolute values of the first slope angle θ1 and the second slope angle θ2 decrease may exist, and a critical point may be positioned near the point at which the signs of the first slope angle θ1 and the second slope angle θ2 are changed.

The first region and the second region of the seventh surface S7 of the fourth lens 140 may be formed in a shape in which a curvature is gradually increased or decreased while extending from the optical axis toward the first end E1 and the second end E2. That is, a shape of the seventh surface S7 of the fourth lens 140 may be bent in a shape in which the curvature is gradually increased or decreased while extending from the optical axis toward the first end E1 and the second end E2. That is, the first and second regions of the seventh surface S7 of the fourth lens 140 may be formed in a shape in which the curvature is gradually increased or decreased and then increased again while extending from the optical axis toward the first end E1 and the second end E2. In particular, the shape of the seventh surface S7 may be a shape in which the curvature is gradually increased while extending from a region exceeding 65% of the effective radius of the seventh surface S7 toward the first end E1 and the second end E2. That is, the shape of the seventh surface S7 may be a shape in which the seventh surface S7 is more bent in the optical axis direction while extending from the region exceeding 65% of the effective radius of the seventh surface S7 toward the first end E1 and the second end E2.

Accordingly, the seventh surface S7 may be formed in a shape in which the curvature is gradually increased while extending from the optical axis toward the first end E1 and the second end E2. That is, the seventh surface S7 may be formed to have a shape bent toward the object-side, and to increase curvature while extending from the optical axis toward the first end E1 and the second end E2.

In addition, a change amount of the first slope angle θ1 and the second slope angle θ2 of the seventh surface S7 may be gradually increased while extending from the optical axis toward the first end E1 and the second end E2.

In detail, when the entire distance from the optical axis to the first end E1 is defined as 1, in the first region of the seventh surface S7, a change amount of the first slope angle θ1 in the first region from the optical axis up to 0.5 toward the first end E1 may be smaller than a change amount of the slope angle in the first region up to more than 0.5 to 1.

In addition, in the second region of the seventh surface S7, a change amount of the second slope angle θ2 in the second region from the optical axis up to 0.5 toward the second end E2 may be smaller than a change amount of the slope angle in the second region up to more than 0.5 to 1.

That is, a change amount of the first slope angle θ1 and the second slope angle θ2 of more than 50% to 100% of the effective radius of the seventh surface S7 on the optical axis may be greater than a change amount of the first slope angle θ1 and the second slope angle θ2 of 50% or less.

Accordingly, the seventh surface S7 may be formed in a shape having a small curvature and a small curvature change amount in the first and second regions from the optical axis up to 50% of the effective diameter and having a large curvature and a large curvature change amount while extending from more than 50% to the end of the effective diameter.

In addition, a size of a slope angle of the eighth surface S8 of the fourth lens 140 may change depending on a position of the eighth surface S8. In detail, the size of the slope angle of the eighth surface S8 may change depending on a position within an effective region of the eighth surface S8. In more detail, the size of the slope angle of the eighth surface S8 may change for each position of the eighth surface S8 while extending from the optical axis in the X-axis or Y-axis direction of the eighth surface S8 perpendicular to the optical axis.

In detail, the third slope angle θ3 and the fourth slope angle θ4 of the eighth surface S8 may change in the third region 3A and the fourth region 4A. In detail, the third slope angle θ3 may increase in the third region 3A, and the fourth slope angle θ4 may increase in the fourth region 4A.

That is, as the eighth surface S8 extends from the optical axis toward the third end E3, an absolute value of the third slope angle θ3 may increase and then decrease, or increase and then decrease and then increase again. In addition, while extending from the optical axis toward the fourth end E4, an absolute value of the fourth slope angle θ4 may increase and then decrease, or increase and decrease and then increase again.

In detail, when an entire distance from the optical axis to the third end E3 and an entire distance from the optical axis to the fourth end E4 are defined as 1, in the third region and the fourth region of the eighth surface S8, absolute values of the third slope angle θ3 and the fourth slope angle θ4 may increase in the third region and the fourth region from the optical axis up to 0.3 toward the third end E3 and the fourth end E4. That is, the absolute values of the third slope angle θ3 and the fourth slope angle θ4 may increase in the third and fourth regions from the optical axis to a distance of 30% of the effective radius of the eighth surface S8.

In addition, in the third region and the fourth region of the eighth surface S8, the absolute values of the third slope angle θ3 and the fourth slope angle θ4 may increase in the third region and the fourth region from the optical axis up to 0.55 to 0.95 toward the third end E3 and the fourth end E4. That is, the absolute values of the third slope angle θ3 and the fourth slope angle θ4 may increase in the third and fourth regions from the optical axis to a distance of 55% to 95% of the effective radius of the eighth surface S8.

In addition, in the third region and the fourth region of the eighth surface S8, the absolute values of the third slope angle θ3 and the fourth slope angle θ4 may increase or decrease in the third and fourth regions from the optical axis up to more than 0.3 to less than 0.55 toward the third end E3 and the fourth end E4.

That is, in the third and fourth regions from the optical axis up to more than 0.3 to less than 0.55 toward the third end E3 and the fourth end E4, a region where the absolute values of the third slope angle θ3 and the fourth slope angle θ4 decrease may exist, and a point at which signs of the third slope angle θ3 and the fourth slope angle θ4 are changed may exist. That is. In the third and fourth regions from the optical axis to a distance of more than 30% to less than 55% of the effective radius of the eighth surface S8, the region where the absolute values of the third slope angle θ3 and the fourth slope angle θ4 decrease may exist, and a critical point may be positioned near the point at which the signs of the third slope angle θ3 and the fourth slope angle θ4 are changed.

The third region and the fourth region of the eighth surface S8 of the fourth lens 140 may be formed in a shape in which a curvature is gradually increased or decreased while extending from the optical axis toward the third end E3 and the fourth end E4. That is, a shape of the eighth surface S8 of the fourth lens 140 may be bent in a shape in which the curvature is gradually increased or decreased while extending from the optical axis toward the third end E3 and the fourth end E4. That is, the third and fourth regions of the eighth surface S8 of the fourth lens 140 may be formed in a shape in which the curvature is gradually increased or decreased and then increased again while extending from the optical axis toward the third end E3 and the fourth end E4. In particular, the shape of the eighth surface S8 may be a shape in which the curvature is gradually increased while extending from a region exceeding 55% of the effective radius of the eighth surface S8 toward the third end E3 and the fourth end E4. That is, the shape of the eighth surface S8 may be a shape in which the seventh surface S7 is more bent in the optical axis direction while extending from the region exceeding 55% of the effective radius of the eighth surface S8 toward the first end E1 and the second end E2.

Accordingly, the eighth surface S8 may be formed in a shape in which the curvature is gradually increased while extending from the optical axis toward the third end E3 and the fourth end E4. That is, the eighth surface S8 may be formed to have a shape bent toward the object-side, and to increase curvature while extending from the optical axis toward the third end E3 and the fourth end E4.

In addition, a change amount of the third slope angle θ3 and the fourth slope angle θ4 of the eighth surface S8 may be gradually increased while extending from the optical axis toward the third end E3 and the fourth end E4.

In detail, when the entire distance from the optical axis to the third end E3 is defined as 1, in the third region of the eighth surface S8, a change amount in the third slope angle θ3 in the first region from the optical axis up to 0.5 toward the third end E3 may be smaller than a change amount of the slope angle in the third region up to more than 0.5 to 1.

In addition, in the fourth region of the eighth surface S8, a change amount of the fourth slope angle θ4 in the fourth region from the optical axis up to 0.5 toward the fourth end E4 may be smaller than a change amount of the slope angle in the fourth region up to more than 0.5 to 1.

That is, the change amount of the third slope angle θ3 and the fourth slope angle θ4 of more than 50% to 100% of the effective radius of the eighth surface S8 on the optical axis may be greater than the change amount of the third slope angle θ3 and the fourth slope angle θ4 of 50% or less.

Accordingly, the eighth surface S8 may be formed in a shape having a small curvature and a small curvature change amount in the first and second regions from the optical axis up to 50% of the effective diameter and having a large curvature and a large curvature change amount while extending from more than 50% to the end of the effective diameter.

In addition, a thickness of the fourth lens 140 may change while extending from the optical axis toward the effective diameter. In detail, the thickness of the fourth lens 140 may change while extending from the optical axis toward the first end E1 or the second end E2 that is the effective region of the seventh surface S7.

For example, as the fourth lens 140 extends from the optical axis toward the first end E1 that is the effective region of the seventh surface S7, the thickness of the fourth lens 140 may increase, or increase and then decrease and then increase again. In addition, as the fourth lens 140 extends from the optical axis toward the second end E2 that is the effective region of the seventh surface S7, the thickness of the fourth lens 140 may increase, or increase and then decrease and then increase again.

A maximum thickness of the fourth lens 140 may be an end of an effective region of the fourth lens 140. In addition, a minimum thickness of the fourth lens 140 may be within an effective region of the fifth lens 150. For example, the minimum thickness of the fourth lens 140 may be a thickness at a distance of 65% to 85% of an entire distance between the first end and the second end from the optical axis of the fourth lens 140.

In addition, in the fourth lens 140, a sag value may change while extending from the optical axis toward the effective diameter.

A size of a sag value of the seventh surface S7 of the fourth lens 140 may change depending on the position of the seventh surface S7. In detail, the size of the sag value of the seventh surface S7 may change depending on a position within the effective region of the seventh surface S7. In more detail, the size of the sag value of the seventh surface S7 may change for each position of the seventh surface S7 while extending from the optical axis in the X-axis or Y-axis direction of the seventh surface S7 perpendicular to the optical axis.

In detail, the sag value of the seventh surface S7 may change in the first region 1A and the second region 2A. In detail, the sag value may increase, decrease, and then increase again in the first region 1A, and may increase, decrease, and then increase again in the second region 2A.

That is, as the seventh surface S7 extends from the optical axis toward the first end E1, an absolute value of the sag value may gradually increase, decrease, and then increase again, and as the seventh surface S7 extends from the optical axis toward the second end E2, the absolute value of the sag value may gradually increase, decrease, and then increase again.

In addition, the seventh surface S7 may include a region where a sign of a sag value is changed. In detail, in the first region and the second region of the seventh surface S7, a sign of a sag value in the first region and the second region from the optical axis up to more than 0.55 to 0.85 toward the first end E1 and the second end E2 may change.

In addition, a change amount of the sag value of the seventh surface S7 may gradually increase while extending from the optical axis toward the first end E1 and the second end E2.

In detail, in the first region of the seventh surface S7, a change amount of a sag value in the first region from the optical axis up to 0.5 toward the first end E1 may be smaller than a change amount of a sag value in the first region up to more than 0.5 to 1.

In addition, in the second region of the seventh surface S7, a change amount of a sag value in the second region from the optical axis up to 0.5 toward the second end E2 may be smaller than a change amount in a sag value in the second region up to more than 0.5 to 1.

That is, a change amount of a sag value of more than 50% to 100% of the effective radius of the seventh surface S7 on the optical axis may be greater than a change amount of a sag value of 50% or less.

In addition, a size of a sag value of the eighth surface S8 of the fourth lens 140 may change depending on the position of the eighth surface S8. In detail, the size of the sag value of the eighth surface S8 may change depending on a position within the effective region of the eighth surface S8. In more detail, the size of the sag value of the eighth surface S8 may change for each position of the eighth surface S8 while extending from the optical axis in the X-axis or Y-axis direction of the eighth surface S8 perpendicular to the optical axis.

In detail, the sag value of the eighth surface S8 may change in the third region 3A and the fourth region 4A. In detail, the sag value may increase and then decrease in the third region 3A and the fourth region 4A. In more detail, the sag value may increase, decrease, and then increase again in the third region 3A and the fourth region 4A.

That is, as the eighth surface S8 extends from the optical axis toward the third end E3 and the fourth end E4, an absolute value of the sag value may gradually increase, decrease, and then increase again.

For example, in the third region and the fourth region of the eighth surface S8, a sag value in the third region and the fourth region from the optical axis up to 0.1 to 0.4 toward the third end E3 and the fourth end E4 may increase.

In addition, in the third region and the fourth region of the eighth surface S8, a sag value in the third region and the fourth region from the optical axis up to more than 0.4 to 0.5 toward the third end E3 and the fourth end E4 may decrease.

In addition, in the third region and the fourth region of the eighth surface S8, a sag value in the third region and the fourth region from the optical axis up to more than 0.5 to 1 toward the third end E3 and the fourth end E4 may increase.

In addition, the eighth surface S8 may include a region where a sign of a sag value is changed. In detail, in the third region and the fourth region of the eighth surface S8, a sign of a sag value in the third region and the fourth region from the optical up to more than 0.55 to 0.85 toward the third end E3 and the fourth end E4 may change.

In addition, a change amount in the sag value of the eighth surface S8 may gradually increase while extending from the optical axis toward the third end E3 and the fourth end E4.

In detail, in the third region and the fourth region of the eighth surface S8, a change amount of a sag value in the third region and the fourth region from the optical axis up to 0.5 toward the third end E3 and the fourth end E4 may be smaller than a change amount of a sag value in the third region up to more than 0.5 to 1.

That is, a change amount of a sag value of more than 50% to 100% of the effective radius of the eighth surface S8 on the optical axis may be greater than a change amount of a sag value of 50% or less.

Hereinafter, the fifth lens 150 will be described.

A size of a slope angle of a ninth surface S9 of the fifth lens 150 may change depending on a position of the ninth surface S9. In detail, the size of the slope angle of the ninth surface S9 may change depending on a position within an effective region of the ninth surface S9. In more detail, the size of the slope angle of the ninth surface S9 may change for each position of the ninth surface S9 while extending from the optical axis in the X-axis or Y-axis direction of the ninth surface S9 perpendicular to the optical axis.

In detail, the first slope angle θ1 and the second slope angle θ2 of the ninth surface S9 may change in the first region 1A and the second region 2A. In detail, the first slope angle θ1 may increase in the first region 1A, and the second slope angle θ2 may increase in the second region 2A.

That is, as the ninth surface S9 extends from the optical axis toward the first end E1, an absolute value of the first slope angle θ1 may increase and then decrease, or increase and then decrease and then increase again. In addition, while extending from the optical axis toward the second end E2, an absolute value of the second slope angle θ2 may increase and then decrease, or increase and then decrease and then increase again.

In detail, when an entire distance from the optical axis to the first end E1 and an entire distance from the optical axis to the second end E2 are defined as 1, in the first region and the second region of the ninth surface S9, absolute values of the first slope angle θ1 and the second slope angle θ2 may increase in the first region and the second region from the optical axis up to 0.4 toward the first end E1 and the second end E2. That is, the absolute values of the first slope angle θ1 and the second slope angle θ2 may increase in the first and second regions from the optical axis to a distance of 40% of the effective radius of the ninth surface S9.

In addition, in the first region and the second region of the ninth surface S9, the absolute values of the first slope angle θ1 and the second slope angle θ2 may increase in the first region and the second region from the optical axis up to 0.65 to 0.95 toward the first end E1 and the second end E2. That is, the absolute values of the first slope angle θ1 and the second slope angle θ2 may increase in the first and second regions from the optical axis to a distance of 65% to 95% of the effective radius of the ninth surface S9.

In addition, in the first region and the second region of the ninth surface S9, the absolute values of the first slope angle θ1 and the second slope angle θ2 may increase or decrease in the first and second regions from the optical axis up to more than 0.4 to less than 0.65 toward the first end E1 and the second end E2.

That is, in the first and second regions from the optical axis up to more than 0.4 to less than 0.65 toward the first end E1 and the second end E2, a region where the absolute values of the first slope angle θ1 and the second slope angle θ2 decrease may exist, and a point at which signs of the first slope angle θ1 and the second slope angle θ2 are changed may exist. That is, in the first region and the second region from the optical axis to a distance of more than 40% to less than 65% of the effective radius of the ninth surface S9, the region where the absolute values of the first slope angle θ1 and the second slope angle θ2 decrease may exist, and a critical point may be positioned near the point at which the signs of the first slope angle θ1 and the second slope angle θ2 are changed.

The first region and the second region of the ninth surface S9 of the fifth lens 150 may be formed in a shape in which a curvature is gradually increased or decreased while extending from the optical axis toward the first end E1 and the second end E2. That is, a shape of the ninth surface S9 of the fifth lens 150 may be bent in a shape in which the curvature is gradually increased or decreased while extending from the optical axis toward the first end E1 and the second end E2. That is, the first and second regions of the ninth surface S9 of the fifth lens 150 may be formed in a shape in which the curvature is gradually increased or decreased and then increased again while extending from the optical axis toward the first end E1 and the second end E2. In particular, the shape of the ninth surface S9 may be a shape in which the curvature is gradually increased while extending from a region exceeding 65% of the effective radius of the effective radius of the ninth surface S9 toward the first end E1 and the second end E2. That is, the shape of the ninth surface S9 may be a shape in which the ninth surface S9 is more bent in the optical axis direction while extending from the region exceeding 65% of the effective radius of the ninth surface S9 toward the first end E1 and the second end E2.

Accordingly, the ninth surface S9 may be formed in a shape in which the curvature is gradually increased while extending from the optical axis toward the first end E1 and the second end E2. That is, the ninth surface S9 may be formed to have a shape bent toward the object-side, and to increase curvature while extending from the optical axis toward the first end E1 and the second end E2.

In addition, a change amount of the first slope angle θ1 and the second slope angle θ2 of the ninth surface S9 may be gradually increased while extending from the optical axis toward the first end E1 and the second end E2.

In detail, when the entire distance from the optical axis to the first end E1 is defined as 1, the first region of the ninth surface S9, a change amount of the first slope angle θ1 in the first region from the optical axis up to 0.5 toward the first end E1 may be smaller than a change amount of the slope angle in the first region up to more than 0.5 to 1.

In addition, in the second region of the ninth surface S9, a change amount of the second slope angle θ2 in the second region from the optical axis up to 0.5 toward the second end E2 may be smaller than a change amount of the slope angle in the second region up to more than 0.5 to 1.

That is, a change amount of the first slope angle θ1 and the second slope angle θ2 of more than 50% to 100% of the effective radius of the ninth surface S9 on the optical axis may be greater than a change amount of the first slope angle θ1 and the second slope angle θ2 of 50% or less.

Accordingly, the ninth surface S9 may be formed in a shape having a small curvature and a small curvature change amount in the first and second regions from the optical axis up to 50% of the effective diameter and having a large curvature and a large curvature change amount while extending from more than 50% to the end of the effective diameter.

In addition, a size of a slope angle of the tenth surface S10 of the fifth lens 150 may change depending on a position of the tenth surface S10. In detail, the size of the slope angle of the tenth surface S10 may change depending on a position within an effective region of the tenth surface S10. In more detail, the size of the slope angle of the tenth surface S10 may change for each position of the tenth surface S10 while extending from the optical axis in the X-axis or Y-axis direction of the tenth surface S10 perpendicular to the optical axis.

In detail, the third slope angle θ3 and the fourth slope angle θ4 of the tenth surface S10 may change in the third region 3A and the fourth region 4A. In detail, the third slope angle θ3 may increase in the third region 3A, and the fourth slope angle θ4 may increase in the fourth region 4A.

That is, as the tenth surface S10 extends from the optical axis toward the third end E3, an absolute value of the third slope angle θ3 may increase and then decrease, or increase and then decrease and then increase again. In addition, while extending from the optical axis toward the fourth end E4, an absolute value of the fourth slope angle θ4 may increase and then decrease, or increase and decrease and then increase again.

In detail, when an entire distance from the optical axis to the third end E3 and an entire distance from the optical axis to the fourth end E4 are defined as 1, in the third region and the fourth region of the tenth surface S10, absolute values of the third slope angle θ3 and the fourth slope angle θ4 may increase in the third region and the fourth region from the optical axis up to 0.3 toward the third end E3 and the fourth end E4. That is, the absolute values of the third slope angle θ3 and the fourth slope angle θ4 may increase in the third and fourth regions from the optical axis to a distance of 30% of the effective radius of the tenth surface S10.

In addition, in the third region and the fourth region of the tenth surface S10, the absolute values of the third slope angle θ3 and the fourth slope angle θ4 may increase in the third region and the fourth region from the optical axis up to 0.55 to 0.95 toward the third end E3 and the fourth end E4. That is, the absolute values of the third slope angle θ3 and the fourth slope angle θ4 may increase in the third and fourth regions from the optical axis to a distance of 55% to 95% of the effective radius of the tenth surface S10.

In addition, in the third region and the fourth region of the tenth surface S10, the absolute values of the third slope angle θ3 and the fourth slope angle θ4 may increase or decrease in the third and fourth regions from the optical axis up to more than 0.3 to less than 0.55 toward the third end E3 and the fourth end E4.

That is, in the third and fourth regions from the optical axis up to more than 0.3 to less than 0.55 toward the third end E3 and the fourth end E4, a region where the absolute values of the third slope angle θ3 and the fourth slope angle θ4 decrease may exist, and a point at which signs of the third slope angle θ3 and the fourth slope angle θ4 are changed may exist. That is. In the third and fourth regions from the optical axis to a distance of more than 30% to less than 55% of the effective radius of the tenth surface S10, the region where the absolute values of the third slope angle θ3 and the fourth slope angle θ4 decrease may be positioned.

The third region and the fourth region of the tenth surface S10 of the fifth lens 150 may be formed in a shape in which a curvature is gradually increased or decreased while extending from the optical axis toward the third end E3 and the fourth end E4. That is, a shape of the tenth surface S10 of the fifth lens 150 may be bent in a shape in which the curvature is gradually increased or decreased while extending from the optical axis toward the third end E3 and the fourth end E4. That is, in the embodiment of the present invention, the third and fourth regions of the tenth surface S10 of the fifth lens 150 may be formed in a shape in which the curvature is gradually increased or decreased and then increased again while extending from the optical axis toward the third end E3 and the fourth end E4. In particular, the shape of the tenth surface S10 may be a shape in which the curvature is gradually increased while extending from a region exceeding 55% of the effective radius of the tenth surface S10 toward the third end E3 and the fourth end E4. That is, the shape of the tenth surface S10 may be a shape in which the tenth surface S10 is more bent in the optical axis direction while extending from the region exceeding 55% of the effective radius of the tenth surface S10 toward the first end E1 and the second end E2.

Accordingly, the tenth surface S10 may be formed in a shape in which the curvature is gradually increased while extending from the optical axis toward the third end E3 and the fourth end E4. That is, the tenth surface S10 may be formed to have a shape bent toward the object-side, and to increase curvature while extending from the optical axis toward the third end E3 and the fourth end E4.

In addition, a change amount of the third slope angle θ3 and the fourth slope angle θ4 of the tenth surface S10 may be gradually increased while extending from the optical axis toward the third end E3 and the fourth end E4.

In detail, when the entire distance from the optical axis to the third end E3 is defined as 1, in the third region of the tenth surface S10, a change amount in the third slope angle θ3 in the first region from the optical axis up to 0.5 toward the third end E3 may be smaller than a change amount of the slope angle in the third region up to more than 0.5 to 1.

In addition, in the fourth region of the tenth surface S10, a change amount of the fourth slope angle θ4 in the fourth region from the optical axis up to 0.5 toward the fourth end E4 may be smaller than a change amount of the slope angle in the fourth region up to more than 0.5 to 1.

That is, the change amount of the third slope angle θ3 and the fourth slope angle θ4 of more than 50% to 100% of the effective radius of the tenth surface S10 on the optical axis may be greater than the change amount of the third slope angle θ3 and the fourth slope angle θ4 of 50% or less.

Accordingly, the tenth surface S10 may be formed in a shape having a small curvature and a small curvature change amount in the first and second regions from the optical axis up to 50% of the effective diameter and having a large curvature and a large curvature change amount while extending from more than 50% to the end of the effective diameter.

In addition, a thickness of the fifth lens 150 may change while extending from the optical axis toward the effective diameter. In detail, the thickness of the fifth lens 150 may change while extending from the optical axis toward the first end E1 or the second end E2 that is the effective region of the seventh surface S7.

For example, as the fifth lens 150 extends from the optical axis toward the first end E1 that is the effective region of the seventh surface S7, the thickness of the fifth lens 150 may increase, or increase and then decrease and then increase again. In addition, as the fifth lens 150 extends from the optical axis toward the second end E2 that is the effective region of the ninth surface S9, the thickness of the fifth lens 150 may increase, decrease, or decrease and then increase again.

A maximum thickness of the fifth lens 150 may be an end of an effective region of the fifth lens 150. In addition, a minimum thickness of the fifth lens 150 may be within an effective region of the fifth lens 150. For example, the minimum thickness of the fifth lens 150 may be a thickness at a distance of 65% to 85% of an entire distance between the first end and the second end from the optical axis of the fifth lens 150.

In addition, in the fifth lens 150, a sag value may change while extending from the optical axis toward the effective diameter.

A size of a sag value of the ninth surface S9 of the fifth lens 150 may change depending on the position of the ninth surface S9. In detail, the size of the sag value of the ninth surface S9 may change depending on a position within the effective region of the ninth surface S9. In more detail, the size of the sag value of the ninth surface S9 may change for each position of the ninth surface S9 while extending from the optical axis in the X-axis or Y-axis direction of the ninth surface S9 perpendicular to the optical axis.

In detail, the sag value of the ninth surface S9 may change in the first region 1A and the second region 2A. In detail, the sag value may increase, decrease, and then increase again in the first region 1A, and may increase, decrease, and then increase again in the second region 2A.

That is, as the ninth surface S9 extends from the optical axis toward the first end E1, an absolute value of the sag value may gradually increase, decrease, and then increase again, and as the ninth surface S9 extends from the optical axis toward the second end E2, the absolute value of the sag value may gradually increase, decrease, and then increase again.

In addition, the ninth surface S9 may include a region where a sign of a sag value is changed. In detail, in the first region and the second region of the ninth surface S9, a sign of a sag value in the first region and the second region from the optical axis up to more than 0.65 to 0.90 toward the first end E1 and the second end E2 may change.

In addition, a change amount of the sag value of the ninth surface S9 may gradually increase while extending from the optical axis toward the first end E1 and the second end E2.

In detail, in the first region of the ninth surface S9, a change amount of a sag value in the first region from the optical axis up to 0.5 toward the first end E1 may be smaller than a change amount of a sag value in the first region up to more than 0.5 to 1.

In addition, in the second region of the ninth surface S9, a change amount of a sag value in the second region from the optical axis up to 0.5 toward the second end E2 may be smaller than a change amount in a sag value in the second region up to more than 0.5 to 1.

That is, a change amount of a sag value of more than 50% to 100% of the effective radius of the ninth surface S9 on the optical axis may be greater than a change amount of a sag value of 50% or less.

In addition, a size of a sag value of the tenth surface S10 of the fifth lens 150 may change depending on the position of the tenth surface S10. In detail, the size of the sag value of the tenth surface S10 may change depending on a position within the effective region of the tenth surface S10. In more detail, the size of the sag value of the tenth surface S10 may change for each position of the tenth surface S10 while extending from the optical axis in the X-axis or Y-axis direction of the tenth surface S10 perpendicular to the optical axis.

In detail, the sag value of the tenth surface S10 may change in the third region 3A and the fourth region 4A. In detail, the sag value may increase in the third region 3A and the fourth region 4A. In more detail, the sag value may increase in the third region 3A and the fourth region 4A.

That is, as the tenth surface S10 extends from the optical axis toward the third end E3 and the fourth end E4, an absolute value of the sag value may gradually increase.

For example, in the third region and the fourth region of the tenth surface S10, a sag value in the third region and the fourth region from the optical axis toward the third end E3 and the fourth end E4 may gradually increase.

In addition, a change amount in the sag value of the eighth surface S8 may gradually increase while extending from the optical axis toward the third end E3 and the fourth end E4.

In detail, in the third region and the fourth region of the eighth surface S8, a change amount of a sag value in the third region and the fourth region from the optical axis up to 0.5 toward the third end E3 and the fourth end E4 may be smaller than a change amount of a sag value in the third region up to more than 0.5 to 1.

That is, a change amount of a sag value of more than 50% to 100% of the effective radius of the eighth surface S8 on the optical axis may be greater than a change amount of a sag value of 50% or less.

The optical system and the optical module according to the embodiment may satisfy at least one of equations described below. Accordingly, the optical system and the optical module according to the embodiment may have improved aberration characteristics, and thus it is possible to have improved optical characteristics.

The optical system and the optical module according to the embodiment may satisfy Equation 1 below.

$$60° \le FOV(\theta) \le 90° \quad \text{[Equation 1]}$$

(In Equation 1, FOV refers to an effective viewing angle of the optical system.)

The optical system and the optical module according to the embodiment may satisfy Equation 2 including any one of Equation 2-1, Equation 2-2, and Equation 2-3 below.

$$0.40 \le TTL/ImgH \le 4.0 \quad \text{[Equation 2-1]}$$

$$0.50 \le TTL/ImgH \le 1.0 \quad \text{[Equation 2-2]}$$

$$0.60 \le TTL/ImgH \le 0.75 \quad \text{[Equation 2-3]}$$

(In Equation 2, total track length (TTL) refers to a distance in an optical axis direction from a vertex of an object-side surface of the first lens to an upper surface of the image sensor unit, and ImgH refers to twice a distance in a diagonal direction from the upper surface of the image sensor unit overlapping the optical axis to a 1.0 field region of the image sensor unit.)

As the optical system and optical module according to the embodiment satisfy Equation 2 above, it is possible to have a small TTL. Accordingly, miniaturization of the optical system and the optical module according to the embodiment may be realized, and the optical system and the optical module according to the embodiment may be easily applied to the display device such as the smart phone.

The optical system and the optical module according to the embodiment may satisfy Equation 3 below.

$$CA\_O\_x < CA\_O\_6 \quad \text{[Equation 3]}$$

(In Equation 3, CA_O_x refers to a size of an effective diameter of an object-side of a lens closest to the aperture, and CA_O_6 refers to a size of an effective diameter of the object-side surface of the sixth lens.)

As the optical system and the optical module according to the embodiment satisfy Equation 3 above, it is possible to improve sensitivity reduction characteristics of the optical system and the optical module by disposing the sixth lens having a large effective diameter and sensitive optical characteristics far from the aperture.

The optical system and the optical module according to the embodiment may satisfy Equation 4 including any one of Equation 4-1, Equation 4-2, and Equation 4-3 below.

$$20° < |SA1\_O\_5| \le 60° \quad \text{[Equation 4-1]}$$

$$22° < |SA1\_O\_5| \le 53° \quad \text{[Equation 4-2]}$$

$$25° < |SA1\_O\_5| \le 50° \quad \text{[Equation 4-1]}$$

(In Equation 4, SA1_O_5 refers to a slope angle between a normal line and the optical axis of an object-side surface of the fifth lens at any one point of the object-side surface of the fifth lens in a distance range of 70% to 90% of a distance from the optical axis to the effective diameter of the fifth lens.)

As the optical system and the optical module according to the embodiment satisfy Equation 4 above, it is possible to increase a curvature of a lens surface toward a portion far from the optical axis of the fifth lens disposed close to the image sensor unit, that is, toward an end of an effective diameter of the fifth lens. Accordingly, it is possible to improve the aberration characteristics of the optical system and the optical module.

The optical system and the optical module according to the embodiment may satisfy Equation 5 including any one of Equation 5-1, Equation 5-2, and Equation 5-3 below.

$$10° \le |SA1\_O\_x\_6| \le 40°,\ 10° \le |SA1\_O\_y\_6| \le 40° \quad \text{[Equation 5-1]}$$

$$15° \le |SA1\_O\_x\_6| \le 35°,\ 15° \le |SA1\_O\_y\_6| \le 35° \quad \text{[Equation 5-2]}$$

$$18° \le |SA1\_O\_x\_6| \le 30°,\ 18° \le |SA1\_O\_y\_6| \le 30° \quad \text{[Equation 5-2]}$$

(In Equation 5, SA1_O_x_6 refers to a slope angle between the optical axis and a normal line at any one point of an object-side surface of the sixth lens at a distance range of 20% to 50% of a distance from the optical axis to the effective diameter in the X-axis direction from the optical axis of the sixth lens, and SA1_O_y_6 refers to an angle between the optical axis and a normal line at any one point of the object-side surface of the sixth lens at a distance range of 20% to 50% of a distance from the optical axis to the effective diameter in the Y-axis direction from the optical axis of the sixth lens.)

As the optical system and the optical module according to the embodiment satisfy Equation 5 above, it is possible to increase a curvature of a lens surface toward a portion far from the optical axis of the sixth lens closest to the image sensor unit, that is, toward an end of an effective diameter of the sixth lens. Accordingly, it is possible to improve the aberration characteristics of the optical system and the optical module, and to improve image quality of a peripheral region.

The optical system and the optical module according to the embodiment may satisfy Equation 6 including any one of Equation 6-1, Equation 6-2, and Equation 6-3 below.

$$0.3 \leq CT\_5/T\_O\_c\_5 \leq 1.7 \quad \text{[Equation 6-1]}$$

$$1.0 \leq CT\_5/T\_O\_c\_5 \leq 1.6 \quad \text{[Equation 6-2]}$$

$$0.4 \leq CT\_5/T\_O\_c\_5 \leq 1.5 \quad \text{[Equation 6-3]}$$

(In Equation 6, CT_5 refers to a thickness on the optical axis of the fifth lens, T_O_c_n−1 refers to a thickness in the direction parallel to the optical axis direction in a critical point region of the object-side surface of the fifth lens, and the critical point region is defined as 0.1 mm range based on the critical point.)

As the optical system and the optical module according to the embodiment satisfy Equation 6 above, a thickness on the optical axis of the fifth lens may be formed greater than a thickness in the optical axis direction passing through a critical point of the fifth lens. Therefore, it is possible to reduce distortion and aberration of the optical system and the optical module.

The optical system and the optical module according to the embodiment may satisfy Equation 7 including any one of Equation 7-1, Equation 7-2, and Equation 7-3 below.

$$0.1 \leq CT\_6/maxT\_6 \leq 1.0 \quad \text{[Equation 7-1]}$$

$$0.2 \leq CT\_6/maxT\_6 \leq 0.75 \quad \text{[Equation 7-2]}$$

$$0.1 \leq CT\_6/maxT\_6 \leq 0.5 \quad \text{[Equation 7-3]}$$

(In Equation 7, CT_6 refers to a thickness on the optical axis of the sixth lens, and max T_6 refers to a maximum thickness of the sixth lens.)

As the optical system and the optical module according to the embodiment satisfy Equation 7 above, a thickness on the optical axis of the sixth lens may be formed smaller than a maximum thickness. Therefore, the sixth lens may include a region where the thickness is gradually increased from the optical axis toward the end of the effective diameter. Accordingly, it is possible to reduce the aberration of the optical system and the optical module, and to improve the image quality of the peripheral region.

The optical system and the optical module according to the embodiment may satisfy Equation 8 including any one of Equation 8-1, Equation 8-2, and Equation 8-3 below.

$$2 \leq CD\_(5/6)/minD\_(5/6) \leq 50 \quad \text{[Equation 8-1]}$$

$$2 \leq CD\_(5/6)/minD\_(5/6) \leq 30 \quad \text{[Equation 8-2]}$$

$$2 \leq CD\_(5/6)/minD\_(5/6) \leq 10 \quad \text{[Equation 8-3]}$$

(In Equation 8, CD_(5/6) refers to a distance on the optical axis of the fifth lens and the sixth lens, and min D_(5/6) refers to a minimum distance on the optical axis of the fifth lens and the sixth lens.)

As the optical system and the optical module according to the embodiment satisfy Equation 8 above, a distance on the optical axis between the fifth lens and the sixth lens may be greater than the minimum distance. Therefore, the fifth lens and the sixth lens may be formed in a shape that is increased as the distance between the fifth lens and the sixth lens approaches the optical axis. Accordingly, it is possible to reduce distortion and aberration of the optical system and the optical module, and to improve the image quality of the peripheral region.

The optical system and the optical module according to the embodiment may satisfy Equation 9 below.

$$CA\_O\_x < CA\_O\_x+1 < CA\_O\_x+2 \ldots < CA\_O\_6 \quad \text{[Equation 9]}$$

(In Equation 9, CA_O_x refers to the size of the effective diameter of the object-side surface of the lens closest to the aperture, and CA_O_6 refers to the size of the effective diameter of the object-side surface of the sixth lens.)

As the optical system and the optical module according to the embodiment satisfy Equation 9 above, it is possible to improve sensitivity reduction characteristics of the optical system and the optical module by disposing lenses having a large effective diameter and sensitive optical characteristics far from the aperture, and it is possible to realize miniaturization of the optical module by reducing TTL.

The optical system and the optical module according to the embodiment may satisfy Equation 10 below.

$$\min|Sag\_O\_x\_6| = \min|Sag\_O\_y\_6| \quad \text{[Equation 10]}$$

As the optical system and the optical module according to the embodiment satisfy Equation 10 above, it is possible to make a minimum value of an absolute value of a sag value in the X-axis direction equal to a minimum value of an absolute value of a sag value in the Y-axis direction of the sixth lens disposed closest to the image sensor unit. Accordingly, a difference in sag values in the X-axis direction and the Y-axis direction of the sixth lens may be easily adjusted by easily setting reference sag values in the X-axis direction and the Y-axis direction of the sixth lens, and accordingly, it is possible to improve the relative illumination of the optical system and the optical module, thereby improving the image quality of the peripheral region.

The optical system and the optical module according to the embodiment may satisfy Equation 11 below.

$$\max|Sag\_O\_x\_6| - \min|Sag\_O\_x\_6| \neq \max|Sag\_O\_y\_6| - \min|Sag\_O\_y\_6| \quad \text{[Equation 11]}$$

(In Equation 11, max |Sag_O_x_6| refers to an absolute value of a maximum sag value in the X-axis direction on the object-side surface of the sixth lens, min |Sag_O_x_6| refers to an absolute value of a minimum sag value that is not 0 in the X-axis direction on the object-side surface of the sixth lens, max |Sag_O_y_6| refers to an absolute value of a maximum sag value in the Y-axis direction on the object-side surface of the sixth lens, and min |Sag_O_y_6| refers to an absolute value of a minimum sag value that is not 0 in the Y-axis direction on the object-side surface of the sixth lens.)

As the optical system and the optical module according to the embodiment satisfy Equation 11 above, it is possible to make a difference between the sag values in the x-axis direction and a difference between the sag values in the y-axis direction of the sixth lens disposed closest to the image sensor unit different. Accordingly, by making optical characteristics of light passing through the x-axis direction and light passing through the y-axis direction of the sixth lens different, it is possible to improve the relative illumination of the optical system and the optical module, and to improve the image quality of the peripheral region.

The optical system and the optical module according to the embodiment may satisfy Equation 12 including any one of Equation 12-1, Equation 12-2, and Equation 12-3 below.

$$0.54 \le \max|Sag\_O\_x\_6| - \min|Sag\_O\_x\_6| \le 0.95$$ [Equation 12-1]

$$0.52 \le \max|Sag\_O\_y\_6| - \min|Sag\_O\_y\_6| \le 0.89$$

$$0.01 \le \max|\Delta Sag\_O\_xy\_6| \le 0.5$$

$$0.59 \le \max|Sag\_O\_x\_6| - \min|Sag\_O\_x\_6| \le 0.90$$ [Equation 12-2]

$$0.57 \le \max|Sag\_O\_y\_6| - \min|Sag\_O\_y\_6| \le 0.84$$

$$0.03 \le \max|\Delta Sag\_O\_x\_y\_6| \le 0.3$$

$$0.64 \le \max|Sag\_O\_x\_6| - \min|Sag\_O\_x\_6| \le 0.85$$ [Equation 12-3]

$$0.562 \le \max|Sag\_O\_y\_6| - \min|Sag\_O\_y\_6| \le 0.79$$

$$0.05 \le \max|\Delta Sag\_O\_xy\_6| \le 0.1$$

(In Equation 12, max $|\Delta Sag\_O\_xy\_6|$ refers to the largest value among the difference between the sag values of the X-axis and the difference between the sag values of the y-axis on the object-side surface of the sixth lens.)

As the optical system and the optical module according to the embodiment satisfy Equation 12 above, a size of the difference between the sag values in the x-axis direction and the difference between the sag values in the y-axis direction of the sixth lens disposed closest to the image sensor unit may be set to a set range. Accordingly, by making the optical characteristics of the light passing through the x-axis direction and the light passing through the y-axis direction of the sixth lens different, it is possible to improve the relative illumination of the optical system and the optical module, and to improve the image quality of the peripheral region.

The optical system and the optical module according to the embodiment may satisfy Equation 13 below.

$$|\max T\_5 - \min T\_5| < |\max T\_6 - \min T\_6|$$ [Equation 13]

(In Equation 13, max T_5 refers to a maximum thickness of the fifth lens, min T_5 refers to a minimum thickness of the fifth lens, max T_6 refers to a maximum thickness of the sixth lens, and min T_6 refers to a minimum thickness of the sixth lens.

As the optical system and the optical module according to the embodiment satisfy Equation 13 above, a thickness difference between the fifth lens and the sixth lens disposed close to the image sensor unit may be controlled. In detail, a difference between the maximum thickness and the minimum thickness of the sixth lens disposed close to the image sensor unit may be greater than a difference between the maximum thickness and the minimum thickness of the fifth lens disposed relatively farther from the image sensor unit than the sixth lens. Accordingly, it is possible to reduce the aberration of the optical system and the optical module, and to improve the image quality in the periphery.

The optical system and the optical module according to the embodiment may satisfy Equation 14 below.

$$\max T\_5 < \max T\_6$$ [Equation 14]

As the optical system and the optical module according to the embodiment satisfy Equation 14 above, a thickness difference between the fifth lens and the sixth lens disposed close to the image sensor unit may be controlled. In detail, the maximum thickness of the sixth lens disposed close to the image sensor unit may be greater than the maximum thickness of the fifth lens disposed relatively farther from the image sensor unit than the sixth lens. Accordingly, it is possible to reduce distortion and aberration of the optical system and the optical module, and to improve the relative illumination.

The optical system and the optical module according to the embodiment may satisfy Equation 15 below.

$$CT\_5 \ne \min T\_5,$$ [Equation 15]

$$CT\_5 \ne \max T\_5,$$

$$CT\_6 = \min T\_6$$

(In Equation 15, CT_5 refers to the thickness on the optical axis of the fifth lens, and CT_6 refers to the thickness on the optical axis of the sixth lens.)

As the optical system and the optical module according to the embodiment satisfy Equation 15 above, the thickness of the fifth lens and the sixth lens disposed close to the image sensor unit may be controlled. In detail, sizes of the maximum thickness and the minimum thickness of the fifth lens disposed close to the image sensor unit may be different from the thickness on the optical axis of the fifth lens. In addition, the minimum thickness of the sixth lens disposed closer to the image sensor unit than the fifth lens may be the thickness on the optical axis of the sixth lens. Accordingly, by making the thickness of the sixth lens smallest on the optical axis and forming the minimum and maximum thickness of the fifth lens in a region other than the optical axis, it is possible to reduce the distortion and aberration of the optical system and optical module and to improve the image quality of the peripheral region.

The optical system and the optical module according to the embodiment may satisfy Equation 16 including any one of Equation 16-1, Equation 16-2, and Equation 16-3 below.

$$1 \le \max D\_5/6 / \min D\_5/6 \le 30$$ [Equation 16-1]

$$2 \le \max D\_5/6 / \min D\_5/6 \le 15$$ [Equation 16-2]

$$2.5 \le \max D\_5/6 / \min D\_5/6 \le 4.5$$ [Equation 16-3]

(In Equation 16, max D_5/6 refers to a maximum distance between the fifth lens and the sixth lens, and min D_5/6 refers to a minimum distance between the fifth lens and the sixth lens.)

As the optical system and the optical module according to the embodiment satisfy Equation 16 above, a distance between the fifth lens and the sixth lens disposed close to the image sensor unit may be controlled. In detail, a ratio of the maximum distance to the minimum distance between the fifth lens and the sixth lens may be set within a set range. Accordingly, it is possible to reduce distortion and aberration of the optical system and the optical module, to increase the relative illumination, and to improve the image quality of the peripheral region.

The optical system and the optical module according to the embodiment may satisfy Equation 17 below.

$$minD\_5/6 < minT\_5,$$ [Equation 17]

$$minT\_5 < maxD\_5/6$$

As the optical system and the optical module according to the embodiment satisfy Equation 17 above, the thickness of each of the fifth and sixth lenses disposed close to the image sensor unit and the distance between the lenses may be controlled. In detail, the minimum distance between the fifth lens and the sixth lens may be smaller than the minimum thickness of the fifth lens, and the maximum distance between the fifth lens and the sixth lens may be greater than the minimum thickness of the fifth lens. Accordingly, by adjusting thicknesses and distances of the lenses close to the image sensor unit, it is possible to reduce the aberration of the optical system and the optical module, to increase the relative illumination, and to improve the image quality of the peripheral region.

The optical system and the optical module according to the embodiment may satisfy Equation 18 below.

$$minT\_5 < T\_O\_5 \leq maxT\_5$$ [Equation 18]

(In Equation 18, min T_5 refers to the minimum thickness of the fifth lens, max T_5 refers to the maximum thickness of the fifth lens, and T_c_5 refers to a thickness in a direction parallel to the optical axis direction in the critical point region of the object-side surface of the fifth lens, and the critical point region is defined as 0.1 mm range based on the critical point.)

As the optical system and the optical module according to the embodiment satisfy Equation 18 above, a size of the thickness of the fifth lens disposed close to the image sensor unit may be controlled at various positions. In detail, it is possible to make a lens thickness passing through the critical point region of the fifth lens greater than the minimum thickness of the fifth lens and smaller than the maximum thickness of the fifth lens. Accordingly, it is possible to reduce the aberration of the optical system and the optical module by adjusting a thickness for each region of the n−1th lens disposed close to the image sensor unit.

The optical system and the optical module according to the embodiment may satisfy Equation 19 including any one of Equation 19-1, Equation 19-2, and Equation 19-3 below.

$$50° < max|SA\_O\_5| < 80°$$ [Equation 19-1]

$$40° < max|SA\_S\_5| < 70°$$

-continued $$0 < max|SA\_O\_5| - max|SA\_S\_5| < 40°$$

$$50° < max|SA\_O\_5| < 75°$$ [Equation 19-2]

$$40° < max|SA\_S\_5| < 65°$$

$$0 < max|SA\_O\_5| - max|SA\_S\_5| < 35°$$

$$50° < max|SA\_O\_5| < 70°$$ [Equation 19-3]

$$40° < max|SA\_S\_5| < 60°$$

$$0 < max|SA\_O\_5| - max|SA\_S\_5| < 35°$$

(In Equation 19, max |SA_O_5| refers to a maximum angle among slope angles between the normal line and the optical axis at any one point of the object-side surface in a distance range from the optical axis to the effective diameter of the fifth lens, and max |SA_S_5| refers to a maximum angle among slope angles between the normal line and the optical axis at any one point of the sensor-side surface in the distance range from the optical axis to the effective diameter of the fifth lens.)

As the optical system and the optical module according to the embodiment satisfy Equation 19 above, a shape of the fifth lens disposed close to the image sensor unit may be controlled. In detail, a distance between the fourth lens and the sixth lens adjacent to the fifth lens may be adjusted by setting a difference between a maximum slope angle and a minimum slope angle of the fifth lens to a set range. Accordingly, it is possible to reduce the aberration of the optical system and the optical module by adjusting the slope angle of the fifth lens which is a lens close to the image sensor unit.

The optical system and the optical module according to the embodiment may satisfy Equation 20 below.

$$max|SA\_O\_1| < max|SA\_O\_5|,$$ [Equation 20]

$$max|SA\_O\_5| - max|SA\_S\_5| < max|SA\_O\_1| - max|SA\_S\_1|$$

(In Equation 20, max |SA_O_5| refers to the maximum angle among the slope angles between the normal line and the optical axis at any one point of the object-side surface in the distance range from the optical axis to the effective diameter of the fifth lens, max |SA_S_5| refers to the maximum angle among the slope angles between the normal line and the optical axis at any one point of the sensor-side surface in the distance range from the optical axis to the effective diameter of the fifth lens, max |SA_O_1| refers to a maximum angle among slope angles between the normal line and the optical axis at any point of the object-side surface in a distance range from the optical axis to the effective diameter of the first lens, and max |SA_S_1| refers to a maximum angle among slope angles between the normal line and the optical axis at any one point of the sensor-side surface in the distance range from the optical axis to the effective diameter of the first lens.)

As the optical system and the optical module according to the embodiment satisfy Equation 20 above, a shape of the first lens disposed furthest from the fifth lens disposed close to the image sensor unit may be controlled. In detail, a maximum slope angle of the object-side surface of the fifth lens may be greater than a maximum slope angle of the object-side surface of the first lens, and a difference between the maximum slope angle of the object-side surface of the fifth lens and the maximum slope angle of the sensor-side surface may be greater than a difference between the maximum slope angle of the object-side surface of the lens and the maximum slope angle of the sensor-side surface.

Accordingly, a distance between the first lens and an adjacent lens may be adjusted, and the distance between the fourth lens and the sixth lens adjacent to the fifth lens may be adjusted. Accordingly, it is possible to reduce the aberration of the optical system and the optical module, to improve the resolution, and to improve the image quality of the peripheral region by adjusting a slope angle of the first lens which is a lens far from the fifth lens close to the image sensor unit.

The optical system and the optical module according to the embodiment may satisfy Equation 21 including any one of Equations 21-1, 21-2, and 21-3 below.

$$\max|SA\_O\_2| < \max|SA\_O\_5|, \quad \text{[Equation 21-1]}$$
$$\max|SA\_S\_2| < \max|SA\_S\_5|,$$
$$\max|SA\_O\_2| < 15°$$
$$\max|SA\_S\_2| < 20°$$

$$\max|SA\_O\_2| < \max|SA\_O\_5|, \quad \text{[Equation 21-2]}$$
$$\max|SA\_S\_2| < \max|SA\_S\_5|,$$
$$\max|SA\_O\_2| < 10°$$
$$\max|SA\_S\_2| < 18°$$

$$\max|SA\_O\_2| < \max|SA\_O\_5|, \quad \text{[Equation 21-3]}$$
$$\max|SA\_S\_2| < \max|SA\_S\_5|,$$
$$\max|SA\_O\_2| < 8°$$
$$\max|SA\_S\_2| < 15°$$

(In Equation 21, max |SA_O_5| refers to the maximum angle among the slope angles between the normal line and the optical axis at any one point of the object-side surface in the distance range from the optical axis to the effective diameter of the fifth lens, max |SA_S_5| refers to the maximum angle among the slope angles between the normal line and the optical axis at any one point of the sensor-side surface in the distance range from the optical axis to the effective diameter of the fifth lens, max |SA_O_2| refers to a maximum angle among slope angles between the normal line and the optical axis at any point of the object-side surface in a distance range from the optical axis to the effective diameter of the second lens, and max |SA_S_2| refers to a maximum angle among slope angles between the normal line and the optical axis at any one point of the sensor-side surface in the distance range from the optical axis to the effective diameter of the second lens.)

As the optical system and the optical module according to the embodiment satisfy Equation 21 above, a shape of the second lens disposed relatively far from the fifth lens disposed close to the image sensor unit may be controlled. In detail, the maximum slope angle of the object-side surface of the fifth lens may be greater than a maximum slope angle of the object-side surface of the second lens, the maximum slope angle of the sensor-side surface of the fifth lens may be greater than a maximum slope angle of the sensor-side surface of the second lens, and sizes of the maximum slope angle of the object-side surface of the second lens and the maximum slope angle of the sensor-side surface of the second lens may be adjusted within a set range.

Accordingly, a distance between the second lens and an adjacent lens may be adjusted, and the distance between the fourth lens and the sixth lens adjacent to the fifth lens may be adjusted. Accordingly, it is possible to reduce the aberration of the optical system and the optical module by adjusting a slope angle of the second lens which is a lens far from the fifth lens close to the image sensor unit.

The optical system and the optical module according to the embodiment may satisfy Equation 22 including any one of Equation 22-1, Equation 22-2, and Equation 22-3 below.

$$\max|SA\_O\_3| < \max|SA\_O\_5|, \quad \text{[Equation 22-1]}$$
$$\max|SA\_S\_3| < \max|SA\_S\_5|,$$
$$\max|SA\_O\_3| < 18°$$
$$\max|SA\_S\_3| < 20°$$

$$\max|SA\_O\_3| < \max|SA\_O\_5|, \quad \text{[Equation 22-2]}$$
$$\max|SA\_S\_3| < \max|SA\_S\_5|,$$
$$\max|SA\_O\_3| < 16°$$
$$\max|SA\_S\_3| < 18°$$

$$\max|SA\_O\_3| < \max|SA\_O\_5|, \quad \text{[Equation 22-3]}$$
$$\max|SA\_S\_3| < \max|SA\_S\_5|,$$
$$\max|SA\_O\_3| < 14°$$
$$\max|SA\_S\_3| < 16°$$

(In Equation 22, max |SA_O_5| refers to the maximum angle among the slope angles between the normal line and the optical axis at any one point of the object-side surface in the distance range from the optical axis to the effective diameter of the fifth lens, max |SA_S_5| refers to the maximum angle among the slope angles between the normal line and the optical axis at any one point of the sensor-side surface in the distance range from the optical axis to the effective diameter of the fifth lens, max SA_O_3 refers to a maximum angle among slope angles between the normal line and the optical axis at any point in a range from the optical axis to the effective diameter of the object-side surface of the third lens, and max |SA_S_3| refers to a maximum angle among slope angles between the normal line and the optical axis at any point of the sensor-side surface of in a distance range from the optical axis to the effective diameter of the third lens.)

As the optical system and the optical module according to the embodiment satisfy Equation 22 above, a shape of the third lens disposed relatively far from the fifth lens disposed close to the image sensor unit may be controlled. In detail, the maximum slope angle of the object-side surface of the fifth lens may be greater than a maximum slope angle of the object-side surface of the third lens, the maximum slope angle of the sensor-side surface of the fifth lens may be greater than a maximum slope angle of the sensor-side surface of the third lens, and sizes of the maximum slope angle of the object-side surface of the third lens and the maximum slope angle of the sensor-side surface of the third lens may be adjusted within a set range.

Accordingly, a distance between the third lens and an adjacent lens may be adjusted, and the distance between the fourth and sixth lenses adjacent to the fifth lens may be adjusted. Accordingly, it is possible to reduce distortion and aberration of the optical system and the optical module by adjusting a slope angle of the third lens which is a lens far from the fifth lens close to the image sensor unit.

The optical system and the optical module according to the embodiment may satisfy Equation 23 including any one of Equation 23-1, Equation 23-2, and Equation 23-3 below.

$$\max|SA\_O\_4| < \max|SA\_O\_5|,\quad \max|SA\_S\_4| < \max|SA\_S\_5|,\quad \max|SA\_O\_4| < 55°\quad \max|SA\_S\_4| < 55° \qquad \text{[Equation 23-1]}$$

$$\max|SA\_O\_4| < \max|SA\_O\_5|,\quad \max|SA\_S\_4| < \max|SA\_S\_5|,\quad \max|SA\_O\_4| < 52.5°\quad \max|SA\_S\_4| < 52.5° \qquad \text{[Equation 23-2]}$$

$$\max|SA\_O\_4| < \max|SA\_O\_5|,\quad \max|SA\_S\_4| < \max|SA\_S\_5|,\quad \max|SA\_O\_4| < 50°\quad \max|SA\_S\_4| < 50° \qquad \text{[Equation 23-3]}$$

(In Equation 23, max |SA_O_5| refers to the maximum angle among the slope angles between the normal line and the optical axis at any one point of the object-side surface in the distance range from the optical axis to the effective diameter of the fifth lens, max |SA_S_5| refers to the maximum angle among the slope angles between the normal line and the optical axis at any one point of the sensor-side surface in the distance range from the optical axis to the effective diameter of the fifth lens, max |SA_O_4| refers to a maximum angle among slope angles between the normal line and the optical axis at any point of the object-side surface in a distance range from the optical axis to the effective diameter of the fourth lens, and max |SA_S_4| refers to a maximum angle among slope angles between the normal line and the optical axis at any point of the sensor-side surface of in a distance range from the optical axis to the effective diameter of the fourth lens.)

As the optical system and the optical module according to the embodiment satisfy Equation 23 above, a shape of the fourth lens disposed relatively far from the fifth lens disposed close to the image sensor unit may be controlled. In detail, the maximum slope angle of the object-side surface of the fifth lens may be greater than a maximum slope angle of the object-side surface of the fourth lens, the maximum slope angle of the sensor-side surface of the fifth lens may be greater than a maximum slope angle of the sensor-side surface of the fourth lens, and sizes of the maximum slope angle of the object-side surface of the fourth lens and the maximum slope angle of the sensor-side surface of the fourth lens may be adjusted within a set range.

Accordingly, the distance between the fourth lens and the sixth lens adjacent to the fifth lens may be adjusted. Accordingly, it is possible to reduce the aberration of the optical system and the optical module by adjusting a slope angle of the fourth lens which is a lens far from the fifth lens close to the image sensor unit.

The optical system and the optical module according to the embodiment may satisfy Equation 24 below.

$$P\_1 \text{ is positive}(+),\quad P\_2 \text{ is negative}(-),\quad P\_6 \text{ is positive}(-) \qquad \text{[Equation 24]}$$

(In Equation 24, P_6 refers to a refractive power sign of the sixth lens, P_2 refers to a refractive power sign of the second lens, and P_1 refers to a refractive power sign of the first lens.)

As the optical system and the optical module according to the embodiment satisfy Equation 24 above, a TTL size of the optical system module may be reduced, and the size of the effective diameter of the object-side surface of the lenses may be reduced. Accordingly, it is possible to easily apply the optical system and the optical module to the display device such as the smart phone, to improve the resolution, and to improve the image quality of the peripheral region.

The optical system and the optical module according to the embodiment may satisfy Equation 25 including any one of Equation 25-1, Equation 25-2, and Equation 25-3 below.

$$0° \le |SA\_O\_5| \le 70° \qquad \text{[Equation 25-1]}$$

$$0° \le |SA\_O\_5| \le 65° \qquad \text{[Equation 25-2]}$$

$$0° \le |SA\_O\_5| \le 60° \qquad \text{[Equation 25-3]}$$

(In Equation 25, SA_O_5 refers to the slope angle between the normal line and the optical axis at any one point of the object-side surface in the distance range from the optical axis to the effective diameter of the fifth lens.)

As the optical system and the optical module according to the embodiment satisfy Equation 25 above, it is possible to control the overall shape of the object-side surface of the fifth lens close to the image sensor unit. In detail, as the object-side surface of the fifth lens has a slope angle within a set range, it is possible to improve the aberration characteristics of the optical system and the optical module.

The optical system and the optical module according to the embodiment may satisfy Equation 26 including any one of Equation 26-1, Equation 26-2, and Equation 26-3 below.

$$0° \le |SA\_S\_5| \le 70° \qquad \text{[Equation 26-1]}$$

$$0° \le |SA\_S\_5| \le 65° \qquad \text{[Equation 26-2]}$$

$$0° \le |SA\_S\_5| \le 60° \qquad \text{[Equation 26-3]}$$

(In Equation 26, SA_S_5 refers to the slope angle between the normal line and the optical axis at any point of the sensor-side surface in the distance range from the optical axis to the effective diameter of the fifth lens.)

As the optical system and the optical module according to the embodiment satisfy Equation 26 above, it is possible to control the overall shape of the sensor-side surface of the fifth lens close to the image sensor unit. In detail, as the sensor-side surface of the fifth lens has the slope angle within the set range, it is possible to improve the aberration characteristics of the optical system and the optical module.

The optical system and the optical module according to the embodiment may satisfy Equation 27 including any one of Equation 27-1, Equation 27-2, and Equation 27-3 below.

$$10 \le |SA1\_S\_x\_6| \le 75; \quad 12 \le |SA1\_S\_y\_6| \le 80 \qquad \text{[Equation 27-1]}$$

$$12 \le |SA1\_S\_x\_6| \le 73; \quad 14 \le |SA1\_S\_y\_6| \le 75 \qquad \text{[Equation 27-2]}$$

$$16 \le |SA1\_S\_x\_6| \le 70, \quad 18 \le |SA1\_S\_y\_6| \le 72 \qquad \text{[Equation 27-3]}$$

(In Equation 27, SA1_S_x_6 refers to a slope angle between the normal line and the optical axis at any one point of the sensor-side in a distance range of 60% to 100% between the optical axis and the effective diameter in the X-axis direction of the sixth lens, and SA1_S_y_6 refers to a slope angle between the normal line and the optical axis at any one point of the sensor-side surface in the distance range of 60% to 100% between the optical axis and the effective diameter in the y-axis direction of the sixth lens.)

As the optical system and the optical module according to the embodiment satisfy Equation 27 above, it is possible to increase a curvature of a lens surface toward a portion far from the optical axis of the sixth lens closest to the image sensor unit, that is, toward an end of an effective diameter of the sixth lens. Accordingly, it is possible to improve the aberration characteristics of the optical system and the optical module.

The optical system and the optical module according to the embodiment may satisfy Equation 28 including any one of Equation 28-1, Equation 28-2, and Equation 28-3 below.

$$10 \le |SA2\_O\_x\_6| \le 20, \quad 5 \le |SA2\_O\_y\_6| \le 15 \qquad \text{[Equation 28-1]}$$

$$12 \le |SA2\_O\_x\_6| \le 18, \quad 7 \le |SA2\_O\_y\_6| \le 13 \qquad \text{[Equation 28-2]}$$

$$14 \le |SA2\_O\_x\_6| \le 16, \quad 9 \le |SA2\_O\_y\_6| \le 11 \qquad \text{[Equation 28-3]}$$

(In Equation 28, SA2_O_x_6 refers to the slope angle between the normal line and the optical axis at any point of the object-side surface in a distance range of 70% to 90% between the optical axis and the effective diameter in the x-axis direction of the sixth lens, and SA2_O_y_6 refers to a slope angle between the normal line and the optical axis at any one point of the sensor-side surface in the distance range of 70% to 90% between the optical axis and the effective diameter in the y-axis direction of the sixth lens.)

As the optical system and the optical module according to the embodiment satisfy Equation 28 above, it is possible to increase a curvature of a lens surface toward a portion far from the optical axis of the sixth lens closest to the image sensor unit, that is, toward an end of an effective diameter of the sixth lens. Accordingly, it is possible to improve the aberration characteristics of the optical system and the optical module, and to improve the image quality of the peripheral region.

The optical system and the optical module according to the embodiment may satisfy Equation 29 including any one of Equation 29-1, Equation 3290-2, and Equation 29-3 below.

$$10 \le |SA2\_S\_x\_6| \le 60, \quad 10 \le |SA2\_S\_y\_6| \le 60 \qquad \text{[Equation 29-1]}$$

$$20 \le |SA2\_S\_x\_6| \le 55; \quad 20 \le |SA2\_S\_y\_6| \le 55 \qquad \text{[Equation 29-2]}$$

$$35 \le |SA2\_S\_x\_6| \le 50, \quad 35 \le |SA2\_S\_y\_6| \le 50 \qquad \text{[Equation 29-3]}$$

(In Equation 29, SA2_S_x_6 refers to the slope angle between the normal line and the optical axis at any one point of the object-side surface in the distance range of 70% to 90% between the optical axis and the effective diameter in the x-axis direction of the sixth lens, and SA2_S_y_6 is refers to the angle between the normal line and the optical axis at any point of the object-side surface in the distance range of 70% to 90% between the optical axis and the effective diameter in the y-axis direction of the sixth lens.)

As the optical system and the optical module according to the embodiment satisfy Equation 29 above, it is possible to increase a curvature of a lens surface toward a portion far from the optical axis of the sixth lens closest to the image sensor unit, that is, toward an end of an effective diameter of the sixth lens. Accordingly, it is possible to improve the aberration characteristics of the optical system and the optical module, and to improve the image quality of the peripheral region.

The optical system and the optical module according to the embodiment may satisfy Equation 30 including any one of Equation 30-1, Equation 30-2, and Equation 30-3 below.

$$1 \le |SA2\_O\_4| \le 55; \quad 3 \le |SA2\_S\_4| \le 55 \qquad \text{[Equation 30-1]}$$

$$2 \le |SA2\_O\_4| \le 53; \quad 5 \le |SA2\_S\_4| \le 53 \qquad \text{[Equation 30-2]}$$

$$4 \le |SA2\_O\_4| \le 50, \quad 10 \le |SA2\_S\_4| \le 50 \qquad \text{[Equation 30-3]}$$

(In Equation 30, SA2_O_4 refers to a slope angle between the normal line and the optical axis at any one point of the object-side surface in a distance range of 60% to 100% between the optical axis and the effective diameter of the fourth lens, and SA2_S_4 refers to an angle between the normal line and the optical axis at any point of the sensor-side surface in the distance range of 60% to 100% between the optical axis and the effective diameter of the fourth lens.)

As the optical system and the optical module according to the embodiment satisfy Equation 30 above, it is possible to increase a curvature of a lens surface toward a portion far from the optical axis of the fourth lens close to the image sensor unit, that is, toward an end of an effective diameter of the fourth lens. Accordingly, it is possible to improve the aberration characteristics of the optical system and the optical module.

The optical system and the optical module according to the embodiment may satisfy Equation 31 including any one of Equations 31-1, 31-2, and 31-3 below.

$$10 \le |SA2\_O\_4| \le 45, \quad 20 \le |SA2\_S\_4| \le 35 \quad \text{[Equation 31-1]}$$

$$12 \le |SA2\_O\_4| \le 40, \quad 22 \le |SA2\_S\_4| \le 33 \quad \text{[Equation 31-2]}$$

$$14 \le |SA2\_O\_4| \le 38, \quad 24 \le |SA2\_S\_4| \le 31 \quad \text{[Equation 31-3]}$$

(In Equation 31, SA2_O_4 refers to a slope angle between the normal line and the optical axis at any one point of the object-side surface in a distance range of 75% to 85% between the optical axis and the effective diameter of the fourth lens, and SA2_S_4 refers to an angle between the normal line and the optical axis at any point of the sensor-side surface in the distance range of 75% to 85% between the optical axis and the effective diameter of the fourth lens.)

As the optical system and the optical module according to the embodiment satisfy Equation 31 above, it is possible to increase a curvature of a lens surface toward a portion far from the optical axis of the fourth lens closest to the image sensor unit, that is, toward an end of an effective diameter of the fourth lens. Accordingly, it is possible to improve the aberration characteristics of the optical system and the optical module.

The optical system and the optical module according to the embodiment may satisfy Equation 32 including any one of Equation 32-1, Equation 32-2, and Equation 32-3 below.

$$0 \le \max|Sag\_O\_5| - \min|Sag\_O\_5| \le 0.50, \quad 0 \le \max|Sag\_S\_5| - \min Sag\_S\_5| \le 0.75 \quad \text{[Equation 32-1]}$$

$$0 \le \max|Sag\_O\_5| - \min|Sag\_O\_5| \le 0.45, \quad 0 \le \max|Sag\_S\_5| - \min|Sag\_S\_5| \le 0.70 \quad \text{[Equation 32-2]}$$

$$0 \le \max|Sag\_O\_5| - \min|Sag\_O\_5| \le 0.40, \quad 0 \le \max|Sag\_S\_5| - \min|Sag\_S\_5| \le 0.65 \quad \text{[Equation 32-3]}$$

(In Equation 32, max |Sag_O_5| refers to an absolute value of a maximum sag value of the object-side surface of the fifth lens, and min Sag_S_5 refers to an absolute value of a minimum sag value that is not 0 of the sensor-side surface of the fifth lens.)

As the optical system and the optical module according to the embodiment satisfy Equation 32 above, the sag values of the object-side surface and the sensor-side surface of the fifth lens close to the image sensor unit may be different and may have a sag value within a set range. Accordingly, it is possible to improve the aberration characteristics of the optical system and the optical module.

The optical system and the optical module according to the embodiment may satisfy Equation 33 including any one of Equation 33-1, Equation 33-2, and Equation 33-3 below.

$$FOV(\theta) \le 90°, \quad 1 \le CA\_O\_6/CA\_O\_x \le 3 \quad \text{[Equation 33-1]}$$

-continued $$FOV(\theta) \le 90°, \quad 1.5 \le CA\_O\_6/CA\_O\_x \le 2.7 \quad \text{[Equation 33-2]}$$

$$FOV(\theta) \le 90°, \quad 2.0 \le CA\_O\_6/CA\_O\_x \le 2.5 \quad \text{[Equation 33-3]}$$

(In Equation 33, FOV refers to an effective field angle of the optical system, CA_O_x refers to the size of the effective diameter of the object-side surface of the lens closest to the aperture, and CA_O_6 refers to the size of the effective diameter of the object-side surface of the sixth lens.)

As the optical system and the optical module according to the embodiment satisfy Equation 33 above, it is possible to improve the aberration characteristics and the resolution of the optical system and the optical module by adjusting a ratio of the effective diameters of lenses having a large effective diameter and sensitive optical characteristics and lenses having a small effective diameter and relatively none-sensitive optical characteristics within a set effective field angle range.

The optical system and the optical module according to the embodiment may satisfy Equation 34 including any one of Equation 34-1, Equation 34-2, and Equation 34-3 below.

$$3 \le |R\_S\_3/R\_O\_2| \le 20 \quad \text{[Equation 34-1]}$$

$$5 \le |R\_S\_3/R\_O\_2| \le 17 \quad \text{[Equation 34-2]}$$

$$7 \le |R\_S\_3/R\_O\_2| \le 14 \quad \text{[Equation 34-3]}$$

(In Equation 34, R_S_3 refers to a radius of curvature on the optical axis of the sensor-side surface of the third lens, and R_O_2 refers to a radius of curvature on the optical axis of the object-side surface of the second lens.)

As the optical system and the optical module according to the embodiment satisfy Equation 34 above, it is possible to improve the aberration characteristics and chromatic aberration characteristics of the optical system and the optical module by setting a ratio of the radius of curvature of the sensor-side surface or the object-side surface of the adjacent third lens and the second lens within a set range.

The optical system and the optical module according to the embodiment may satisfy Equation 35 including any one of Equation 35-1, Equation 35-2, and Equation 35-3 below.

$$0.2 \le |R\_S\_5/R\_O\_6| \le 2.5 \quad \text{[Equation 35-1]}$$

$$0.4 \le |R\_S\_5/R\_O\_6| \le 2.2 \quad \text{[Equation 35-2]}$$

$$0.6 \le |R\_S\_5/R\_O\_6| \le 1.8 \quad \text{[Equation 35-3]}$$

(In Equation 35, R_S_5 refers to a radius of curvature on the optical axis of the sensor-side surface of the fifth lens, and R_O_6 refers to a radius of curvature on the optical axis of the object-side surface of the sixth lens.)

As the optical system and the optical module according to the embodiment satisfy Equation 35 above, it is possible to improve the aberration and chromatic aberration characteristics of the optical system and the optical module, and to improve the image quality of the peripheral region by setting a ratio of the radius of curvature of the sensor-side surface or the object-side surface of the adjacent fifth and sixth lenses within a set range.

The optical system and the optical module according to the embodiment may satisfy Equation 36 including any one of Equation 36-1, Equation 36-2, and Equation 36-3 below.

$$5 \leq |R\_S\_3/EFL| \leq 20 \quad \text{[Equation 36-1]}$$

$$8 \leq |R\_S\_3/EFL| \leq 18 \quad \text{[Equation 36-2]}$$

$$10 \leq |R\_S\_3/EFL| \leq 16 \quad \text{[Equation 36-3]}$$

(In Equation 36, R_S_3 refers to the radius of curvature on the optical axis of the sensor-side surface of the third lens, and EFL refers to an effective focal length of the optical system.)

As the optical system and the optical module according to the embodiment satisfy Equation 36 above, it is possible to improve the chromatic aberration characteristics of the optical system and the optical module by setting a ratio of the third lens to the effective focal length within a set range.

The optical system and the optical module according to the embodiment may satisfy Equation 37 including any one of Equation 37-1, Equation 37-2, and Equation 37-3 below.

$$1.00 \leq |EFL/f\_3| + |EFL/f\_4| + |EFL/f\_5| + |EFL/f\_6| \leq 10.00 \quad \text{[Equation 37-1]}$$

$$5.00 \leq |EFL/f\_3| + |EFL/f\_4| + |EFL/f5| + |EFL/f\_6| \leq 7.00 \quad \text{[Equation 37-2]}$$

$$3.00 \leq |EFL/f\_3| + |EFL/f\_4| + |EFL/f\_5| + |EFL/f\_6| \leq 5.00 \quad \text{[Equation 37-3]}$$

(In Equation 37, f_3 refers to a focal length of the third lens, f_4 refers to a focal length of the fourth lens, f_5 refers to a focal length of the fifth lens, and f_6 refers to a focal length of the sixth lens. EFL refers to the effective focal length of the optical system.)

As the optical system and the optical module according to the embodiment satisfy Equation 37 above, it is possible to improve the chromatic aberration characteristics of the optical system and the optical module by setting a ratio of the sequentially disposed third lens, the fourth lens, the fifth lens, and the sixth lens to the effective focal length within a set range.

The optical system and the optical module according to the embodiment may satisfy Equation 38 including any one of Equation 38-1, Equation 38-2, and Equation 38-3 below.

$$1 \leq |f\_1/f\_2| + |f\_1/f\_3| + |f\_1/f\_4| + |f\_1/f\_5| + |f\_1/f\_6|| \leq 15 \quad \text{[Equation 38-1]}$$

$$2 \leq |f\_1/f\_2| + |f\_1/f\_3| + |f\_1/f\_4| + |f\_1/f\_5| + |f\_1/f\_6|| \leq 13 \quad \text{[Equation 38-2]}$$

$$3 \leq |f\_1/f\_2| + |f\_1/f\_3| + |f\_1/f\_4| + |f\_1/f\_5| + |f\_1/f\_6| \leq 10 \quad \text{[Equation 38-3]}$$

(In Equation 38, f_6 refers to the focal length of the sixth lens, f_5 refers to the focal length of the fifth lens, f_4 refers to the focal length of the fourth lens, and f_3 refers to the focal length of the third lens. Refers to, f_2 refers to a focal length of the second lens, and f_1 refers to a focal length of the first lens.)

As the optical system and the optical module according to the embodiment satisfy Equation 38 above, it is possible to improve the chromatic aberration characteristics of the optical system and the optical module by setting a ratio of the sequentially disposed the first lens, the second lens, the third lens, the fourth lens, the fifth lens, and the sixth lens to the effective focal lengths within a set range.

The optical system and the optical module according to the embodiment may satisfy Equation 39 including any one of Equation 39-1, Equation 39-2, and Equation 39-3 below.

$$0.1 \leq CT\_1/CT\_3 \leq 4.50 \quad \text{[Equation 39-1]}$$

$$0.3 \leq CT\_1/CT\_3 \leq 3.50 \quad \text{[Equation 39-2]}$$

$$0.5 \leq CT\_1/CT\_3 \leq 2.50 \quad \text{[Equation 39-3]}$$

(In Equation 39, CT_1 refers to a thickness on the optical axis of the first lens, and CT_3 refers to a thickness on the optical axis of the third lens.)

As the optical system and the optical module according to the embodiment satisfy Equation 39 above, it is possible to improve the aberration characteristics of the optical system and the optical module by setting a ratio of the thickness on the optical axis of the first lens close to the aperture and the n−3rd lens close to the image sensor unit within a set range.

The optical system and the optical module according to the embodiment may satisfy Equation 40 including any one of Equation 40-1, Equation 40-2, and Equation 40-3 below.

$$0 < |f\_4/CT\_4| \leq 1000 \quad \text{[Equation 40-1]}$$

$$10 \leq |f\_4/CT\_4| \leq 850 \quad \text{[Equation 40-2]}$$

$$30 \leq |f\_4/CT\_4| \leq 700 \quad \text{[Equation 40-3]}$$

(In Equation 40, f_4 refers to the focal length of the fourth lens, and CT_4 refers to a thickness on the optical axis of the fourth lens.)

As the optical system and the optical module according to the embodiment satisfy Equation 40 above, it is possible to improve the chromatic aberration characteristics of the optical system and the optical module by setting a ratio of the focal length of the fourth lens to the thickness on the optical axis of the fourth lens within a set range.

The optical system and the optical module according to the embodiment may satisfy Equation 41 including any one of Equations 41-1, 41-2, and 41-3 below.

$$1.0 \leq CD\_3/4/CT\_4 \leq 3.0 \quad \text{[Equation 41-1]}$$

$$1.3 \leq CD\_3/4/CT\_4 \leq 2.5 \quad \text{[Equation 41-2]}$$

$$1.60 \leq CD\_3/4/CT\_4 \leq 2.20 \quad \text{[Equation 41-3]}$$

(1.92/1.90/1.95)

(In Equation 41, CD_3/4 refers to a distance on the optical axis of the third lens and the fourth lens, and CT_4 refers to a thickness on the optical axis of the fourth lens.)

As the optical system and the optical module according to the embodiment satisfy Equation 41 above, it is possible to improve the aberration characteristics of the optical system and the optical module by setting a ratio of the distance between the adjacent third lens and the fourth lens to the thickness on the optical axis of the fourth lens within a set range.

The optical system and the optical module according to the embodiment may satisfy Equation 42 including any one of Equation 42-1, Equation 42-2, and Equation 42-3 below.

$$1.0 \leq CT\_6/CT\_4 \leq 4.0 \quad \text{[Equation 42-1]}$$

$$1.15 \leq CT\_6/CT\_4 \leq 3.5 \quad \text{[Equation 42-2]}$$

$$1.3 \leq CT\_6/CT\_4 \leq 3.2 \quad \text{[Equation 42-3]}$$

(In Equation 42, CT_6 refers to the thickness on the optical axis of the sixth lens, and CT_4 refers to the thickness on the optical axis of the fourth lens.)

As the optical system and the optical module according to the embodiment satisfy Equation 42 above. it is possible to improve the aberration characteristics of the optical system and the optical module by setting a ratio of the thickness on the optical axis of the fourth lens and the sixth lens spaced apart each other within a set range.

The optical system and the optical module according to the embodiment may satisfy Equation 43 including any one of Equation 43-1, Equation 43-2, and Equation 43-3 below.

$$0.30 \leq CT\_2/CT\_4 \leq 2.0 \quad \text{[Equation 43-1]}$$

$$0.50 \leq CT\_2/CT\_4 \leq 1.50 \quad \text{[Equation 43-2]}$$

$$0.80 \leq CT\_2/CT\_4 \leq 1.20 \quad \text{[Equation 43-3]}$$

(In Equation 43, CT_2 refers to a thickness on the optical axis of the second lens, and CT_4 refers to the thickness on the optical axis of the fourth lens.)

As the optical system and the optical module according to the embodiment satisfy Equation 43 above, it is possible to improve the aberration characteristics of the optical system and the optical module by setting a ratio of the thickness on the optical axis of the second lens and the fourth lens spaced apart each other within a set range.

The optical system and the optical module according to the embodiment may satisfy Equation 44 including any one of Equation 44-1, Equation 44-2, and Equation 44-3 below.

$$0.1 \leq CT\_1/CT\_4 \leq 5.0 \quad \text{[Equation 44-1]}$$

$$0.3 \leq CT\_1/CT\_4 \leq 4.5 \quad \text{[Equation 44-2]}$$

$$0.5 \leq CT\_1/CT\_4 \leq 4.0 \quad \text{[Equation 44-3]}$$

(In Equation 44, CT_1 refers to the thickness on the optical axis of the first lens, and CT_4 refers to the thickness on the optical axis of the n–2nd lens.)

As the optical system and the optical module according to the embodiment satisfy Equation 44 above, it is possible to improve the aberration characteristics of the optical system and the optical module by setting a ratio of the thickness on the optical axis of the first lens and the fourth lens spaced apart each other within a set range.

The optical system and the optical module according to the embodiment may satisfy Equation 45 including any one of Equation 45-1, Equation 45-2, and Equation 45-3 below.

$$0.3 \leq TTL/EFL \leq 2.0 \quad \text{[Equation 45-1]}$$

$$0.5 \leq TTL/EFL \leq 1.7 \quad \text{[Equation 45-2]}$$

$$0.8 \leq TTL/EFL \leq 1.5 \quad \text{[Equation 45-3]}$$

(In Equation 45, total track length (TTL) refers to the distance in the optical axis OA direction from the vertex of the object-side surface of the first lens to the upper surface of the image sensor unit, and EFL refers to the effective focal length of the optical system.)

As the optical system and the optical module according to the embodiment satisfy Equation 45 above, the optical system and the optical module may be implemented in a slim structure to have an appropriate size, and the chromatic aberration characteristics may be improved by setting a ratio of the TTL to the effective focal length within a set range.

The optical system and the optical module according to the embodiment may satisfy Equation 46 including any one of Equation 46-1, Equation 46-2, and Equation 46-3 below.

$$0.3 \leq CD\_3/4/D\_c\_3/4 \leq 2.0 \quad \text{[Equation 46-1]}$$

$$0.5 \leq CD\_3/4/D\_c\_3/4 \leq 1.5 \quad \text{[Equation 46-2]}$$

$$0.8 \leq CD\_3/4/D\_c\_3/4 \leq 1.3 \quad \text{[Equation 46-3]}$$

(In Equation 46, CD_3/4 refers to the distance on the optical axis of the third lens and the fourth lens, D_c_3/4 refers to a distance in the optical axis direction between the third lens and a critical point region of the object-side surface of the fourth lens, and the critical point region is defined as a range of 0.1 mm based on the critical point)

As the optical system and the optical module according to the embodiment satisfy Equation 46 above, it is possible to improve the aberration characteristics of the optical system and the optical module by setting a ratio of the distance at the critical point to the distance on the optical axis of the adjacent third lens and the fourth lens within a set range.

The optical system and the optical module according to the embodiment may satisfy Equation 47 including any one of Equation 47-1, Equation 47-2, and Equation 47-3 below.

$$0.3 \leq CT\_4/5/T\_ms\_4/5 \leq 3.0 \quad \text{[Equation 47-1]}$$

$$0.5 \leq CT\_4/5/T\_ms\_4/5 \leq 2.5 \quad \text{[Equation 47-2]}$$

$$0.8 \leq CT\_4/5/T\_ms\_4/5 \leq 2.0 \quad \text{[Equation 47-3]}$$

(In Equation 47, CT_4/5 refers to a distance on the optical axes of the fourth lens and the fifth lens, and T_ms_4/5 refers to a distance in the optical axis direction of a point at which the absolute value of the sag value of the object-side surface of the fourth lens and the fifth lens is the greatest.

As the optical system and the optical module according to the embodiment satisfy Equation 47 above, it is possible to improve the aberration characteristics of the optical system and the optical module by setting a ratio of the distance at the maximum sag value of the adjacent fourth lens and the fifth lens to the distance on the optical axis within a set range.

The optical system and the optical module according to the embodiment may satisfy Equation 49 including any one of Equation 48-1, Equation 48-2, and Equation 48-3 below.

$$0.2 \leq CT\_4/T\_c\_4 \leq 2.0 \quad \text{[Equation 48-1]}$$

$$0.4 \leq CT\_4/T\_c\_4 \leq 1.5 \quad \text{[Equation 48-2]}$$

$$0.6 \leq CT\_4/T\_c\_4 \leq 1.3 \quad \text{[Equation 48-3]}$$

(In Equation 48, CT_4 refers to the thickness on the optical axis of the fourth lens, T_c_4 refers to a thickness in the optical axis direction passing through the critical point region of the object-side surface of the fourth lens, and the critical point region is defined as a range of 0.1 mm based on the critical point.)

As the optical system and the optical module according to the embodiment satisfy Equation 48 above, it is possible to improve distortion aberration characteristics of the optical system and the optical module by setting a ratio of the lens thickness at the critical point of the adjacent fourth lens to the thickness on the optical axis are set within a set range.

The optical system and the optical module according to the embodiment may satisfy Equation 49 including any one of Equation 49-1, Equation 49-2, and Equation 49-3 below.

$$0.5 \leq CT\_5/T\_ms\_5 \leq 2.5 \quad \text{[Equation 49-1]}$$

$$1.0 \leq CT\_5/T\_ms\_5 \leq 2.0 \quad \text{[Equation 49-2]}$$

$$1.2 \leq CT\_5/T\_ms\_5 \leq 1.7 \quad \text{[Equation 49-3]}$$

(In Equation 49, CT_5 refers to the thickness on the optical axis of the fifth lens, and T_ms_5 refers to a thickness in the optical axis direction passing through a point at which the absolute value of the sag value of the object-side surface of the fifth lens is the greatest.)

As the optical system and the optical module according to the embodiment satisfy Equation 49 above, it is possible to improve the distortion aberration characteristics of the optical system and the optical module by setting a ratio of the thickness at the maximum sag value of the fifth lens disposed close to the image sensor unit to the thickness on the optical axis within a set range.

The optical system and the optical module according to the embodiment may satisfy Equation 50 including any one of Equation 50-1, Equation 50-2, and Equation 50-3 below.

$$0.1 \leq CD\_5/6/T\_ca\_5/6 \leq 2.0 \quad \text{[Equation 50-1]}$$

$$0.3 \leq CD\_5/6/T\_ca\_5/6 \leq 1.5 \quad \text{[Equation 50-2]}$$

$$0.45 \leq CD\_5/6/T\_ca\_5/6 \leq 1.2 \quad \text{[Equation 50-3]}$$

(In Equation 50, CD_5/6 refers to a distance on the optical axis of the fifth lens and the sixth lens, and D_ca_5/6 refers to a distance in the optical axis direction at a point that is a distance of 70% to 100% from the optical axis of the object-side surface of the fifth lens and the sixth lens toward the effective diameter.)

As the optical system and the optical module according to the embodiment satisfy the Equation 50 above, it is possible to improve the distortion aberration characteristics of the optical system and the optical module by setting a ratio of the distance from the optical axis of the fifth lens and the sixth lens disposed close to the image sensor unit to a distance in a region close to an end of the effective diameter within the set range.

The optical system and the optical module according to the embodiment may satisfy Equation 51 including any one of Equations 51-1, 51-2, and 51-3 below.

$$20 < V5 + V6 < 120 \quad \text{[Equation 51-1]}$$

$$30 < V5 + V6 < 90 \quad \text{[Equation 51-2]}$$

$$40 < V5 + V6 < 80 \quad \text{[Equation 51-3]}$$

(In Equation 51, V5 refers to an Abbe's number of the fifth lens, and V6 refers to an Abbe's number of the sixth lens.)

As the optical system and the optical module according to the embodiment satisfy Equation 51 above, it is possible to improve the chromatic aberration characteristics of the optical system and the optical module by setting a ratio of the Abbe's number of the fifth lens and the sixth lens disposed close to the image sensor unit within a set range.

The optical system and the optical module according to the embodiment may satisfy Equation 52 including any one of Equation 52-1, Equation 52-2, and Equation 52-3 below.

$$3.5 < TTL < 8.0 \quad \text{[Equation 52-1]}$$

$$3.8 < TTL < 7.0 \quad \text{[Equation 52-2]}$$

$$4.2 < TTL < 6.0 \quad \text{[Equation 52-3]}$$

(In Equation 52, total track length (TTL) refers to the distance in the optical axis direction from the vertex of the object-side surface of the first lens to the upper surface of the image sensor unit.)

As the optical system and the optical module according to the embodiment satisfy Equation 52 above, the miniaturization of the optical system and the optical module according to the embodiment may be realized by setting the size of the TTL within a set range, and thus the optical system and the optical module according to the embodiment may be easily applied to the display device such as the smart phone.

The optical system and the optical module according to the embodiment may satisfy Equation 53 including any one of Equation 53-1, Equation 53-2, and Equation 53-3 below.

$$1.5 < TTL/EPD < 4 \quad \text{[Equation 53-1]}$$

$$1.8 < TTL/EPD < 3 \quad \text{[Equation 53-2]}$$

$$2.0 < TTL/EPD < 2.7 \quad \text{[Equation 53-3]}$$

(In Equation 53, total track length (TTL) refers to the distance in the optical axis direction from the vertex of the object-side surface of the first lens to the upper surface of the image sensor unit, and EPD refers to a size of an entrance pupil of the optical system.)

As the optical system and the optical module according to the embodiment satisfy Equation 53 above, it is possible to improve the resolution of the optical system and the optical module by setting the TTL and the size of the entrance pupil within a set range.

The optical system and the optical module according to the embodiment may satisfy Equation 54 including any one of Equation 54-1, Equation 54-2, and Equation 54-3 below.

$$1 < F \text{ number} < 3.5 \quad \text{[Equation 54-1]}$$

$$1.5 < F \text{ number} < 3.0 \quad \text{[Equation 54-2]}$$

$$1.7 < F \text{ number} < 2.5 \quad \text{[Equation 54-3]}$$

As the optical system and the optical module according to the embodiment satisfy Equation 54 above, it is possible to improve the resolution of the optical system and the optical module by setting a size of the F number within a set range.

The optical system and the optical module according to the embodiment may satisfy Equation 55 including any one of Equation 55-1, Equation 55-2, and Equation 55-3 below.

$$0.5 \text{ mm} < \text{D\_mx\_6}/I < 2.0 \text{ mm} \quad \text{[Equation 55-1]}$$

$$0.65 \text{ mm} < \text{D\_mx\_6}/I < 1.8 \text{ mm} \quad \text{[Equation 55-2]}$$

$$0.8 \text{ mm} < \text{D\_mx\_6}/I < 1.5 \text{ mm} \quad \text{[Equation 55-3]}$$

(In Equation 55, D_mx_6/l refers to a distance in the optical axis direction from a point having an absolute value of a maximum sag value on the sensor-side surface of the sixth lens to the upper surface of the image sensor unit.)

As the optical system and the optical module according to the embodiment satisfy Equation 55 above, it is possible to facilitate the manufacture of the optical system and the optical module by setting a distance between the sixth lens, which is the last lens of the optical system, and the image sensor unit within a set range The optical system and the optical module according to the embodiment may satisfy Equation 56 including any one of Equation 56-1, Equation 56-2, and Equation 56-3 below.

$$10^\circ < |\text{SA2\_O\_4}| \le 60^\circ \quad \text{[Equation 56-1]}$$

$$15^\circ < |\text{SA2\_O\_4}| \le 55^\circ \quad \text{[Equation 56-2]}$$

$$20^\circ < |\text{SA2\_O\_4}| \le 50^\circ \quad \text{[Equation 56-1]}$$

(In Equation 56, SA2_O_4 refers to the slope angle between the normal line and the optical axis at any one point of the object-side surface in the distance range of 75% to 85% from the optical axis to the effective diameter of the object-side surface of the fourth lens.)

As the optical system and the optical module according to the embodiment satisfy Equation 56 above, it is possible to increase the curvature of the lens surface toward the portion far from the optical axis of the fourth lens disposed close to the image sensor unit, that is, toward the end of the effective diameter of the fourth lens. Accordingly, it is possible to improve the aberration characteristics of the optical system and the optical module.

The optical system 1000 and the optical module 2000 according to embodiments may satisfy at least one of Equations 1 to 56 described above. In detail, the optical system 1000 and the optical module 2000 according to the embodiment may satisfy any one of the above equations or a combination of at least two or more of the above equations.

As the optical system 1000 and the optical module 2000 according to the embodiment satisfy any one of the above equations or the combination of at least two or more equations, the optical system 1000 and the optical module 2000 may have improved optical characteristics. In addition, the optical system 1000 and the optical module 2000 may minimize an occurrence of optical distortion in an image result. In addition, it is possible to realize miniaturization of the optical system and the optical module. In addition, it is possible to reduce chromatic aberration of the optical system 1000 and the optical module 2000, and to increase the relative illumination, thereby improving the image quality of the peripheral region.

Hereinafter, an optical system and an optical module according to embodiments will be described with reference to the drawings.

First, an optical system 1000 and an optical module 2000 according to a first embodiment will be described in more detail with reference to FIGS. 11 to 22.

Referring to FIG. 11, the optical system 1000 and the optical module 2000 according to the first embodiment may include a lens in which n is 6. That is, the optical system 1000 and the optical module 2000 according to the first embodiment may include six lenses.

In detail, the optical system 1000 and the optical module 2000 according to the first embodiment may include a first lens 110, a second lens 120, and a third lens 130 a fourth lens 140, a fifth lens 150, a sixth lens 160, and an image sensor unit 300 that are sequentially disposed from the object-side toward the sensor-side. The first lens 110, the second lens 120, the third lens 130, the fourth lens 140, the fifth lens 150 and the sixth lens 160 may be sequentially disposed along the optical axis of the optical system 1000 while being spaced apart from each other.

In addition, a filter unit 500 may be disposed between the plurality of lenses 110, 120, 130, 140, 150, and 160 and the image sensor unit 300. The filter unit 500 may be disposed between the sixth lens 160 and the image sensor unit 300.

In addition, the optical system 1000 according to the first embodiment may include an aperture (not shown). The aperture may be disposed between the first lens 110 and the second lens 120. Alternatively, the sensor-side surface of the first lens 110 may be an aperture.

The first to sixth lenses 110, 120, 130, 140, 150 and 160 according to the first embodiment may each have a radius of curvature, a thickness, a distance, a refractive index, and an Abbe's number that are set numerical values.

In detail, the radius of curvature, the thickness of each lens, the distance between each lens, the refractive index, and the Abbe's number of the first to sixth lenses 110, 120, 130, 140, 150 and 160 according to the first embodiment may be the same as in FIG. 12.

Referring to FIGS. 11 and 12, in the optical system 1000 according to the first embodiment, the first lens 110 may have a positive (+) refractive power on the optical axis. The first surface S1 of the first lens 110 may be convex toward the object-side surface on the optical axis, and the second surface S2 may be concave toward the sensor-side surface on the optical axis. The first lens 110 may have a meniscus shape convex toward the object on the optical axis as a whole. The first surface S1 may be an aspherical surface, and the second surface S2 may be an aspherical surface.

The second lens 120 may have a negative (−) refractive power on the optical axis. The third surface S3 of the second lens 120 may be convex toward the object-side surface on the optical axis, and the fourth surface S4 may be concave toward the sensor-side surface on the optical axis. The second lens 120 may have a meniscus shape convex toward the object on the optical axis as a whole. The third surface S3 may be an aspherical surface, and the fourth surface S4 may be an aspherical surface.

The third lens 130 may have a positive (+) refractive power on the optical axis. The fifth surface S5 of the third lens 130 may be convex toward the object-side surface on the optical axis, and the sixth surface S6 may be convex toward the sensor-side surface on the optical axis. The third lens 130 may have a shape in which both sides are convex on the optical axis as a whole. The fifth surface S5 may be an aspherical surface, and the sixth surface S6 may be an aspherical surface.

The fourth lens 140 may have negative (−) refractive power on the optical axis. The seventh surface S7 of the fourth lens 140 may be convex toward the object-side surface on the optical axis, and the eighth surface S8 may be concave toward the sensor-side surface on the optical axis. The fourth lens 140 may have a meniscus shape convex toward the object on the optical axis as a whole. The seventh surface S7 may be an aspherical surface, and the eighth surface S8 may be an aspherical surface.

The fifth lens 150 may have a positive (+) refractive power on the optical axis. The ninth surface S9 of the fifth lens 150 may be convex toward the object-side surface on the optical axis, and the tenth surface S10 may be convex toward the sensor-side surface on the optical axis. The fifth lens 150 may have a shape in which both sides are convex on the optical axis as a whole. The ninth surface S9 may be an aspherical surface, and the tenth surface S10 may be an aspherical surface.

The sixth lens 160 may have a negative (−) refractive power on the optical axis. The eleventh surface S11 of the sixth lens 160 may be concave toward the object-side surface on the optical axis, and the twelfth surface S12 may be concave toward the sensor-side surface on the optical axis. The sixth lens 160 may have a shape in which both sides are concave on the optical axis as a whole. At least one of the eleventh surface S11 and the twelfth surface S12 may include a free-form surface. In detail, the eleventh surface S11 and the twelfth surface S12 may include free-form surfaces. That is, the sixth lens 160 may be a free form lens.

A shape of the free-form surface of the sixth lens 160 may be defined as a sag value calculated by Equation D.

In detail, in the sixth lens 160, orders of the Zernike coefficient of FIG. 13 may include an order having a value of zero and an order having a value other than zero.

In detail, in the sixth lens 160 in FIG. 14, all of orders having Sin θ and Cos θ are adjusted to a value of zero, and some of orders having Cos 2nθ are adjusted to a value other than zero, thereby manufacturing the sixth lens.

FIG. 15 shows a numerical value of items applied to the above equations in the optical system 1000 and the optical module 2000 according to the first embodiment, FIG. 16 shows a slope angle for each position of the first lens to the sixth lens in the optical system according to the first embodiment, FIG. 17 shows a lens spacing for each position of the first lens to the sixth lens in the optical system according to the first embodiment, FIG. 18 shows a lens thickness for each position of the first lens to the sixth lens in the optical system according to the first embodiment, FIG. 19 shows a sag value for each position of the first lens to the sixth lens in the optical system according to the first embodiment, and FIG. 20 shows an aspherical coefficient value of the optical system 1000 according to the first embodiment, FIG. 21 is a graph showing the degree of distortion of the optical system and the optical module according to the first embodiment, and FIG. 22 is a table for describing the MTF characteristics the optical system and the optical module according to the first embodiment.

Referring to FIG. 16, in the optical system and the optical module according to the first embodiment, it can be seen that the first to sixth lenses are formed to have different slope angles for each position.

In addition, it can be seen that the slope angles gradually increase as the first to sixth lenses move away from the optical axis. That is, it can be seen that the first to sixth lenses have the largest slope angle at the end of the effective diameter.

In addition, it can be seen that an increase width of the slope angle increases as the first to sixth lenses move away from the optical axis. That is, it can be seen that the curvature of the lens surface increases as a whole as the first to sixth lenses move away from the optical axis.

In addition, it can be seen that at least one of the first to sixth lenses includes a region where a sign of the slope angle is changed. That is, it can be seen that at least one of the first to sixth lenses includes a critical point.

In addition, it can be seen that at least one of the first to sixth lenses includes a region where a size of the slope angle decreases.

Referring to FIG. 17, in the optical system and the optical module according to the first embodiment, it can be seen that the first to sixth lenses are formed to have different lens spacings for each position.

In addition, at least one of the first to sixth lenses may include a region where the size of the lens spacing decreases. For example, a spacing between the first lens and the second lens, a spacing between the second lens and the third lens, a spacing between the third lens and the fourth lens, a spacing between the fourth lens and the fifth lens, and a spacing between the fifth lens and the sixth lens may include a region where the size of the lens spacing decreases.

In addition, at least one of the first to sixth lenses may include a region where the size of the lens spacing increases. For example, the spacing between the third lens and the fourth lens, the spacing between the fourth lens and the fifth lens, and the spacing between the fifth lens and the sixth lens may include a region where the size of the lens spacing increases.

In addition, in at least one of the first to sixth lenses, a region where the size of the lens spacing decreases may be greater than a region where the size of the lens spacing increases. For example, in the spacing between the first lens and the second lens, the spacing between the second lens and the third lens, and the spacing between the fifth lens and the sixth lens, a region where the size of the lens spacing decreases may be greater than a region where the size of the lens spacing increases.

In addition, in at least one of the first to sixth lenses, a region where the size of the lens spacing increases may be greater than a region where the size of the lens spacing decreases. For example, in the spacing between the third lens and the fourth lens and the spacing between the fourth lens and the fifth lens, a region where the size of the lens spacing increases may be greater than a region where the size of the lens spacing increases.

In addition, at least one of the first to sixth lenses may include only a region where the size of the lens spacing decreases. For example, the spacing between the first lens and the second lens and the spacing between the second lens and the third lens may include only a region where the size of the lens spacing decreases.

Referring to FIG. 18, in the optical system and optical module according to the first embodiment, it can be seen that the first to sixth lenses are formed to have different lens thicknesses for each position.

In addition, at least one of the first to sixth lenses may include a region where the lens thickness decreases. For example, the first lens, the third lens, the fourth lens, the fifth lens, and the sixth lens may include a region where the lens thickness decreases.

In addition, at least one of the first to sixth lenses may include a region where the lens thickness increases. For example, the second lens, the third lens, the fourth lens, the fifth lens, and the sixth lens may include a region in which the lens thickness increases.

In addition, in at least one of the first to sixth lenses, a region where the lens thickness decreases may be greater than a region where the lens thickness increases. For example, in the first lens, the third lens, and the fifth lens, a region where the lens thickness decreases may be greater than a region where the lens thickness increases.

In addition, in at least one of the first to sixth lenses, a region where the lens thickness increases may be greater than a region where the lens thickness decreases. For example, in the second lens, the fourth lens, and the sixth lens, a region where the lens thickness increases may be greater than a region where the lens thickness decreases.

In addition, at least one of the first to sixth lenses may include only a region where the lens thickness decreases. For example, the first lens may include only a region where the lens thickness decreases.

Referring to FIG. 19, in the optical system and the optical module according to the first embodiment, it can be seen that the first to sixth lenses are formed to have different sag values for each position.

In addition, at least one of the first to sixth lenses may include a region where the sag value decreases. For example, a third surface of the second lens, a sixth surface of the third lens, seventh and eighth surfaces of the fourth lens, a ninth surface of the fifth lens, and a twelfth surface of the sixth lens may include a region where the sag value decreases.

In addition, at least one of the first to sixth lenses may include a region where the sag value increases. For example, the first and second surfaces of the first lens, the third and fourth surfaces of the second lens, the fifth and sixth surfaces of the third lens, the seventh and the eighth surfaces of the fourth lens, the ninth and tenth surfaces of the fifth lens, and the eleventh and twelfth surfaces of the sixth lens may include a region where the sag value increases.

In addition, in at least one of the first to sixth lenses, a region where the sag value increases may be greater than a region where the sag value increases. For example, in the first and second surfaces of the first lens, the third and fourth surfaces of the second lens, the fifth and sixth surfaces of the third lens, the seventh and eighth surfaces of the fourth lens, the ninth and tenth surfaces of the fifth lens, and the eleventh and twelfth surfaces of the sixth lens, a region where the sag value increases may be greater than a region where the sag value increases.

In addition, at least one of the first to sixth lenses may include only a region where the sag value increases. For example, the first and second surfaces of the first lens, the fourth surface of the second lens, the fifth surface of the third lens, the tenth surface of the fifth lens, and the eleventh surface of the sixth lens may include only a region where the lens thickness increases.

It can be seen that the optical system 1000 and the optical module 2000 according to the first embodiment satisfy at least one of Equations 1 to 56. In detail, it can be seen that the optical system 1000 and the optical module 2000 according to the first embodiment satisfy all of Equations 1 to 56 above.

Accordingly, it can be seen that the optical system and the optical module according to the first embodiment have low distortion characteristics as shown in FIG. 21.

In addition, it can be seen that the optical system and the optical module according to the first embodiment have improved MTF characteristics as shown in FIG. 22.

Hereinafter, an optical system 1000 and an optical module 2000 according to a second embodiment will be described in more detail with reference to FIGS. 23 to 33.

Referring to FIG. 23, the optical system 1000 and the optical module 2000 according to the second embodiment may include a first lens 110, a second lens 120, and a third lens 130 a fourth lens 140, a fifth lens 150, a sixth lens 160, and an image sensor unit 300 that are sequentially disposed from the object-side toward the sensor-side. The first lens 110, the second lens 120, the third lens 130, the fourth lens 140, the fifth lens 150 and the sixth lens 160 may be sequentially disposed along the optical axis of the optical system 1000 while being spaced apart from each other.

The radius of curvature, the thickness of each lens, the distance between each lens, the refractive index, and the Abbe's number of the first to sixth lenses 110, 120, 130, 140, 150 and 160 according to the second embodiment may be the same as in FIG. 24.

Referring to FIGS. 23 and 24, in the optical system 1000 according to the second embodiment, the first lens 110 may have a positive (+) refractive power on the optical axis. The first surface S1 of the first lens 110 may be convex toward the object-side surface on the optical axis, and the second surface S2 may be concave toward the sensor-side surface on the optical axis. The first lens 110 may have a meniscus shape convex toward the object on the optical axis as a whole. The first surface S1 may be an aspherical surface, and the second surface S2 may be an aspherical surface.

The second lens 120 may have a negative (−) refractive power on the optical axis. The third surface S3 of the second lens 120 may be convex toward the object-side surface on the optical axis, and the fourth surface S4 may be concave toward the sensor-side surface on the optical axis. The second lens 120 may have a meniscus shape convex toward the object on the optical axis as a whole. The third surface S3 may be an aspherical surface, and the fourth surface S4 may be an aspherical surface.

The third lens 130 may have a positive (+) refractive power on the optical axis. The fifth surface S5 of the third lens 130 may be convex toward the object-side surface on the optical axis, and the sixth surface S6 may be convex toward the sensor-side surface on the optical axis. The third lens 130 may have a shape in which both sides are convex on the optical axis as a whole. The fifth surface S5 may be an aspherical surface, and the sixth surface S6 may be an aspherical surface.

The fourth lens 140 may have negative (−) refractive power on the optical axis. The seventh surface S7 of the fourth lens 140 may be convex toward the object-side surface on the optical axis, and the eighth surface S8 may be concave toward the sensor-side surface on the optical axis. The fourth lens 140 may have a meniscus shape convex toward the object on the optical axis as a whole. The seventh surface S7 may be an aspherical surface, and the eighth surface S8 may be an aspherical surface.

The fifth lens 150 may have a positive (+) refractive power on the optical axis. The ninth surface S9 of the fifth lens 150 may be convex toward the object-side surface on the optical axis, and the tenth surface S10 may be convex toward the sensor-side surface on the optical axis. The fifth lens 150 may have a shape in which both sides are convex on the optical axis as a whole. The ninth surface S9 may be an aspherical surface, and the tenth surface S10 may be an aspherical surface.

The sixth lens 160 may have a negative (−) refractive power on the optical axis. The eleventh surface S11 of the sixth lens 160 may be concave toward the object-side surface on the optical axis, and the twelfth surface S12 may be concave toward the sensor-side surface on the optical axis. The sixth lens 160 may have a shape in which both sides are concave on the optical axis as a whole. At least one of the eleventh surface S11 and the twelfth surface S12 may include a free-form surface. In detail, the eleventh surface S11 and the twelfth surface S12 may include free-form surfaces. That is, the sixth lens 160 may be a free form lens.

A shape of the free-form surface of the sixth lens 160 may be defined as a sag value calculated by Equation D.

In detail, in the sixth lens 160, orders of the Zernike coefficient of FIG. 25 may include an order having a value of zero and an order having a value other than zero.

In detail, in the sixth lens 160 in FIG. 14, all of orders having Sin θ and Cos θ are adjusted to a value of zero, and some of orders having Cos 2nθ are adjusted to a value other than zero, thereby manufacturing the sixth lens.

FIG. 26 shows a numerical value of items applied to the above equations in the optical system 1000 and the optical module 2000 according to the second embodiment, FIG. 27 shows a slope angle for each position of the first lens to the sixth lens in the optical system according to the second embodiment, FIG. 28 shows a lens spacing for each position of the first lens to the sixth lens in the optical system according to the second embodiment, FIG. 29 shows a lens thickness for each position of the first lens to the sixth lens in the optical system according to the second embodiment, FIG. 30 shows a sag value for each position of the first lens to the sixth lens in the optical system according to the second embodiment, and FIG. 31 shows an aspherical coefficient value of the optical system 1000 according to the second embodiment, and FIG. 32 is a graph showing the degree of distortion of the optical system and the optical module according to the second embodiment. FIG. 33 is a table for describing the MTF characteristics the optical system and the optical module according to the second embodiment.

Referring to FIG. 27, in the optical system and the optical module according to the second embodiment, it can be seen that the first to sixth lenses are formed to have different slope angles for each position.

In addition, it can be seen that the slope angles gradually increase as the first to sixth lenses move away from the optical axis. That is, it can be seen that the first to sixth lenses have the largest slope angle at the end of the effective diameter.

In addition, it can be seen that an increase width of the slope angle increases as the first to sixth lenses move away from the optical axis. That is, it can be seen that the curvature of the lens surface increases as a whole as the first to sixth lenses move away from the optical axis.

In addition, it can be seen that at least one of the first to sixth lenses includes a region where a sign of the slope angle is changed. That is, it can be seen that at least one of the first to sixth lenses includes a critical point.

In addition, it can be seen that at least one of the first to sixth lenses includes a region where a size of the slope angle decreases.

Referring to FIG. 28, in the optical system and the optical module according to the first embodiment, it can be seen that the first to sixth lenses are formed to have different lens spacings for each position.

In addition, at least one of the first to sixth lenses may include a region where the size of the lens spacing decreases. For example, a spacing between the first lens and the second lens, a spacing between the second lens and the third lens, a spacing between the third lens and the fourth lens, a spacing between the fourth lens and the fifth lens, and a spacing between the fifth lens and the sixth lens may include a region where the size of the lens spacing decreases.

In addition, at least one of the first to sixth lenses may include a region where the size of the lens spacing increases. For example, the spacing between the third lens and the fourth lens, the spacing between the fourth lens and the fifth lens, and the spacing between the fifth lens and the sixth lens may include a region where the size of the lens spacing increases.

In addition, in at least one of the first to sixth lenses, a region where the size of the lens spacing decreases may be greater than a region where the size of the lens spacing increases. For example, in the spacing between the first lens and the second lens, the spacing between the second lens and the third lens, the spacing between the fourth lens and the fifth lens, and the spacing between the fifth lens and the sixth lens, a region where the size of the lens spacing decreases may be greater than a region where the size of the lens spacing increases.

In addition, in at least one of the first to sixth lenses, a region where the size of the lens spacing increases may be greater than a region where the size of the lens spacing decreases. For example, in the spacing between the third lens and the fourth lens, a region where the size of the lens spacing increases may be greater than a region where the size of the lens spacing increases.

In addition, at least one of the first to sixth lenses may include only a region where the size of the lens spacing decreases. For example, the spacing between the first lens and the second lens and the spacing between the second lens and the third lens may include only a region where the size of the lens spacing decreases.

Referring to FIG. 29, in the optical system and optical module according to the second embodiment, it can be seen that the first to sixth lenses are formed to have different lens thicknesses for each position.

In addition, at least one of the first to sixth lenses may include a region where the lens thickness decreases. For example, the first lens, the third lens, the fourth lens, the fifth lens, and the sixth lens may include a region where the lens thickness decreases.

In addition, at least one of the first to sixth lenses may include a region where the lens thickness increases. For example, the second lens, the third lens, the fourth lens, the fifth lens, and the sixth lens may include a region in which the lens thickness increases.

In addition, in at least one of the first to sixth lenses, a region where the lens thickness decreases may be greater than a region where the lens thickness increases. For example, in the first lens, the third lens, and the fifth lens, a region where the lens thickness decreases may be greater than a region where the lens thickness increases.

In addition, in at least one of the first to sixth lenses, a region where the lens thickness increases may be greater than a region where the lens thickness decreases. For example, in the second lens, the fourth lens, and the sixth lens, a region where the lens thickness increases may be greater than a region where the lens thickness decreases.

In addition, at least one of the first to sixth lenses may include only a region where the lens thickness decreases. For example, the first lens may include only a region where the lens thickness decreases.

In addition, at least one of the first to sixth lenses may include only a region where the lens thickness increases. For example, the first lens may include only a region where the lens thickness increases.

Referring to FIG. 30, in the optical system and the optical module according to the second embodiment, it can be seen that the first to sixth lenses are formed to have different sag values for each position.

In addition, at least one of the first to sixth lenses may include a region where the sag value decreases. For example, a third surface of the second lens, a sixth surface of the third lens, seventh and eighth surfaces of the fourth lens, a ninth surface of the fifth lens, and a twelfth surface of the sixth lens may include a region where the sag value decreases.

In addition, at least one of the first to sixth lenses may include a region where the sag value increases. For example, the first and second surfaces of the first lens, the third and fourth surfaces of the second lens, the fifth and sixth surfaces of the third lens, the seventh and the eighth surfaces of the fourth lens, the ninth and tenth surfaces of the fifth lens, and the eleventh and twelfth surfaces of the sixth lens may include a region where the sag value increases.

In addition, in at least one of the first to sixth lenses, a region where the sag value increases may be greater than a region where the sag value increases. For example, in the first and second surfaces of the first lens, the third and fourth surfaces of the second lens, the fifth and sixth surfaces of the third lens, the seventh and eighth surfaces of the fourth lens, the ninth and tenth surfaces of the fifth lens, and the eleventh and twelfth surfaces of the sixth lens, a region where the sag value increases may be greater than a region where the sag value increases.

In addition, at least one of the first to sixth lenses may include only a region where the sag value increases. For example, the first and second surfaces of the first lens, the fourth surface of the second lens, the fifth and sixth surfaces of the third lens, the tenth surface of the fifth lens, and the eleventh surface of the sixth lens may include only a region where the lens thickness increases.

It can be seen that the optical system 1000 and the optical module 2000 according to the second embodiment satisfy at least one of Equations 1 to 56. In detail, it can be seen that the optical system 1000 and the optical module 2000 according to the first embodiment satisfy all of Equations 1 to 56 above.

Accordingly, it can be seen that the optical system and the optical module according to the second embodiment have low distortion characteristics as shown in FIG. 32.

In addition, it can be seen that the optical system and the optical module according to the second embodiment have improved MTF characteristics as shown in FIG. 33.

Hereinafter, an optical system 1000 and an optical module 2000 according to a third embodiment will be described in more detail with reference to FIGS. 34 to 44.

Referring to FIG. 34, the optical system 1000 and the optical module 2000 according to the second embodiment may include a first lens 110, a second lens 120, and a third lens 130 a fourth lens 140, a fifth lens 150, a sixth lens 160, and an image sensor unit 300 that are sequentially disposed from the object-side toward the sensor-side. The first lens 110, the second lens 120, the third lens 130, the fourth lens 140, the fifth lens 150 and the sixth lens 160 may be sequentially disposed along the optical axis of the optical system 1000 while being spaced apart from each other.

The radius of curvature, the thickness of each lens, the distance between each lens, the refractive index, and the Abbe's number of the first to sixth lenses 110, 120, 130, 140, 150 and 160 according to the third embodiment may be the same as in FIG. 35.

Referring to FIGS. 34 and 35, in the optical system 1000 according to the third embodiment, the first lens 110 may have a positive (+) refractive power on the optical axis. The first surface S1 of the first lens 110 may be convex toward the object-side surface on the optical axis, and the second surface S2 may be concave toward the sensor-side surface on the optical axis. The first lens 110 may have a meniscus shape convex toward the object on the optical axis as a whole. The first surface S1 may be an aspherical surface, and the second surface S2 may be an aspherical surface.

The second lens 120 may have a negative (−) refractive power on the optical axis. The third surface S3 of the second lens 120 may be convex toward the object-side surface on the optical axis, and the fourth surface S4 may be concave toward the sensor-side surface on the optical axis. The second lens 120 may have a meniscus shape convex toward the object on the optical axis as a whole. The third surface S3 may be an aspherical surface, and the fourth surface S4 may be an aspherical surface.

The third lens 130 may have a positive (+) refractive power on the optical axis. The fifth surface S5 of the third lens 130 may be convex toward the object-side surface on the optical axis, and the sixth surface S6 may be convex toward the sensor-side surface on the optical axis. The third lens 130 may have a shape in which both sides are convex on the optical axis as a whole. The fifth surface S5 may be an aspherical surface, and the sixth surface S6 may be an aspherical surface.

The fourth lens 140 may have negative (−) refractive power on the optical axis. The seventh surface S7 of the fourth lens 140 may be convex toward the object-side surface on the optical axis, and the eighth surface S8 may be concave toward the sensor-side surface on the optical axis. The fourth lens 140 may have a meniscus shape convex toward the object on the optical axis as a whole. The seventh surface S7 may be an aspherical surface, and the eighth surface S8 may be an aspherical surface.

The fifth lens 150 may have a positive (+) refractive power on the optical axis. The ninth surface S9 of the fifth lens 150 may be convex toward the object-side surface on the optical axis, and the tenth surface S10 may be convex toward the sensor-side surface on the optical axis. The fifth lens 150 may have a shape in which both sides are convex on the optical axis as a whole. The ninth surface S9 may be an aspherical surface, and the tenth surface S10 may be an aspherical surface.

The sixth lens 160 may have a negative (−) refractive power on the optical axis. The eleventh surface S11 of the sixth lens 160 may be concave toward the object-side surface on the optical axis, and the twelfth surface S12 may be concave toward the sensor-side surface on the optical axis. The sixth lens 160 may have a shape in which both sides are concave on the optical axis as a whole. At least one of the eleventh surface S11 and the twelfth surface S12 may include a free-form surface. In detail, the eleventh surface S11 and the twelfth surface S12 may include free-form surfaces. That is, the sixth lens 160 may be a free form lens.

A shape of the free-form surface of the sixth lens 160 may be defined as a sag value calculated by Equation D.

In detail, in the sixth lens 160, orders of the Zernike coefficient of FIG. 36 may include an order having a value of zero and an order having a value other than zero.

In detail, in the sixth lens 160 in FIG. 14, all of orders having Sin θ and Cos θ are adjusted to a value of zero, and some of orders having Cos 2nθ are adjusted to a value other than zero, thereby manufacturing the sixth lens.

FIG. 37 shows a numerical value of items applied to the above equations in the optical system 1000 and the optical module 2000 according to the third embodiment, FIG. 38 shows a slope angle for each position of the first lens to the sixth lens in the optical system according to the third embodiment, FIG. 39 shows a lens spacing for each position of the first lens to the sixth lens in the optical system according to the third embodiment, FIG. 40 shows a lens thickness for each position of the first lens to the sixth lens in the optical system according to the third embodiment, FIG. 41 shows a sag value for each position of the first lens to the sixth lens in the optical system according to the third embodiment, and FIG. 42 shows an aspherical coefficient value of the optical system 1000 according to the third embodiment, FIG. 43 is a graph showing the degree of distortion of the optical system and the optical module according to the third embodiment, and FIG. 44 is a table for describing the MTF characteristics the optical system and the optical module according to the third embodiment.

Referring to FIG. 38, in the optical system and the optical module according to the third embodiment, it can be seen that the first to sixth lenses are formed to have different slope angles for each position.

In addition, it can be seen that the slope angles gradually increase as the first to sixth lenses move away from the optical axis.

In addition, it can be seen that an increase width of the slope angle increases as the first to sixth lenses move away from the optical axis. That is, it can be seen that the curvature of the lens surface increases as a whole as the first to sixth lenses move away from the optical axis.

In addition, it can be seen that at least one of the first to sixth lenses includes a region where a sign of the slope angle is changed. That is, it can be seen that at least one of the first to sixth lenses includes a critical point.

In addition, it can be seen that at least one of the first to sixth lenses includes a region where a size of the slope angle decreases.

Referring to FIG. 39, in the optical system and the optical module according to the first embodiment, it can be seen that the first to sixth lenses are formed to have different lens spacings for each position.

In addition, at least one of the first to sixth lenses may include a region where the size of the lens spacing decreases. For example, a spacing between the first lens and the second lens, a spacing between the second lens and the third lens, a spacing between the fourth lens and the fifth lens, and a spacing between the fifth lens and the sixth lens may include a region where the size of the lens spacing decreases.

In addition, at least one of the first to sixth lenses may include a region where the size of the lens spacing increases. For example, the spacing between the second lens and the third lens, the spacing between the third lens and the fourth lens, the spacing between the fourth lens and the fifth lens, and the spacing between the fifth lens and the sixth lens may include a region where the size of the lens spacing increases.

In addition, in at least one of the first to sixth lenses, a region where the size of the lens spacing decreases may be greater than a region where the size of the lens spacing increases. For example, in the spacing between the first lens and the second lens, the spacing between the second lens and the third lens, and the spacing between the fifth lens and the sixth lens, a region where the size of the lens spacing decreases may be greater than a region where the size of the lens spacing increases.

In addition, in at least one of the first to sixth lenses, a region where the size of the lens spacing increases may be greater than a region where the size of the lens spacing decreases. For example, in the spacing between the third lens and the fourth lens and the spacing between the fourth lens and the fifth lens, a region where the size of the lens spacing increases may be greater than a region where the size of the lens spacing increases.

In addition, at least one of the first to sixth lenses may include only a region where the size of the lens spacing decreases. For example, the spacing between the first lens and the second lens may include only a region where the size of the lens spacing decreases.

Referring to FIG. 40, in the optical system and optical module according to the third embodiment, it can be seen that the first to sixth lenses are formed to have different lens thicknesses for each position.

In addition, at least one of the first to sixth lenses may include a region where the lens thickness decreases. For example, the first lens, the third lens, the fourth lens, the fifth lens, and the sixth lens may include a region where the lens thickness decreases.

In addition, at least one of the first to sixth lenses may include a region where the lens thickness increases. For example, the second lens, the fourth lens, the fifth lens, and the sixth lens may include a region in which the lens thickness increases.

In addition, in at least one of the first to sixth lenses, a region where the lens thickness decreases may be greater than a region where the lens thickness increases. For example, in the first lens, the third lens, and the fifth lens, a region where the lens thickness decreases may be greater than a region where the lens thickness increases.

In addition, in at least one of the first to sixth lenses, a region where the lens thickness increases may be greater than a region where the lens thickness decreases. For example, in the second lens, the fourth lens, and the sixth lens, a region where the lens thickness increases may be greater than a region where the lens thickness decreases.

In addition, at least one of the first to sixth lenses may include only a region where the lens thickness decreases. For example, the first lens and the third lens may include only a region where the lens thickness decreases.

In addition, at least one of the first to sixth lenses may include only a region where the lens thickness increases. For example, the first lens may include only a region where the lens thickness increases.

Referring to FIG. 41, in the optical system and the optical module according to the third embodiment, it can be seen that the first to sixth lenses are formed to have different sag values for each position.

In addition, at least one of the first to sixth lenses may include a region where the sag value decreases. For example, a third surface of the second lens, seventh and eighth surfaces of the fourth lens, a ninth surface of the fifth lens, and a twelfth surface of the sixth lens may include a region where the sag value decreases.

In addition, at least one of the first to sixth lenses may include a region where the sag value increases. For example, the first and second surfaces of the first lens, the third and fourth surfaces of the second lens, the fifth and sixth surfaces of the third lens, the seventh and the eighth surfaces of the fourth lens, the ninth and tenth surfaces of the fifth lens, and the eleventh and twelfth surfaces of the sixth lens may include a region where the sag value increases.

In addition, in at least one of the first to sixth lenses, a region where the sag value increases may be greater than a region where the sag value increases. For example, in the first and second surfaces of the first lens, the third and fourth surfaces of the second lens, the fifth and sixth surfaces of the third lens, the seventh and eighth surfaces of the fourth lens, the ninth and tenth surfaces of the fifth lens, and the eleventh and twelfth surfaces of the sixth lens, a region where the sag value increases may be greater than a region where the sag value increases.

In addition, at least one of the first to sixth lenses may include only a region where the sag value increases. For example, the first and second surfaces of the first lens, the fourth surface of the second lens, the fifth and sixth surfaces of the third lens, the tenth surface of the fifth lens, and the eleventh surface of the sixth lens may include only a region where the lens thickness increases.

It can be seen that the optical system 1000 and the optical module 2000 according to the third embodiment satisfy at least one of Equations 1 to 56. In detail, it can be seen that the optical system 1000 and the optical module 2000 according to the first embodiment satisfy all of Equations 1 to 56 above.

Accordingly, it can be seen that the optical system and the optical module according to the third embodiment have low distortion characteristics as shown in FIG. 43.

In addition, it can be seen that the optical system and the optical module according to the third embodiment have improved MTF characteristics as shown in FIG. 44.

FIGS. 45 and 46 are views illustrating that a camera module according to an embodiment is applied to a mobile terminal.

Referring to FIG. 45, a mobile terminal 1 may include a camera module 10 provided on a rear surface thereof.

The camera module 10 may include an image capturing function. In addition, the camera module 10 may include at least one of an auto-focus function, a zoom function, and an OIS function.

The camera module 10 may process a still image or an image frame of a video image obtained by an image sensor 300 in a capturing mode or a video call mode. The processed image frame may be displayed on a display unit (not shown) of the mobile terminal 1 and stored in a memory (not shown).

For example, the camera module 10 may include a first camera module 10A and a second camera module 10B. In this case, at least one of the first camera module 10A and the second camera module 10B may include the above-described optical system 1000. Accordingly, the camera module 10 may have a slim structure and may capture a subject at various magnifications.

In addition, the mobile terminal 1 may further include an auto-focus device 31. The auto-focus device 31 may include an auto-focus function using a laser. The auto-focus device 31 may be mainly used in a condition in which the auto-focus function using the image of the camera module 10 is deteriorated, for example, in proximity of 10 m or less or in a dark environment. The auto-focus device 31 may include a light-emitting unit including a vertical cavity surface emitting laser (VCSEL) semiconductor device and a light receiving unit that converts light energy such as a photodiode into electrical energy.

In addition, the mobile terminal 1 may further include a flash module 33. The flash module 33 may include a light-emitting element emitting light therein. The flash module 33 may emit light in a visible light wavelength band. For example, the flash module 33 may emit white light or light having a color similar to white. However, the embodiment is not limited thereto, and the flash module 33 may emit light of various colors. The flash module 33 may be operated by a camera operation of the mobile terminal or a user's control.

In addition, referring to FIG. 46, the mobile terminal 1 may include a camera module 10 provided on a front surface thereof.

In detail, in the mobile terminal 1, the camera module 10 may be disposed in a screen display region on the front surface of the mobile terminal 1. That is, in the mobile terminal 1, the camera module 10 may be disposed in a display region on which a screen is displayed.

That is, the camera module 10 may be an under-display camera in which the camera module is disposed under the display of the mobile terminal 1.

When the camera module is applied as an under-display camera, the screen region may be expanded by removing a separate bezel region for disposing the camera, and there is no need to apply a punch hole design for making a hole for the camera.

The characteristics, structures and effects described in the embodiments above are included in at least one embodiment but are not limited to one embodiment. Furthermore, the characteristic, structure, and effect illustrated in each embodiment may be combined or modified for other embodiments by a person skilled in the art. Thus, it should be construed that contents related to such a combination and such a modification are included in the scope of the present invention.

In addition, embodiments are mostly described above, but the embodiments are merely examples and do not limit the present invention, and a person skilled in the art may appreciate that several variations and applications not presented above may be made without departing from the essential characteristic of embodiments. For example, each component specifically represented in the embodiments may be varied. In addition, it should be construed that differences related to such a variation and such an application are included in the scope of the present invention defined in the following claims.

What is claimed is:

1. An optical module comprising:

a sensor; and an optical system including first to sixth lenses sequentially disposed along an optical axis from an object-side toward a sensor-side, wherein at least one of an object-side surface and a sensor-side surface of the sixth lens includes a free-form surface, and wherein the fifth lens satisfies $$20^\circ < |SA1\_O\_5| \leq 60^\circ,$$

and wherein the SA1_O_5 is defined as an angle between the optical axis and a normal line of an object-side surface of the fifth lens at any one point of the object-side surface of the fifth lens at a range of 70% to 90% of a distance from the optical axis to an effective diameter of the fifth lens.

2. The optical module of claim 1, wherein the sixth lens satisfies $$|\text{max Sag\_O\_x\_6}| \neq |\text{max Sag\_O\_y\_6}|,$$

wherein the max Sag_O_x_6 is defined as a maximum sag value in an X-axis direction on the object-side surface of the sixth lens, and the max Sag_O_y_6 is defined as a maximum sag value in a Y-axis direction on the object-side surface of the sixth lens, wherein the optical system satisfies $$60^\circ \leq FOV \leq 90^\circ,$$

wherein FOV is defined as a field angle, wherein the optical system satisfies $$0.50 \leq TTL/ImgH \leq 1.0,$$

wherein the total track length (TTL) is defined as a distance in an optical axis direction from a vertex of an object-side surface of the first lens to an upper surface of an image sensor unit, and the ImgH is defined as twice a distance in a diagonal direction from the upper surface of the image sensor unit overlapping the optical axis to a 1.0 field region of the image sensor unit, wherein the optical system satisfies $$CA\_O\_x < CA\_O\_6,$$

and wherein the CA_O_x is defined as a size of an effective diameter of an object-side of a lens closest to an aperture among lenses between the aperture and the sensor, and the CA_O_6 is defined as a size of an effective diameter of the object-side surface of the sixth lens.

3. The optical module of claim 1, wherein the sixth lens satisfies $$10^\circ \leq |SA1\_O\_x\_6| \leq 40^\circ, \text{ and}$$

$$10^\circ \leq |SA1\_O\_y\_6| \leq 40^\circ,$$

and wherein the SA1_O_x_6 is defined as a slope angle between the optical axis and a normal line at any one point of an object-side surface of the sixth lens at a range of 20% to 50% of a distance from the optical axis to the effective diameter in the X-axis direction from the optical axis of the object-side surface of the sixth lens, and the SA1_O_y_6 is defined as an angle between the optical axis and a normal line at any one point of the object-side surface of the sixth lens at a range of 20% to 50% of a distance from the optical axis to the effective diameter in the Y-axis direction from the optical axis of the object-side surface of the sixth lens.

4. The optical module of claim 1, wherein the fifth lens satisfies $$0.5 \leq CT\_5/T\_O\_c\_5 \leq 1.7,$$

and wherein the CT_5 is defined as a thickness on the optical axis of the fifth lens, T_O_c_5 is defined as a thickness in the direction parallel to the optical axis direction in a critical point region of the object-side surface of the fifth lens, and the critical point region is defined as 0.1 mm range based on the critical point.

5. The optical module of claim 3, wherein the sixth lens satisfies Equation $$0.1 \leq CT\_6/\text{max } T\_6 \leq 1.0,$$

and wherein the CT_6 defined as a thickness on the optical axis of the sixth lens, and the max T_6 is defined as a maximum thickness of the sixth lens.

6. The optical module of claim 1, wherein the fifth lens and the sixth lens satisfy $$2 \leq CD\_(5/6)/\text{min } D\_(5/6) \leq 50,$$

and wherein the CD_(5/6) is defined as a distance on the optical axis of the fifth lens and the sixth lens, and the min D_(5/6) is defined as a minimum distance on the optical axis of the fifth lens and the sixth lens.

7. The optical module of claim 1, wherein effective diameters of object-side surfaces of lenses positioned between a lens closest to the aperture and a lens closest to the sensor are arranged in increasing order from the aperture toward the sensor.

8. The optical module of claim 1, wherein the sixth lens satisfies $$\min|Sag\_O\_x\_6| = \min|Sag\_O\_y\_6|,$$

and wherein the min Sag_O_x_6 is defined as a minimum sag value in the X-axis direction on the object-side surface of the sixth lens, and the min Sag_O_y_6 is defined as a minimum sag value in the Y-axis direction on the object-side surface of the sixth lens.

9. The optical module of claim 1, wherein the sixth lens satisfies $$\min|Sag\_O\_x\_6| = \min|Sag\_O\_y\_6|,$$

wherein the min Sag_O_x_6 is defined as a minimum sag value in the X-axis direction on the object-side surface of the sixth lens, and the min Sag_O_y_6 is defined as a minimum sag value in the Y-axis direction on the object-side surface of the sixth lens.

10. An optical module comprising:

a sensor; and an optical system including first to sixth lenses sequentially disposed along an optical axis from an object-side toward a sensor-side, wherein at least one of an object-side surface and a sensor-side surface of the sixth lens includes a free-form surface, the first lens has a positive refractive power, the second lens has a negative refractive power, the sixth lens has a negative refractive power, wherein the sixth lens satisfies $$10° \le |SA1\_O\_x\_6| \le 40°, \text{ and}$$

$$10° \le |SA1\_O\_y\_6| \le 40°,$$

wherein the SA1_O_x_6 defined as a slope angle between the optical axis and a normal line at any one point of an object-side surface of the sixth lens at a range of 20% to 50% of a distance from the optical axis to the effective diameter in the X-axis direction from the optical axis of the object-side surface of the sixth lens, and the SA1_O_y_6 is defined as an angle between the optical axis and a normal line at any one point of the object-side surface of the sixth lens at a range of 20% to 50% of a distance from the optical axis to the effective diameter in the Y-axis direction from the optical axis of the object-side surface of the sixth lens, the optical system includes at least three lenses having an Abbe's number of 50 or less, and the optical system includes at least one lens having a refractive index of less than 1.7.

11. The optical module of claim 10, wherein the fifth lens satisfies $$20° \le |SA1\_O\_5| \le 60°,$$

wherein the SA1_O_5 is defined as an angle between the optical axis and a normal line of an object-side surface of the fifth lens at any one point of the object-side surface of the fifth lens at a range of 70% to 90% of a distance from the optical axis to an effective diameter of the fifth lens.

12. The optical module of claim 11, wherein the sixth lens satisfies $$|\max Sag\_O\_x\_6| \neq |\max Sag\_O\_y\_6|,$$

wherein the max Sag_O_x_6 is defined as a maximum sag value in an X-axis direction on the object-side surface of the sixth lens, and the max Sag_O_y_6 is defined as a maximum sag value in a Y-axis direction on the object-side surface of the sixth lens, wherein the optical system satisfies $$60° \le FOV \le 90°,$$

wherein the FOV is defined as a field angle, wherein the optical system satisfies $$0.50 \le TTL/ImgH \le 1.0,$$

wherein the total track length is defined as a distance in an optical axis direction from a vertex of an object-side surface of the first lens to an upper surface of an image sensor unit, and the ImgH is defined as twice a distance in a diagonal direction from the upper surface of the image sensor unit overlapping the optical axis to a 1.0 field region of the image sensor unit, and wherein the optical system satisfies $$CA\_O\_x < CA\_O\_6,$$

and wherein the CA_O_x is defined as a size of an effective diameter of an object-side of a lens closest to an aperture among lenses between the aperture and the sensor, and CA_O_6 is defined as a size of an effective diameter of the object-side surface of the sixth lens.

13. The optical module of claim 10, wherein the fifth lens satisfies $$0.5 \le CT\_5/T\_O\_c\_5 \le 1.7,$$

and wherein the CT_5 is defined as a thickness on the optical axis of the fifth lens, T_O_c_5 is defined as a thickness in the direction parallel to the optical axis direction in a critical point region of the object-side surface of the fifth lens, and the critical point region is defined as 0.1 mm range based on the critical point.

14. The optical module of claim 12, wherein the sixth lens satisfies $$0.1 \leq CT\_6/\max T\_6 \leq 1.0,$$

and wherein the CT_6 is defined as a thickness on the optical axis of the sixth lens, and the max T_6 is defined as a maximum thickness of the sixth lens.

15. The optical module of claim 10, wherein the fifth lens and the sixth lens satisfy $$2 \leq CD\_(5/6)/\min D\_(5/6) \leq 50,$$

and wherein the CD_(5/6) is defined as a distance on the optical axis of the fifth lens and the sixth lens, and the min D_(5/6) is defined as a minimum distance on the optical axis of the fifth lens and the sixth lens.

16. The optical module of claim 10, wherein effective diameters of object-side surfaces of lenses positioned between a lens closest to the aperture and a lens closest to the sensor are arranged in increasing order from the aperture toward the sensor.

17. An optical module comprising:

a sensor; and an optical system including first to sixth lenses sequentially disposed along an optical axis from an object-side toward a sensor-side, wherein at least one of an object-side surface and a sensor-side surface of a lens positioned farthest from an aperture among the six lenses includes a free-form surface, the first lens has a positive refractive power, the second lens has a negative refractive power, the sixth lens has a negative refractive power, wherein the fifth lens and the sixth lens satisfy:

$$2 \leq CD\_(5/6)/\min D\_(5/6) \leq 50,$$

wherein the CD_(5/6) is defined as a distance on the optical axis of the fifth lens and the sixth lens, and the min D_(5/6) is defined as a minimum distance on the optical axis of the fifth lens and the sixth lens.

18. The optical module of claim 12, wherein the fifth lens satisfies $$20° < |SA1\_O\_5| \leq 60°,$$

wherein the SA1_O_5 is defined as an angle between the optical axis and a normal line of an object-side surface of the fifth lens at any one point of the object-side surface of the fifth lens at a range of 70% to 90% of a distance from the optical axis to an effective diameter of the fifth lens.

19. The optical module of claim 12, wherein the sixth lens satisfies $$10° \leq |SA1\_O\_x\_6| \leq 40°, \text{ and}$$

$$10° \leq |SA1\_O\_y\_6| \leq 40°,$$

wherein the SA1_O_x_6 is defined as a slope angle between the optical axis and a normal line at any one point of an object-side surface of the sixth lens at a range of 20% to 50% of a distance from the optical axis to the effective diameter in the X-axis direction from the optical axis of the object-side surface of the sixth lens, and the SA1_O_y_6 is defined as an angle between the optical axis and a normal line at any one point of the object-side surface of the sixth lens at a range of 20% to 50% of a distance from the optical axis to the effective diameter in the Y-axis direction from the optical axis of the object-side surface of the sixth lens.

* * * * *